US012000208B2

(12) United States Patent
Vande Haar et al.

(10) Patent No.: US 12,000,208 B2
(45) Date of Patent: Jun. 4, 2024

(54) INTEGRATED PLEATED SCREEN ASSEMBLY

(71) Applicant: Pella Corporation, Pella, IA (US)

(72) Inventors: Evan Vande Haar, Pella, IA (US); Todd Bernhagen, Pella, IA (US); William R. Parcells, Des Moines, IA (US)

(73) Assignee: Pella Corporation, Pella, IA (US)

( * ) Notice: Subject to any disclaimer, the term of this patent is extended or adjusted under 35 U.S.C. 154(b) by 0 days.

(21) Appl. No.: 17/162,402

(22) Filed: Jan. 29, 2021

(65) Prior Publication Data

US 2021/0238919 A1 Aug. 5, 2021

Related U.S. Application Data

(60) Provisional application No. 63/039,359, filed on Jun. 15, 2020, provisional application No. 62/968,403, filed on Jan. 31, 2020.

(51) Int. Cl.

| | |
|---|---|
| ***E06B 9/262*** | (2006.01) |
| ***E06B 7/03*** | (2006.01) |
| ***E06B 9/52*** | (2006.01) |

(52) U.S. Cl.

CPC ................ *E06B 9/262* (2013.01); *E06B 7/03* (2013.01); *E06B 9/52* (2013.01); *E06B 2009/2625* (2013.01)

(58) Field of Classification Search

CPC ......... E06B 2009/528; E06B 2009/527; E06B 9/581; E06B 9/58; E06B 9/262; E06B 9/52; E06B 9/522; E06B 2009/2625; E06B 3/4415; E06B 2003/4492; E06B 7/03

See application file for complete search history.

(56) References Cited

U.S. PATENT DOCUMENTS

| | | | |
|---|---|---|---|
| 267,618 | A | 11/1882 | Tribe |
| 604,620 | A | 5/1898 | Kolb |
| 618,830 | A | 2/1899 | Barr |

(Continued)

FOREIGN PATENT DOCUMENTS

| | | | |
|---|---|---|---|
| CA | 1045535 | A | 1/1979 |
| CA | 1087458 | A | 10/1980 |

(Continued)

*Primary Examiner* — Abe Massad
*Assistant Examiner* — Matthew R. Shepherd
(74) *Attorney, Agent, or Firm* — FAEGRE DRINKER BIDDLE & REATH LLP

(57) ABSTRACT

A screen assembly used with a fenestration unit, the screen assembly capable of being installed at manufacture or retroactively to fenestration units. The screen assembly is installable on a fenestration unit having a frame and a window sash. The screen assembly includes a housing having a first housing member and a second housing member, wherein the housing forms a screen retention space between the first and second housing members when the screen assembly is in a closed position. It further includes a pleated screen positioned between the first and second housing members when the screen assembly is in the closed position, wherein the pleated screen includes a first end coupled to the first housing member and a second end coupled to the second housing member. The screen assembly also includes a catch element configured to releasably engage with the window sash.

12 Claims, 34 Drawing Sheets

(56) References Cited

U.S. PATENT DOCUMENTS 1,059,964 A 4/1913 Hutchinson
1,114,990 A * 10/1914 Hutchinson ............... E06B 9/54
160/99
1,349,438 A 8/1920 Samplawski
2,015,993 A 10/1935 Drake
2,051,422 A 8/1936 Rissmann
2,054,003 A 9/1936 Rissmann
2,056,341 A 10/1936 Bulmer
2,079,718 A 5/1937 Gandenz
2,107,755 A 2/1938 Kemp
2,131,521 A 9/1938 Nye
2,132,986 A 10/1938 Julien
2,191,166 A 2/1940 Werner et al.
2,200,481 A 5/1940 Thexton
2,220,756 A 11/1940 Egli
2,221,515 A 11/1940 Goldenberg
2,225,050 A 12/1940 Herzog
2,235,295 A 3/1941 Morgan
2,239,006 A 4/1941 Krywonis
2,243,790 A 5/1941 Blood
2,261,141 A 11/1941 Davis
2,261,142 A 11/1941 Davis
2,261,443 A 11/1941 McGaw
2,276,716 A 3/1942 Cardona
2,293,968 A 8/1942 Chandler et al.
2,302,638 A 11/1942 Messina
2,314,026 A 3/1943 Willett
2,323,295 A 7/1943 Brewer
2,327,232 A 8/1943 Wheeler
2,336,530 A 12/1943 Chandler et al.
2,352,609 A 7/1944 Bates
2,354,832 A 8/1944 Ristine
2,365,454 A 12/1944 Chandler et al.
2,368,770 A 2/1945 Norden
2,379,120 A 6/1945 Turner
2,386,016 A 10/1945 Turner
2,388,044 A 10/1945 Drab
2,406,761 A 9/1946 Golkowski
2,420,301 A 5/1947 Cusumano
2,432,808 A 12/1947 Royak
2,462,520 A 2/1949 Marbach
2,491,555 A 12/1949 Fistor
2,501,454 A 3/1950 Schueren
2,514,274 A 7/1950 Zagrodny
2,514,438 A 7/1950 Bardega
2,517,514 A 8/1950 Walsh
2,553,868 A 5/1951 Piva, Jr.
2,560,440 A 7/1951 Heeren
2,573,590 A 10/1951 Mosebach
2,575,128 A 11/1951 Renzetti
2,584,369 A 2/1952 Renton
2,595,364 A 5/1952 Lockhart
2,595,508 A 5/1952 Bridges
2,605,823 A 8/1952 Lockhart
2,615,512 A 10/1952 Friis
2,615,513 A 10/1952 Radford
2,637,381 A 5/1953 Bowman
2,711,788 A 6/1955 Covi
2,758,644 A 8/1956 Virlouvet
2,825,400 A 3/1958 Poulsen
2,826,789 A 3/1958 Etling
2,844,196 A 7/1958 Jones
2,908,326 A 10/1959 Jewell
2,925,859 A 2/1960 Baker, Jr.
3,005,489 A 10/1961 Crocker et al.
3,008,518 A 11/1961 Hayes
3,017,927 A 1/1962 Demko
3,024,837 A 3/1962 McPhail
3,030,654 A 4/1962 Romuald et al.
3,105,542 A 10/1963 Lynch
3,116,097 A 12/1963 Novales
3,141,497 A 7/1964 Griesser
3,152,354 A 10/1964 Diack
3,155,146 A 11/1964 Malouf et al.
3,158,195 A 11/1964 Ney
3,168,355 A 2/1965 Rudolph
3,173,474 A 3/1965 Wootten
3,179,161 A 4/1965 Johnson
3,219,374 A 11/1965 Snell
3,244,222 A 4/1966 Johnson
3,314,201 A 4/1967 Riegelman
3,352,349 A 11/1967 Hennequin
3,398,779 A 8/1968 Kuss
3,414,039 A 12/1968 King
3,425,165 A 2/1969 Cleveland
3,448,943 A 6/1969 Herou
3,470,934 A 10/1969 Agnew
3,489,199 A 1/1970 Weikel et al.
3,489,200 A 1/1970 Recchione
3,503,169 A 3/1970 Johnson et al.
3,552,471 A 1/1971 Hurst et al.
3,553,891 A 1/1971 Casebolt et al.
3,658,111 A 4/1972 Herms
3,698,036 A 10/1972 Goodman
3,729,045 A 4/1973 MacDonald
3,732,913 A 5/1973 Wrono
3,753,458 A 8/1973 Lazarek
3,764,172 A 10/1973 Standke
3,837,126 A 9/1974 Voiturier et al.
3,842,890 A 10/1974 Kramer
3,858,638 A 1/1975 Soeffker
3,882,921 A 5/1975 Sandall
3,889,434 A 6/1975 Shelver
3,891,020 A 6/1975 Mennuto
3,911,990 A 10/1975 Hoover et al.
3,935,681 A 2/1976 Voiturier et al.
3,974,316 A 8/1976 Jacquemin et al.
4,001,972 A 1/1977 Hurwitz
4,006,770 A 2/1977 Ferguson
4,009,745 A 3/1977 Erpenbeck
4,019,555 A 4/1977 Oshiro
4,027,431 A 6/1977 Rackard
4,028,849 A 6/1977 Anderson
4,033,087 A 7/1977 Shelver
4,040,210 A 8/1977 Land
4,084,360 A 4/1978 Reckson
4,095,640 A 6/1978 Beckerer, Jr.
4,125,141 A 11/1978 Stillwell
4,133,366 A 1/1979 Jenkins, Sr.
4,163,817 A 8/1979 Dicarlantoino et al.
4,188,992 A 2/1980 Segerljung
4,193,500 A 3/1980 Scott
4,196,767 A 4/1980 Kent
4,197,896 A 4/1980 Reichstadt
4,204,015 A 5/1980 Levine et al.
4,222,200 A 9/1980 Beirnes
4,237,664 A 12/1980 Wilmes
4,249,589 A 2/1981 Loeb
4,253,278 A 3/1981 Dallaire
4,258,517 A 3/1981 Hammond
4,261,524 A 4/1981 Ludenbach
4,263,760 A 4/1981 Gell
4,295,305 A 10/1981 Shelver
4,297,812 A 11/1981 McPhail
4,306,387 A 12/1981 Hopkins et al.
4,311,183 A 1/1982 Herbst et al.
4,323,104 A 4/1982 Guttman
4,344,255 A 8/1982 Knoll
4,359,079 A 11/1982 Bledsoe
4,359,081 A 11/1982 Brower
4,363,349 A 12/1982 Childs
4,369,829 A 1/1983 Casiday
4,390,054 A 6/1983 Niibori et al.
4,399,855 A 8/1983 Volfson
4,419,982 A 12/1983 Eckels
4,436,137 A 3/1984 Charles
4,458,739 A 7/1984 Murray et al.
4,467,853 A 8/1984 Downey, Jr.
4,480,676 A 11/1984 Solomon
4,506,478 A 3/1985 Anderson
4,513,805 A 4/1985 Mase
4,530,189 A 7/1985 Randall
4,531,562 A 7/1985 Swanson
4,535,829 A 8/1985 Fukuchi

(56) References Cited

U.S. PATENT DOCUMENTS 4,558,536 A 12/1985 Dunsmoor
4,586,291 A 5/1986 Swan
4,592,180 A 6/1986 Gerritsen
4,599,833 A 7/1986 Bullock
4,599,836 A 7/1986 Melcher
4,604,840 A 8/1986 Mondon
4,625,659 A 12/1986 Saelzer
4,638,844 A 1/1987 Hayashiguchi
4,649,980 A 3/1987 Kunz
4,649,981 A 3/1987 Bibeau
4,651,797 A 3/1987 Lange
4,651,940 A 3/1987 Nakamura
4,656,783 A 4/1987 Ahonen
4,658,879 A 4/1987 Van Klompenburg
4,667,441 A 5/1987 Coddens
4,671,557 A 6/1987 Lemp
4,685,175 A 8/1987 Yonovich
4,688,619 A 8/1987 Kessler et al.
4,702,297 A 10/1987 Van Klompenburg
4,726,149 A 2/1988 Tryba
4,741,488 A 5/1988 Futagawa
4,747,248 A 5/1988 Fahs
4,751,115 A 6/1988 Smith et al.
4,757,852 A 7/1988 Jentof et al.
4,762,160 A 8/1988 Bechtold et al.
4,781,235 A 11/1988 Hedstrom et al.
4,819,295 A 4/1989 Kaftan
4,821,786 A 4/1989 Johnston
4,825,921 A 5/1989 Rigter
4,830,913 A 5/1989 Ortmans et al.
4,834,160 A 5/1989 Becker
4,838,333 A 6/1989 Mottura
4,846,241 A 7/1989 Chomka et al.
4,854,364 A 8/1989 Junker
4,862,942 A 9/1989 Johnson
4,865,108 A 9/1989 Hennequin et al.
4,867,222 A 9/1989 Roman et al.
4,872,498 A 10/1989 Deblock et al.
4,912,879 A 4/1990 Mozuras et al.
4,915,152 A 4/1990 Magee
4,922,658 A 5/1990 Coddens
4,934,434 A 6/1990 Schnebly et al.
4,934,436 A 6/1990 Schnebly
4,934,437 A 6/1990 Kraeutler
4,935,987 A 6/1990 Sterner, Jr.
4,945,969 A 8/1990 Schnebly et al.
4,961,247 A 10/1990 Leitzel et al.
4,986,034 A 1/1991 Mozuras et al.
4,993,468 A 2/1991 Hackman et al.
4,996,814 A 3/1991 Guillemet
4,999,948 A 3/1991 Hodgens
5,002,112 A 3/1991 Schnebly et al.
5,012,041 A 4/1991 Sims et al.
5,012,616 A 5/1991 Martin
5,035,081 A 7/1991 Yamamoto et al.
5,044,417 A 9/1991 Bresson
5,063,638 A 11/1991 Howard et al.
5,069,013 A 12/1991 Pliml, Jr.
5,090,469 A 2/1992 Boulanger
5,092,388 A 3/1992 Evers
5,097,886 A 3/1992 Moyet-Ortiz
5,099,905 A 3/1992 Rigter
5,099,906 A 3/1992 Chigusa et al.
5,108,526 A 4/1992 Cornils et al.
5,113,922 A 5/1992 Christensen et al.
5,119,591 A 6/1992 Sterner et al.
5,121,782 A 6/1992 Renkhoff et al.
5,124,185 A 6/1992 Kerr et al.
5,131,450 A 7/1992 Lichy
5,143,138 A 9/1992 Zwart
5,163,495 A 11/1992 Lichy
5,228,491 A 7/1993 Rude et al.
5,230,738 A 7/1993 Wheeler
5,265,308 A 11/1993 May et al.
5,282,504 A 2/1994 Anderson et al.
5,301,734 A * 4/1994 Opel .................... E05D 15/22 49/362
5,301,737 A 4/1994 Martin
5,323,831 A 6/1994 Manthei
5,339,568 A 8/1994 Hanemaayer
5,343,594 A 9/1994 Harvey
5,351,742 A 10/1994 Lichy
5,355,245 A 10/1994 Lynam
5,363,898 A * 11/1994 Sprague .............. E05D 13/1276 160/98
5,392,835 A 2/1995 Wildt
5,429,171 A 7/1995 Hamilton
5,436,064 A 7/1995 Schnegg et al.
5,445,209 A 8/1995 Lichy
5,479,979 A 1/1996 Hayashiguchi
5,496,630 A 3/1996 Hawrylko et al.
5,505,244 A * 4/1996 Thumann .................. E06B 9/54 160/290.1
5,523,877 A 6/1996 Lynam
5,540,651 A 7/1996 Risch et al.
5,544,689 A 8/1996 Wegner
5,547,011 A 8/1996 Dotson et al.
5,600,974 A 2/1997 Schnegg et al.
5,601,888 A 2/1997 Fowler
5,622,414 A 4/1997 Artwohl et al.
5,628,356 A 5/1997 Marocco
5,634,508 A 6/1997 Herbst
5,655,342 A 8/1997 Guillemet et al.
5,671,790 A 9/1997 Andersen et al.
5,680,245 A 10/1997 Lynam
5,680,893 A 10/1997 Neer
5,682,710 A 11/1997 Davies et al.
5,687,506 A 11/1997 Davies et al.
5,692,349 A 12/1997 Guillemet
5,771,952 A 6/1998 Gabriel
5,778,955 A * 7/1998 Chen ...................... E06B 9/262 160/370.23
5,787,952 A 8/1998 Wegner
5,794,328 A 8/1998 Simone
5,794,678 A 8/1998 Beringer et al.
5,803,145 A 9/1998 Lamb
5,836,120 A 11/1998 Debower
5,836,655 A 11/1998 Laufer
5,839,234 A 11/1998 Mayer
5,850,864 A 12/1998 Decker
5,853,040 A 12/1998 Benthin
5,862,851 A 1/1999 Stoebich et al.
5,864,419 A 1/1999 Lynam
5,887,391 A 3/1999 Shoup
5,901,768 A 5/1999 Herbst
5,904,200 A 5/1999 Agen
5,915,443 A 6/1999 Lindley, Jr.
5,918,659 A 7/1999 Lee
5,923,002 A 7/1999 McGrath et al.
5,930,952 A 8/1999 Ricci
5,934,353 A 8/1999 Buhr
5,945,182 A 8/1999 Fowler et al.
5,946,857 A 9/1999 Davies et al.
5,953,860 A 9/1999 Morgan et al.
5,964,271 A 10/1999 Lapointe
5,986,797 A 11/1999 Lynam
6,005,642 A 12/1999 Meisner et al.
6,015,025 A 1/2000 McGrath et al.
6,015,026 A 1/2000 McGrath
6,035,460 A 3/2000 Borter
6,039,107 A 3/2000 Pittard
6,039,390 A 3/2000 Agrawal et al.
6,051,820 A 4/2000 Poix et al.
6,059,007 A 5/2000 Tomita
6,067,762 A 5/2000 Greer et al.
6,068,802 A 5/2000 Berghorn et al.
6,070,642 A 6/2000 Douglas et al.
6,082,432 A 7/2000 Kissinger
6,098,743 A 8/2000 McGrath
6,116,323 A 9/2000 Huang
6,119,756 A 9/2000 Tatro
6,122,093 A 9/2000 Lynam
6,123,135 A 9/2000 Mathews
6,125,910 A 10/2000 Pepperell et al.

(56) References Cited

U.S. PATENT DOCUMENTS 6,135,186 A 10/2000 Lindley, Jr.
6,155,328 A 12/2000 Welfonder
6,167,936 B1 1/2001 Stover et al.
6,179,037 B1 1/2001 Tees
6,179,373 B1 1/2001 Bohm et al.
6,186,215 B1 2/2001 Deyoung et al.
6,192,631 B1 2/2001 Kenkel et al.
6,199,331 B1 3/2001 Hunt
6,209,610 B1 4/2001 Davies et al.
6,223,803 B1 5/2001 Nielsen
6,237,208 B1 5/2001 Meeth
6,256,931 B1 7/2001 Kenkel et al.
6,263,949 B1 7/2001 Guthrie, Jr.
6,267,168 B1 7/2001 Davies et al.
6,279,644 B1 8/2001 Wylie
6,283,427 B1 9/2001 Moeller et al.
6,304,363 B1 10/2001 Lynam
6,305,126 B1 10/2001 Hendrickson et al.
6,311,439 B1 11/2001 Arcati et al.
6,331,223 B1 12/2001 Wylie et al.
6,374,557 B1 4/2002 O'Donnell
6,375,165 B1 4/2002 Sherratt et al.
6,378,267 B1 4/2002 Bass
6,394,173 B2 5/2002 Enssle
6,401,428 B1 6/2002 Glover et al.
6,405,781 B2 6/2002 Davies et al.
6,408,922 B2 6/2002 Desrochers
6,412,537 B1 * 7/2002 Voss ........................ E06B 9/322
160/84.05
6,431,618 B1 8/2002 Choo
6,446,696 B1 9/2002 Davies et al.
6,463,983 B1 10/2002 Lang
6,470,511 B1 10/2002 Smale
6,470,947 B1 10/2002 Holevas
6,478,070 B2 11/2002 Poppema
6,493,128 B1 12/2002 Agrawal et al.
6,499,527 B1 12/2002 Lindley, Jr.
6,508,292 B1 1/2003 Saperas
6,513,771 B1 2/2003 Tucker
6,591,890 B1 7/2003 Grubb et al.
6,601,633 B2 8/2003 Sun et al.
6,618,998 B1 9/2003 Thomas et al.
6,619,364 B1 9/2003 Ehrlich et al.
6,622,769 B2 9/2003 Judkins
6,629,555 B2 10/2003 Deblock et al.
6,644,380 B2 11/2003 Perich et al.
6,655,441 B2 12/2003 Wen et al.
6,655,736 B1 12/2003 Arenas
6,666,252 B2 12/2003 Welfonder
6,679,002 B2 1/2004 Davies et al.
6,684,571 B2 2/2004 Hendrickson et al.
6,688,056 B2 2/2004 Von et al.
6,691,761 B1 2/2004 Alkhoury et al.
6,701,994 B2 3/2004 Goldenberg et al.
6,769,214 B1 8/2004 Kenkel et al.
6,779,580 B2 8/2004 Woodward et al.
6,814,127 B2 11/2004 Tagtow et al.
6,819,467 B2 11/2004 Lynam
6,823,924 B2 11/2004 Martin
6,851,464 B2 2/2005 Hudoba et al.
6,854,505 B2 2/2005 Grubb et al.
6,868,648 B2 3/2005 Glover et al.
6,880,612 B2 4/2005 Pylkki et al.
6,922,958 B2 8/2005 Derderian
6,938,667 B2 9/2005 Sugiyama et al.
6,942,003 B2 9/2005 Thompson
6,945,305 B1 9/2005 Limauro
6,959,748 B2 11/2005 Hudoba
6,964,290 B2 11/2005 Woodward et al.
6,977,021 B2 12/2005 Annacchino
6,991,693 B2 1/2006 Wylie et al.
7,024,821 B2 4/2006 Lu
7,025,105 B2 4/2006 Lancina
7,029,055 B2 4/2006 Bourque et al.
7,080,676 B2 7/2006 Abelson et al.
7,082,719 B2 8/2006 Regnery
7,082,982 B2 8/2006 Eveland et al.
7,100,667 B2 9/2006 Tomita
7,108,307 B1 9/2006 Sahara et al.
7,124,803 B2 10/2006 Jin et al.
7,128,125 B2 10/2006 Harbison
7,137,429 B2 11/2006 Jelic
7,137,430 B2 11/2006 Fraczek
7,185,692 B2 3/2007 Nien et al.
7,195,053 B2 3/2007 Pylkki et al.
7,210,513 B2 5/2007 Goldenberg et al.
7,222,467 B2 5/2007 Nowell et al.
7,234,501 B1 6/2007 Park
7,246,411 B2 7/2007 Campbell et al.
7,281,561 B2 10/2007 Anderson et al.
7,287,569 B2 10/2007 Lin
7,320,637 B2 1/2008 Lack
7,322,395 B2 1/2008 Nyffenegger et al.
7,331,369 B2 2/2008 Cordova
7,395,850 B2 7/2008 Chino et al.
7,418,806 B2 9/2008 Martineau et al.
7,487,816 B2 2/2009 Moriya et al.
7,509,773 B2 3/2009 Vornbaeumen et al.
7,516,770 B2 4/2009 Jerry
7,540,119 B2 6/2009 Milburn
7,581,775 B2 9/2009 Lekar
7,594,695 B2 9/2009 Noonan
7,617,858 B2 11/2009 Hoffmann et al.
7,631,683 B2 12/2009 Crider
7,654,300 B2 2/2010 Chigusa
7,661,226 B2 2/2010 Kibbel et al.
7,661,455 B2 2/2010 Weinbrenner
7,669,634 B2 3/2010 Sugiyama et al.
7,694,711 B2 4/2010 Okachi et al.
7,703,498 B2 * 4/2010 Holevas .................... E06B 9/60
160/99
7,712,968 B2 5/2010 Hoffman
7,718,251 B2 5/2010 Huntress et al.
7,726,377 B2 6/2010 Okachi
7,730,689 B2 6/2010 Figueroa-Morales
7,730,925 B1 6/2010 Pereira
7,730,926 B2 6/2010 Moriya et al.
7,735,540 B2 6/2010 Armstrong
7,743,814 B2 6/2010 Woodward et al.
7,765,741 B2 8/2010 Miller et al.
7,770,625 B2 8/2010 Lukos
7,798,568 B2 9/2010 Keller
7,802,607 B2 9/2010 Crider
7,819,167 B2 * 10/2010 Morin ....................... E06B 9/52
160/102
7,823,342 B1 11/2010 Van et al.
7,861,473 B1 1/2011 Green
7,861,761 B2 1/2011 Martineau et al.
7,891,398 B2 2/2011 Chino et al.
7,934,350 B2 5/2011 Koutsoukos
7,967,052 B2 6/2011 Lin
7,984,744 B2 7/2011 Karasawa et al.
8,000,759 B2 8/2011 Huang
8,006,736 B2 8/2011 Hoffmann et al.
8,011,413 B2 9/2011 Poppema
8,016,013 B2 9/2011 Horvath
8,016,014 B2 9/2011 Crider et al.
8,035,893 B2 10/2011 Creel
8,037,923 B2 10/2011 Alkhoury et al.
8,042,598 B2 10/2011 Bredemus et al.
8,156,994 B2 4/2012 Armstrong
8,167,020 B2 5/2012 Shanahan et al.
8,169,698 B1 5/2012 Robinson
8,191,606 B2 6/2012 Edlin
8,196,638 B2 6/2012 Roberts et al.
8,215,072 B2 7/2012 Gorman
8,215,073 B2 7/2012 Gorman et al.
8,220,520 B2 7/2012 Lukos
8,235,086 B2 8/2012 Smith
8,258,993 B2 9/2012 Inoue et al.
8,322,396 B2 12/2012 Andersen et al.
8,325,352 B2 12/2012 Franco et al.
8,347,939 B2 1/2013 Brabeck et al.
8,358,464 B1 1/2013 Risher

(56) References Cited

U.S. PATENT DOCUMENTS 8,376,019 B2 2/2013 Van et al.
8,381,848 B2 2/2013 Asbach et al.
8,393,080 B2 3/2013 Ballard et al.
8,397,788 B2 3/2013 Weinbrenner et al.
8,439,098 B1 5/2013 Jones et al.
8,439,100 B2 5/2013 Panseri et al.
8,464,471 B2 6/2013 Bertram
8,474,510 B2 7/2013 Nellen et al.
8,528,623 B2 9/2013 Roberts
8,555,572 B1 10/2013 Bingham et al.
8,579,011 B2 11/2013 Katada
8,584,410 B2 11/2013 Furgerson et al.
8,601,749 B2 12/2013 Von et al.
8,607,839 B2 12/2013 Berger
8,613,168 B2 12/2013 Von et al.
8,615,936 B2 12/2013 Von et al.
8,616,260 B2 12/2013 Zhang
8,622,112 B2 1/2014 Tremaine et al.
8,641,105 B2 2/2014 Goodman et al.
8,656,978 B2 2/2014 Goldenberg et al.
8,714,230 B2 5/2014 Marszalek et al.
8,733,041 B2 5/2014 Phipps
8,792,885 B2 7/2014 Chen et al.
8,810,909 B2 8/2014 Risher
8,833,034 B2 9/2014 Gorman et al.
8,833,426 B2 9/2014 Ebbesen et al.
8,851,146 B2 10/2014 Dwarka
8,869,870 B2 10/2014 Wieczorek et al.
8,887,789 B2 11/2014 Tremaine et al.
8,893,434 B1 11/2014 Konstantin
8,910,424 B2 12/2014 Harris
8,919,418 B2 12/2014 Carvallo
8,943,769 B2 2/2015 Snderkr et al.
8,944,134 B2 2/2015 Ballard et al.
8,955,254 B1 2/2015 Ewoldt
8,955,903 B2 2/2015 Park et al.
8,991,468 B2 3/2015 Bolton, III
8,997,831 B2 4/2015 Lin
9,004,143 B2 4/2015 Wilson
9,016,009 B2 4/2015 Snderkr et al.
9,016,010 B2 4/2015 Snderkr et al.
9,022,089 B1 5/2015 Dau
9,062,494 B2 6/2015 Chen
9,110,362 B2 8/2015 Risher
9,115,535 B2 8/2015 Blais
9,140,058 B1 9/2015 James
9,140,062 B2 9/2015 Cuatepotzo et al.
9,151,109 B2 10/2015 Kawai et al.
9,158,172 B2 10/2015 Sbar et al.
9,163,449 B2 10/2015 Weiss et al.
9,169,691 B2 10/2015 Berger
9,206,600 B2 12/2015 Von et al.
9,247,840 B2 2/2016 Diamond et al.
9,249,621 B2 2/2016 Dwarka
9,255,438 B2 2/2016 Pardue et al.
9,273,763 B2 3/2016 Evensen
9,284,729 B2 3/2016 Von et al.
9,284,770 B2 3/2016 Sprague
9,303,423 B2 4/2016 Cadogan et al.
9,303,448 B2 4/2016 Olkin
9,316,042 B2 4/2016 Goldenberg
9,322,208 B2 4/2016 Matta
9,347,258 B2 5/2016 Dwarka
9,351,599 B2 5/2016 Roberts
9,353,567 B2 5/2016 Pardue et al.
9,358,716 B2 6/2016 Huntress et al.
9,395,615 B2 7/2016 Risher
9,402,334 B2 7/2016 Coico et al.
9,416,587 B2 8/2016 Colson et al.
9,433,308 B1 9/2016 Kalinski
9,447,631 B2 9/2016 Christie
9,458,666 B2 10/2016 Murray
9,469,178 B2 10/2016 Lee
9,470,040 B2 10/2016 Hall et al.
9,487,986 B2 11/2016 Okachi et al.
9,487,999 B2 11/2016 Seuberling et al.
9,488,000 B2 11/2016 Kirby et al.
9,489,834 B2 11/2016 Hall et al.
9,492,037 B2 11/2016 Kee et al.
9,506,288 B2 11/2016 Hall et al.
9,512,666 B2 12/2016 Reyher et al.
9,512,673 B2 12/2016 Dibben et al.
9,514,638 B2 12/2016 Hall et al.
9,518,423 B2 12/2016 Seuberling et al.
9,540,871 B2 1/2017 Hall et al.
9,546,515 B2 1/2017 Hall et al.
9,556,670 B2 1/2017 Farntrog
9,561,456 B2 2/2017 Simmons
9,562,390 B2 2/2017 Hall et al.
9,569,955 B2 2/2017 Hall et al.
9,574,392 B2 2/2017 Alexander
9,574,395 B2 2/2017 Hall et al.
9,580,954 B2 2/2017 Pardue et al.
9,587,425 B2 3/2017 Free et al.
9,587,430 B2 3/2017 Colson et al.
9,605,476 B2 3/2017 Hall et al.
9,624,720 B2 4/2017 Hall et al.
9,624,721 B2 4/2017 Rubinoff
9,631,423 B2 4/2017 Hornung
9,652,977 B2 5/2017 Hall et al.
9,751,386 B1 9/2017 Attig
9,752,373 B2 9/2017 Pardue et al.
9,759,010 B2 9/2017 Hall et al.
9,790,732 B2 10/2017 Free et al.
9,810,020 B2 11/2017 Adams et al.
9,889,726 B2 2/2018 Umeki et al.
9,932,769 B2 * 4/2018 Woolery .................. E06B 9/54
10,012,021 B2 7/2018 Hornung
10,041,294 B2 8/2018 Van Loosbroek
11,643,864 B2 5/2023 Hoogland et al.
11,643,865 B2 5/2023 Hoogland et al.
2001/0000878 A1 5/2001 Davies et al.
2001/0011579 A1 8/2001 Davies et al.
2001/0027621 A1 10/2001 Davies et al.
2001/0030028 A1 10/2001 Poppema
2001/0035269 A1 11/2001 Judkins
2002/0023387 A1 2/2002 Hendrickson et al.
2002/0041424 A1 4/2002 Lynam
2002/0121056 A1 9/2002 Von et al.
2002/0179258 A1 12/2002 Welfonder
2003/0014920 A1 1/2003 Lu
2003/0019172 A1 1/2003 Martin
2003/0019181 A1 1/2003 Martin
2003/0029546 A1 2/2003 Wylie et al.
2003/0066614 A1 4/2003 Sun et al.
2003/0075281 A1 4/2003 Goldenberg et al.
2003/0079844 A1 5/2003 Deblolck et al.
2003/0106648 A1 6/2003 Lancina
2003/0127201 A1 7/2003 Perich et al.
2003/0150569 A1 8/2003 Pylkki et al.
2003/0168184 A1 9/2003 Wen et al.
2003/0178155 A1 9/2003 Fraczek
2003/0213564 A1 11/2003 Pacholke
2004/0040673 A1 3/2004 Jelic
2004/0064986 A1 4/2004 Anderson
2004/0084157 A1 5/2004 Thomas et al.
2004/0100121 A1 5/2004 Bourque et al.
2004/0103999 A1 6/2004 Grubb et al.
2004/0107655 A1 6/2004 Hudoba
2004/0140061 A1 7/2004 Woodward et al.
2004/0144498 A1 7/2004 Hudoba et al.
2004/0154753 A1 8/2004 Tagtow et al.
2004/0182522 A1 * 9/2004 Strand ..................... E06B 9/262
160/84.05
2004/0188042 A1 9/2004 Pylkki et al.
2004/0200160 A1 10/2004 Derderian
2004/0211134 A1 10/2004 Glover et al.
2004/0211528 A1 10/2004 Jin et al.
2004/0216849 A1 11/2004 Goldenberg et al.
2004/0216852 A1 11/2004 Woodward et al.
2004/0226221 A1 11/2004 Regnery
2004/0238131 A1 12/2004 Eveland et al.
2004/0261958 A1 12/2004 Sugiyama et al.
2005/0000760 A1 1/2005 Zangirolami

(56) References Cited

U.S. PATENT DOCUMENTS

2005/0005545 A1 1/2005 Jerry
2005/0006037 A1 1/2005 Annacchino
2005/0016695 A1 1/2005 Thompson
2005/0016696 A1 1/2005 Tomita
2005/0022943 A1 2/2005 Thomas et al.
2005/0066610 A1 3/2005 Nowell et al.
2005/0121152 A1 6/2005 Weinbrenner
2005/0132532 A1 6/2005 Campbell et al.
2005/0155726 A1 7/2005 Nien et al.
2005/0173075 A1 8/2005 Abelson et al.
2005/0230065 A1 10/2005 Moriya et al.
2005/0257496 A1 11/2005 Martineau et al.
2005/0257899 A1 11/2005 Lee et al.
2005/0262783 A1 12/2005 Milburn
2005/0269041 A1 12/2005 Anderson et al.
2005/0274462 A1 12/2005 Nyffenegger et al.
2006/0048905 A1 3/2006 Woodward et al.
2006/0060313 A1 3/2006 Lukos
2006/0064934 A1 3/2006 Vornbaumen et al.
2006/0088236 A1 4/2006 Hoffman
2006/0108074 A1 5/2006 Morin
2006/0137836 A1 6/2006 Harbison
2006/0150514 A1 7/2006 Miller et al.
2006/0150561 A1 7/2006 Van et al.
2006/0179719 A1 8/2006 Christie
2006/0214463 A1 9/2006 Sahara et al.
2006/0249264 A1 11/2006 Lin
2006/0272781 A1 12/2006 Cordova
2006/0283564 A1 12/2006 Poppema
2007/0029049 A1 2/2007 Martineau
2007/0033880 A1* 2/2007 Holevas .................... E06B 9/60 49/449
2007/0039698 A1 2/2007 Chino et al.
2007/0135034 A1 6/2007 Lack
2007/0137796 A1 6/2007 Woodward et al.
2007/0144685 A1 6/2007 Chigusa
2007/0181273 A1 8/2007 Koutsoukos
2007/0193697 A1 8/2007 Horvath
2007/0199665 A1* 8/2007 Studney .................... E06B 9/54 160/99
2007/0256800 A1 11/2007 Armstrong
2007/0272368 A1 11/2007 Hoffmann et al.
2007/0284052 A1 12/2007 Thomas et al.
2008/0030853 A1 2/2008 Creel
2008/0053623 A1 3/2008 Goldenberg et al.
2008/0053630 A1 3/2008 Lekar
2008/0060771 A1 3/2008 Sugiyama et al.
2008/0115894 A1 5/2008 Cech et al.
2008/0135189 A1 6/2008 Okachi et al.
2008/0168637 A1 7/2008 Ballard et al.
2008/0178548 A1 7/2008 Figueroa-Morales
2008/0210385 A1 9/2008 Sawyers et al.
2008/0264573 A1 10/2008 Beck et al.
2008/0284217 A1 11/2008 Noonan
2008/0289775 A1 11/2008 Lukos
2009/0025886 A1 1/2009 Crider
2009/0025889 A1 1/2009 Crider
2009/0050278 A1 2/2009 Weinbrenner et al.
2009/0068999 A1 3/2009 Chen et al.
2009/0084507 A1 4/2009 Tescher
2009/0104829 A1 4/2009 Bredemus et al.
2009/0115203 A1 5/2009 Thomas et al.
2009/0120004 A1 5/2009 Cobb
2009/0145047 A1 6/2009 Gorman
2009/0145048 A1 6/2009 Gorman et al.
2009/0165964 A1 7/2009 Harbison
2009/0178771 A1 7/2009 Lin
2009/0183844 A1 7/2009 Alkhoury et al.
2009/0199978 A1 8/2009 Crider et al.
2009/0199983 A1 8/2009 Edlin
2009/0251714 A1 10/2009 Franco et al.
2009/0270133 A1 10/2009 Huang
2010/0018657 A1 1/2010 Hoffmann et al.
2010/0032991 A1 2/2010 Keller
2010/0116444 A1 5/2010 Andersen et al.
2010/0116449 A1 5/2010 Ebbesen et al.
2010/0134339 A1 6/2010 Inoue et al.
2010/0136317 A1 6/2010 Huntress et al.
2010/0170645 A1 7/2010 Lin
2010/0186908 A1 7/2010 Meadows et al.
2010/0205881 A1 8/2010 Soenderkaer et al.
2010/0206364 A1 8/2010 Armstrong
2010/0218429 A1 9/2010 Shanahan et al.
2010/0229468 A1 9/2010 Allen et al.
2010/0252210 A1 10/2010 Roberts et al.
2010/0258395 A1 10/2010 Busi
2010/0269432 A1 10/2010 Furgerson et al.
2011/0061817 A1 3/2011 Smith
2011/0061822 A1 3/2011 Tremaine et al.
2011/0083371 A1 4/2011 Hughes et al.
2011/0094686 A1 4/2011 Kee et al.
2011/0108209 A1 5/2011 Thomas et al.
2011/0114268 A1 5/2011 Brabeck et al.
2011/0114272 A1 5/2011 Roberts
2011/0126476 A1 6/2011 Bertram
2011/0162167 A1 7/2011 Blais
2011/0167729 A1 7/2011 Panseri et al.
2011/0198042 A1 8/2011 Lee
2011/0199519 A1 8/2011 Yamauchi
2011/0209837 A1 9/2011 Wieczorek et al.
2011/0253571 A1 10/2011 Rothbaum
2011/0296774 A1 12/2011 Tremaine et al.
2012/0025685 A1 2/2012 Clegg et al.
2012/0055106 A1 3/2012 Phipps
2012/0061031 A1 3/2012 Zhang
2012/0061036 A1 3/2012 Agbozouhoue
2012/0118651 A1 5/2012 Asbach et al.
2012/0186758 A1 7/2012 Katada
2012/0199294 A1* 8/2012 Fayette ................. E06B 3/4415 160/90
2012/0206661 A1 8/2012 Risher
2012/0241108 A1 9/2012 Marszalek et al.
2012/0267059 A1 10/2012 Tsou
2012/0273641 A1 11/2012 Gorman et al.
2012/0312484 A1 12/2012 Harris
2012/0317894 A1 12/2012 Von et al.
2012/0317895 A1 12/2012 Von et al.
2012/0317899 A1 12/2012 Von et al.
2013/0000201 A1 1/2013 Alexander
2013/0000224 A1 1/2013 Von et al.
2013/0000232 A1 1/2013 Weiss et al.
2013/0038092 A1 2/2013 Rockelmann et al.
2013/0048229 A1 2/2013 Dwarka
2013/0056164 A1 3/2013 Kawai et al.
2013/0068400 A1 3/2013 Dwarka
2013/0075048 A1 3/2013 Berger
2013/0094906 A1 4/2013 Rijlaarsdam
2013/0139976 A1 6/2013 Carvallo
2013/0139977 A1 6/2013 Ballard et al.
2013/0141783 A1 6/2013 Risher
2013/0160954 A1 6/2013 Bolton, III
2013/0187403 A1 7/2013 Park et al.
2013/0199737 A1 8/2013 Wilson
2013/0212947 A1 8/2013 Goldenberg
2013/0220559 A1 8/2013 Dwarka
2013/0269883 A1 10/2013 Dwarka
2013/0333847 A1 12/2013 Casseri et al.
2014/0000820 A1 1/2014 Diamond et al.
2014/0007720 A1 1/2014 Evensen
2014/0041814 A1 2/2014 Roberts
2014/0060758 A1 3/2014 Cuatepotzo et al.
2014/0076507 A1 3/2014 Dibben et al.
2014/0090806 A1 4/2014 Coico et al.
2014/0133005 A1 5/2014 Sbar et al.
2014/0157696 A1 6/2014 Reyher et al.
2014/0157720 A1 6/2014 Von et al.
2014/0182794 A1 7/2014 Berger
2014/0251553 A1 9/2014 Farntrog
2014/0299281 A1 10/2014 Colson et al.
2014/0305053 A1 10/2014 Snderkr et al.
2014/0305054 A1 10/2014 Snderkr et al.
2014/0305602 A1 10/2014 Kirby et al.
2014/0311690 A1 10/2014 Camps
2014/0352240 A1 12/2014 Matta

(56) References Cited

U.S. PATENT DOCUMENTS

| | | | |
|---|---|---|---|
| 2014/0360000 | A1 | 12/2014 | Risher |
| 2014/0374036 | A1 | 12/2014 | Chen |
| 2015/0047263 | A1 | 2/2015 | Aguayo |
| 2015/0068691 | A1 | 3/2015 | Thomas et al. |
| 2015/0079363 | A1 | 3/2015 | Free et al. |
| 2015/0096232 | A1 | 4/2015 | Cadogan et al. |
| 2015/0107170 | A1 | 4/2015 | Olkin |
| 2015/0226001 | A1 | 8/2015 | Adams et al. |
| 2015/0240551 | A1 | 8/2015 | Murray |
| 2015/0267459 | A1 | 9/2015 | Sprague |
| 2015/0284990 | A1 | 10/2015 | Hall et al. |
| 2015/0284991 | A1 | 10/2015 | Hall et al. |
| 2015/0284992 | A1 | 10/2015 | Hall et al. |
| 2015/0284993 | A1 | 10/2015 | Hall et al. |
| 2015/0284996 | A1 | 10/2015 | Hall et al. |
| 2015/0284997 | A1 | 10/2015 | Hall et al. |
| 2015/0284998 | A1 | 10/2015 | Hall et al. |
| 2015/0285535 | A1 | 10/2015 | Hall et al. |
| 2015/0288316 | A1 | 10/2015 | Hall et al. |
| 2015/0300081 | A1 | 10/2015 | Zhang |
| 2015/0337592 | A1 | 11/2015 | Rubinoff |
| 2015/0345209 | A1 | 12/2015 | Hornung |
| 2015/0345213 | A1 | 12/2015 | Hall et al. |
| 2015/0345218 | A1 | 12/2015 | Hall et al. |
| 2015/0348401 | A1 | 12/2015 | Hall et al. |
| 2015/0375152 | A1 | 12/2015 | Simmons |
| 2015/0376938 | A1 | 12/2015 | Pardue et al. |
| 2016/0040472 | A1 | 2/2016 | Seuberling et al. |
| 2016/0040477 | A1 | 2/2016 | Seuberling et al. |
| 2016/0096417 | A1 | 4/2016 | Lee |
| 2016/0108663 | A1 | 4/2016 | Pardue et al. |
| 2016/0123074 | A1 | 5/2016 | Anderson |
| 2016/0273261 | A1 | 9/2016 | Pardue et al. |
| 2016/0369555 | A1 | 12/2016 | Riemelmoser et al. |
| 2017/0028693 | A1 | 2/2017 | Free et al. |
| 2017/0044825 | A1 | 2/2017 | Zhang |
| 2017/0051557 | A1 | 2/2017 | Hall et al. |
| 2017/0130515 | A1 | 5/2017 | Pardue et al. |
| 2017/0130527 | A1 | 5/2017 | Riemelmoser et al. |
| 2017/0159356 | A1 | 6/2017 | Anderson |
| 2017/0211325 | A1 | 7/2017 | Riemelmoser et al. |
| 2017/0275944 | A1 | 9/2017 | LaPlaca |
| 2018/0003256 | A1 | 1/2018 | Downey |
| 2018/0010387 | A1 | 1/2018 | Woolery |
| 2019/0136616 | A1 | 5/2019 | Cito |
| 2019/0226270 | A1 * | 7/2019 | Hoogland ................. E06B 9/54 |
| 2019/0284867 | A1 | 9/2019 | Hoogland et al. |
| 2021/0131177 | A1 | 5/2021 | Vande Haar |
| 2023/0175311 | A1 | 6/2023 | Hoogland et al. |

FOREIGN PATENT DOCUMENTS

| | | | | |
|---|---|---|---|---|
| CA | 1162713 | A | 2/1984 | |
| CA | 1303480 | C | 6/1992 | |
| CA | 1324535 | C | 11/1993 | |
| CA | 2025837 | C | 5/1994 | |
| CA | 2008484 | C | 10/1995 | |
| CA | 2125517 | C | 10/1996 | |
| CA | 2164252 | C | 2/2000 | |
| CA | 2231298 | C | 1/2002 | |
| CA | 2219946 | C | 12/2002 | |
| CA | 2218640 | C | 2/2003 | |
| CA | 2542245 | A1 | 4/2003 | |
| CA | 2393077 | C | 7/2004 | |
| CA | 2249147 | C | 10/2005 | |
| CA | 2512125 | A1 | 1/2006 | |
| CA | 2359549 | C | 4/2006 | |
| CA | 2217270 | C | 5/2006 | |
| CA | 2257358 | C | 9/2007 | |
| CA | 2458913 | C | 12/2007 | |
| CA | 2629261 | A1 * | 10/2008 | ............. E06B 5/003 |
| CA | 2347510 | C | 4/2009 | |
| CA | 2396907 | C | 8/2009 | |
| CA | 2588978 | C | 3/2010 | |
| CA | 2628601 | C | 9/2011 | |
| CA | 2455459 | C | 12/2011 | |
| CA | 2568636 | C | 7/2012 | |
| CA | 2490815 | C | 10/2012 | |
| CA | 2785882 | C | 6/2013 | |
| CA | 2701321 | C | 10/2013 | |
| CA | 2507558 | C | 1/2014 | |
| CA | 2762920 | C | 1/2014 | |
| CA | 2565470 | C | 8/2014 | |
| CA | 2579234 | C | 8/2014 | |
| CA | 2766911 | C | 1/2015 | |
| CA | 2670098 | C | 10/2015 | |
| CA | 2758450 | C | 10/2016 | |
| CA | 2805215 | C | 8/2017 | |
| CA | 2832714 | C | 10/2017 | |
| CA | 3028554 | A1 | 7/2019 | |
| JP | 09-013843 | A | 1/1997 | |
| JP | 2014-214465 | A | 11/2014 | |
| WO | 93/18692 | A1 | 9/1993 | |
| WO | 97/34069 | A1 | 9/1997 | |
| WO | 2005/086893 | A2 | 9/2005 | |
| WO | 2006/133556 | A1 | 12/2006 | |
| WO | 2009/065403 | A1 | 5/2009 | |
| WO | 2013/057744 | A1 | 4/2013 | |
| WO | 2014/059998 | A1 | 4/2014 | |
| WO | 2014/125509 | A1 | 8/2014 | |
| WO | 2014/138567 | A1 | 9/2014 | |
| WO | 2016/015084 | A1 | 2/2016 | |
| WO | 2018/232439 | A1 | 12/2018 | |

* cited by examiner

INTEGRATED PLEATED SCREEN ASSEMBLY

CROSS REFERENCE TO RELATED APPLICATIONS

The present application claims the benefit of U.S. Provisional Patent Application No. 63/039,359, filed Jun. 15, 2020, and U.S. Provisional Patent Application No. 62/968,403, filed Jan. 31, 2020, both of which are incorporated herein by reference in their entirety.

TECHNICAL FIELD

The present description relates generally to fenestration assemblies, systems and methods. Specifically, the description relates to fenestration assemblies including screen assemblies.

BACKGROUND

Fenestration assemblies that include moveable glass panels can also include a screen mounted in a fixed position to keep out insects or other pests, more colloquially known as "bugs." In some cases, the screen can be removed when not needed. However, in both cases, when screen is installed, viewing through at least one of the glass panels includes viewing through the screen, somewhat obscuring the view through the glass panel. Over time the screen can be continuously exposed to the elements, leading to an accumulation of airborne detritus on the screen, further obscuring the view.

Various screens have been described, including in U.S. Pat. No. 7,819,167 to Morin issued Oct. 26, 2010, which relates to a window assembly including a window frame, a pair of spaced-apart guide tracks, at least one window sash mounted to and positioned between the a pair of spaced-apart guide tracks, and a foldable and spreadable pleated screen. The window sash is slidably movable along the guide tracks between an open position and a closed position. The pleated screen has a first screen end mounted to the end of the at least one window sash and a second screen end mounted to a first end of the window frame so that the pleated screen extends when the at least one window sash is in the open position and the pleated screen folds onto itself when the at least one window sash is in the closed position. The pleated screen can also be used in double-hung windows.

However, pleated screens can be aesthetically unpleasing because of the way in which they unravel, can be difficult to manage during use, and can be difficult to install in new or existing fenestration units.

SUMMARY

Various disclosed concepts relate to a screen assembly, a fenestration unit including a screen assembly, and associated methods. For example, a fenestration unit may include a frame formed by a head, a sill, and two jambs, and a sash formed by a pair of stiles and a pair of rails. The sash is slidably coupled to the frame and is transitionable between open and closed positions. The fenestration unit also includes a screen assembly, the screen assembly in turn including a pleated screen having a first end and a second end, the pleated screen being extendable and retractable between an extended and a retracted state, respectively, a first housing member coupled to the first end of the pleated screen, releasably coupled to the sash, and configured to receive the pleated screen in the retracted state, and a second housing member coupled to the second end of the pleated screen and to the frame.

According to one example ("Example 1"), a screen assembly for a fenestration unit having a frame and a window sash includes a housing having a first housing member and a second housing member, wherein the housing forms a screen retention space between the first and second housing members when the screen assembly is in a closed position; a pleated screen positioned between the first and second housing members when the screen assembly is in the closed position, the pleated screen including a first end coupled to the first housing member and a second end coupled to the second housing member; and a catch element configured to releasably engage with the window sash.

According to another example further to Example 1 ("Example 2"), the screen assembly further includes end caps positioned at first and second longitudinal ends of the housing.

According to another example further to Example 2 ("Example 3"), the end caps include the catch element.

According to another example further to Example 1 ("Example 4"), the housing includes the catch element.

According to another example further to Example 1 ("Example 5"), the screen assembly further includes a pleat restrictor positioned on the housing such that the pleat restrictor extends into the screen retention space.

According to another example further to Example 1 ("Example 6"), the screen assembly further includes a moisture deflector for deflecting moisture away from the screen assembly extending from the housing.

According to another example further to Example 1 ("Example 7"), the screen assembly further including a first cord and a second cord extending from the housing, wherein the first and second cords both extend along a shared length of a longitudinal length of the housing.

According to one example ("Example 8"), a fenestration unit includes a frame having a first portion, a second portion opposite the first portion, a first jamb extending between the first portion and the second portion, and a second jamb opposite the first jamb and extending between the first portion and the second portion, wherein the first jamb and the second jamb each include a first pocket; a sash including a first rail, a second rail opposite the first rail, a first stile extending between the first and second rails, and a second stile opposite the first stile and extending between the first and second rails, wherein the first and second stiles are positioned in the first pocket of the first and second jamb such that the sash is configured to translate within the first pocket relative to the frame; and a screen assembly operable to extend between the first portion of the frame and the first rail of the sash, the screen assembly including a housing having a first housing member and a second housing member, wherein the housing forms a screen retention space between the first and second housing members when the screen assembly is in a closed position, a pleated screen positioned between the first and second housing members when the screen assembly is in the closed position, wherein the pleated screen includes a first end coupled to the first housing member and a second end coupled to the second housing member, and a catch element configured to releasably engage with the first rail of the sash.

According to another example further to Example 8 ("Example 9"), the fenestration unit further includes end caps positioned at first and second longitudinal ends of the housing.

According to another example further to Example 9 ("Example 10"), the fenestration further includes a wash lock extending from the sash, wherein the catch element is positioned on the end caps, and wherein the wash lock is configured to releasably engage the catch element.

According to another example further to Example 10 ("Example 11"), each of the end caps are positioned in the first pocket of the first and second jambs, respectively.

According to another example further to Example 8 ("Example 12"), the catch element is positioned on the housing such that the housing engages with the first rail of the sash.

According to another example further to Example 8 ("Example 13"), the screen assembly is engaged with the first pocket of the frame.

According to another example further to Example 8 ("Example 14"), the first and second jambs of the frame further include a second pocket, wherein the screen assembly is engaged with the second pocket of the frame.

According to another example further to Example 14 ("Example 15"), a portion of the screen extends out from the housing into the second pocket of the frame.

According to another example further to Example 15 ("Example 16"), the portion of the screen extending out from the housing includes longitudinal slits.

According to another example further to Example 14 ("Example 17"), the fenestration unit further includes an insert couplable to the first portion of the frame to form a recess, wherein the first housing member of the screen assembly is configured to be positioned in the recess formed by the insert and the first portion of the frame.

According to another example further to Example 8 ("Example 18"), the fenestration unit further including a first cord and a second cord extending from the frame and coupled to the housing of the screen assembly, wherein the first and second cords both extend along a shared length of a longitudinal length of the housing.

According to another example further to Example 8 ("Example 19"), the fenestration unit further including: a second sash, wherein the frame includes a second pocket with which the second sash is engaged and in which the second sash is operable to translate relative to the frame; a second screen assembly operable to extend between the second portion of the frame and the second sash.

According to one example ("Example 8"), a method of providing a screen assembly on a fenestration unit is provided, wherein the fenestration unit includes a frame having a first portion, a second portion opposite the first portion, a first jamb extending between the first portion and the second portion, and a second jamb opposite the first jamb and extending between the first portion and the second portion, wherein the first jamb and the second jamb each include a first pocket, and a sash including a first rail, a second rail opposite the first rail, a first stile extending between the first and second rails, and a second stile opposite the first stile and extending between the first and second rails, wherein the first and second stiles are positioned in the first pocket of the first and second jamb such that the sash is configured to translate within the first pocket relative to the frame, the method including: engaging end caps of a screen assembly with the first pocket of the frame; coupling a first housing member of the screen assembly to the first portion of the frame, such that when the sash is translated between an open and a closed position, the second housing member remains positioned with the first portion of the frame; and releasably coupling a second housing member of the screen assembly to the sash of the fenestration unit such that a catch element of the first housing member engages with a wash lock of the sash.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

Figure 1:
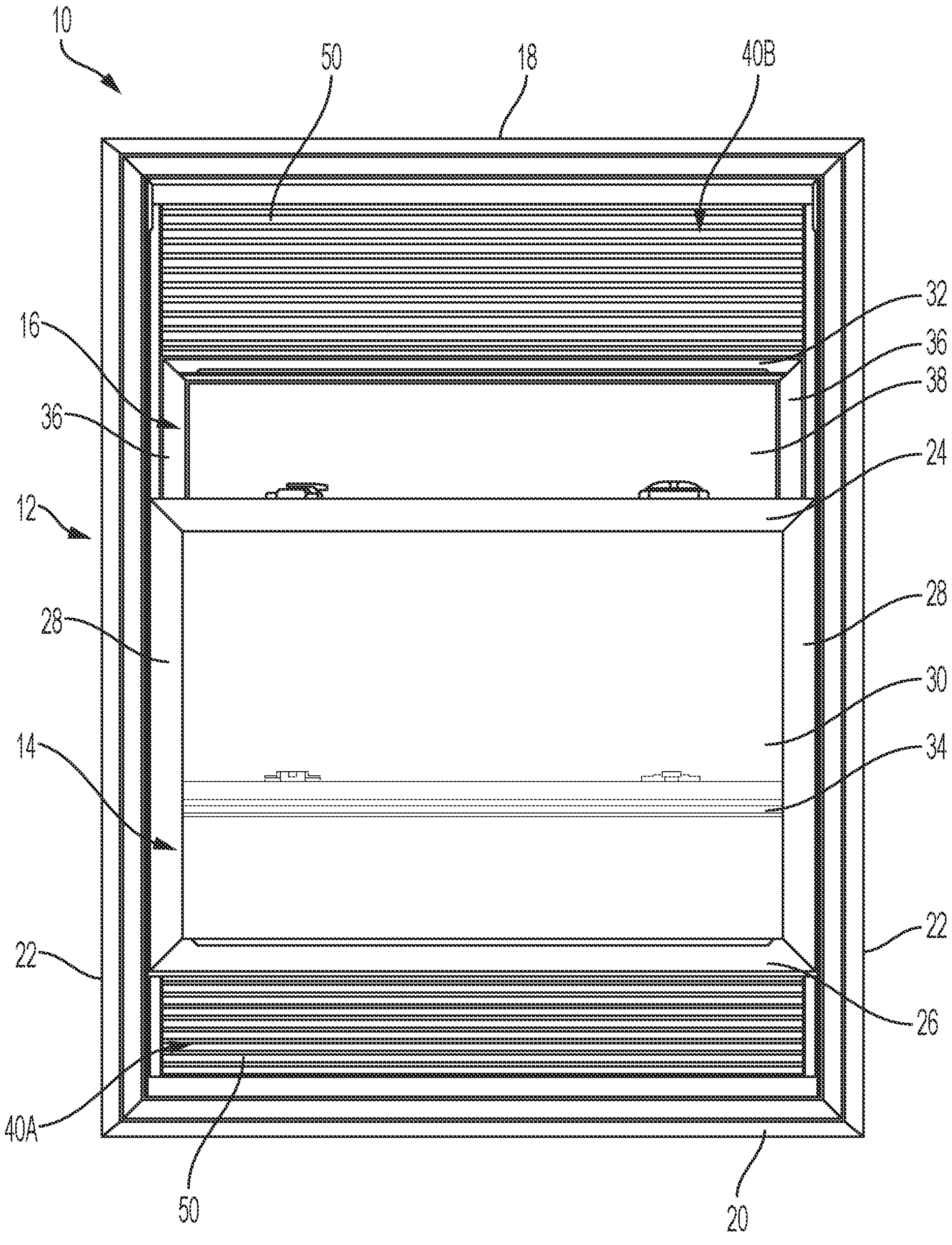
FIG. 1 is a front view of an interior-facing side of a double hung fenestration unit or assembly, according to some embodiments of the disclosure.

While the inventive concepts addressed herein are amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Some inventive concepts provided by this disclosure relate to integrated screen features, enhanced bug sealing between sashes, and others. These inventive concepts are examples only, and further inventive concepts, as well as their advantages and associated functions will be appreciated from this disclosure.

In some examples, fenestration units are provided that allow a user to view through the glazing panels of a fenestration unit without the obstruction of a screen or the like while having the ability to open the fenestration unit and have a screen unit to prevent debris and pests from entering through the fenestration unit. Furthermore, the disclosed device provides the advantage of a retractable screen that does not have a mechanism that pulls the fenestration unit to a closed position if the fenestration unit is slidable with minimum force. Furthermore, the required force to slide the fenestration unit may be maintained at a minimal level because the screen assembly does not exert a force for rehousing or recoiling the screen. Another advantage includes a tighter fit between the screen and the frame during use, thus minimizing the space through which debris and pests may enter through the fenestration unit. Another advantage includes a pleated screen that is released in a relatively flatter configuration so as to minimize obstruction of the view due to pleating. Another advantage includes a screen assembly that may be installed on a new fenestration unit or that may be retrofitted onto an existing fenestration unit.

This disclosure is not meant to be read in a restrictive manner. For example, the terminology used in the application should be read broadly in the context of the meaning those in the field would attribute such terminology. Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top", "bottom", "upper," "lower," "left," "right," "horizontal," "vertical," "upward," and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

FIG. 1 is a front view of an interior-facing side of a fenestration unit 10, also described as a fenestration assembly 10, according to some embodiments of this disclosure. By "interior-facing side" it is meant the side of the fenestration unit that typically faces toward an interior of a building structure into which the fenestration unit is installed. As shown, the fenestration unit 10 is a double-hung window that includes a frame 12, a first sash 14, and a second sash 16. The frame 12 can include a first portion, or head 18, a second portion, or sill 20, and jambs 22. Together, the head 18, the sill 20, and the jambs 22 surround and support the first sash 14 and the second sash 16. The first sash 14 can include an upper rail 24, a lower rail 26, stiles 28, and window pane 30. Together, the upper rail 24, the lower rail 26, and the stiles 28 surround and support the window pane 30. The second sash 16 can include an upper rail 32, a lower rail 34, stiles 36, and window pane 38. Together, the upper rail 32, the lower rail 34, and the stiles 36 surround and support the window pane 38.

As shown in FIG. 1, fenestration unit 10 includes one or more screen assemblies 40, including, for example, a first screen assembly 40A and a second screen assembly 40B. Each of the screen assemblies 40A, 40B include a screen 50 that is operable extend across openings formed when sashes 14, 16 are opened on the fenestration unit 10. The first screen assembly 40A can extend between the sill 20 and the lower rail 34 of the second sash 16. The second screen assembly 40B can extend between the head 18 and the upper rail 24 of the first sash 14. In FIG. 1, the first sash 14 and the second sash 16 are both shown in open configurations. That is, the first sash 14 is not in contact with the sill 20 and the second sash 16 is not in contact with the head 18. It will be understood that a fenestration unit 10 may include any number of screen assemblies 40 as appropriate in specific embodiments (e.g., a single hung fenestration unit may include a single screen assembly 40).

Figure 2:
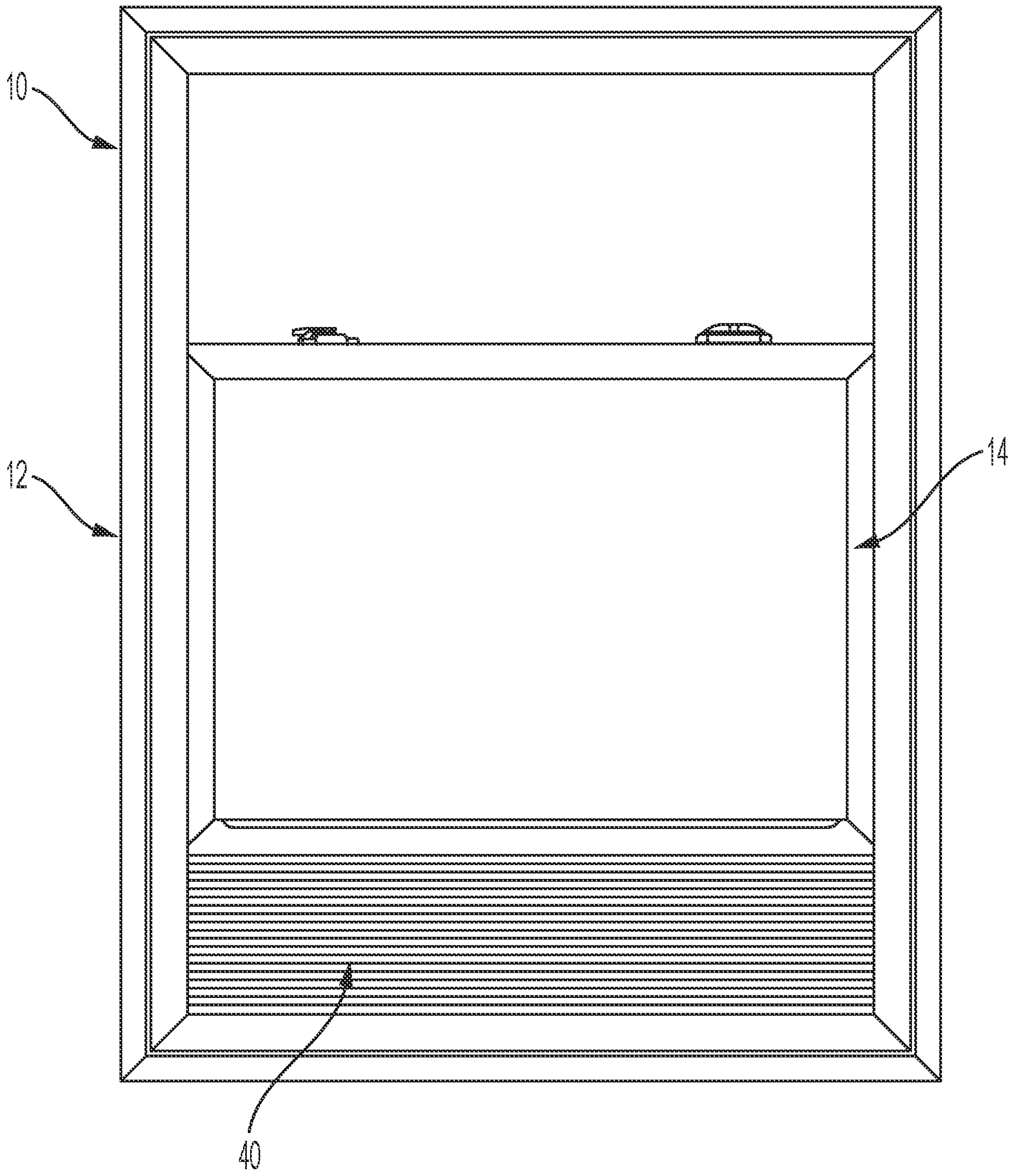
FIG. 2 is a front view of an interior-facing side of a single hung fenestration unit, according to some embodiments of the disclosure.

FIG. 2 shows an embodiment of a fenestration unit 10 similar to that of FIG. 1, where FIG. 1 depicts a double hung fenestration unit and FIG. 2 depicts a single hung fenestration unit. It is within the scope of the disclosure that various types of fenestration units may be implemented in conjunction with screen assemblies (e.g., single hung, double hung, and sliding fenestration units). As a primary difference, the fenestration unit of FIG. 2 is not shown to include both the first screen assembly 40A and second screen assembly 40B of FIG. 1, but instead is shown with a single screen assembly 40 as only a single, venting sash is included in the single hung configuration of FIG. 2.

Figure 3:
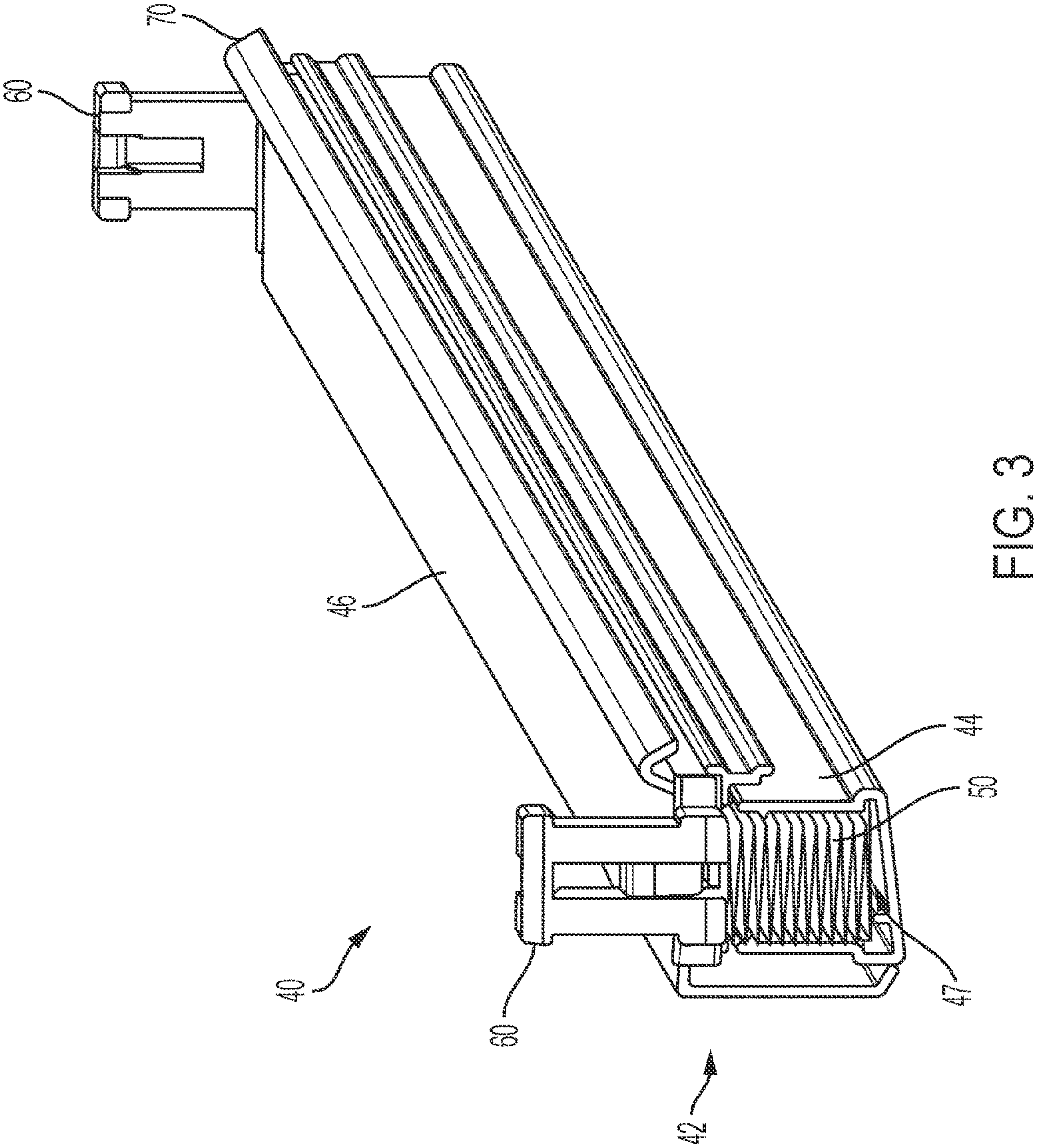
FIG. 3 is a perspective view of a screen assembly, according to some embodiments of the disclosure.
Figure 4:
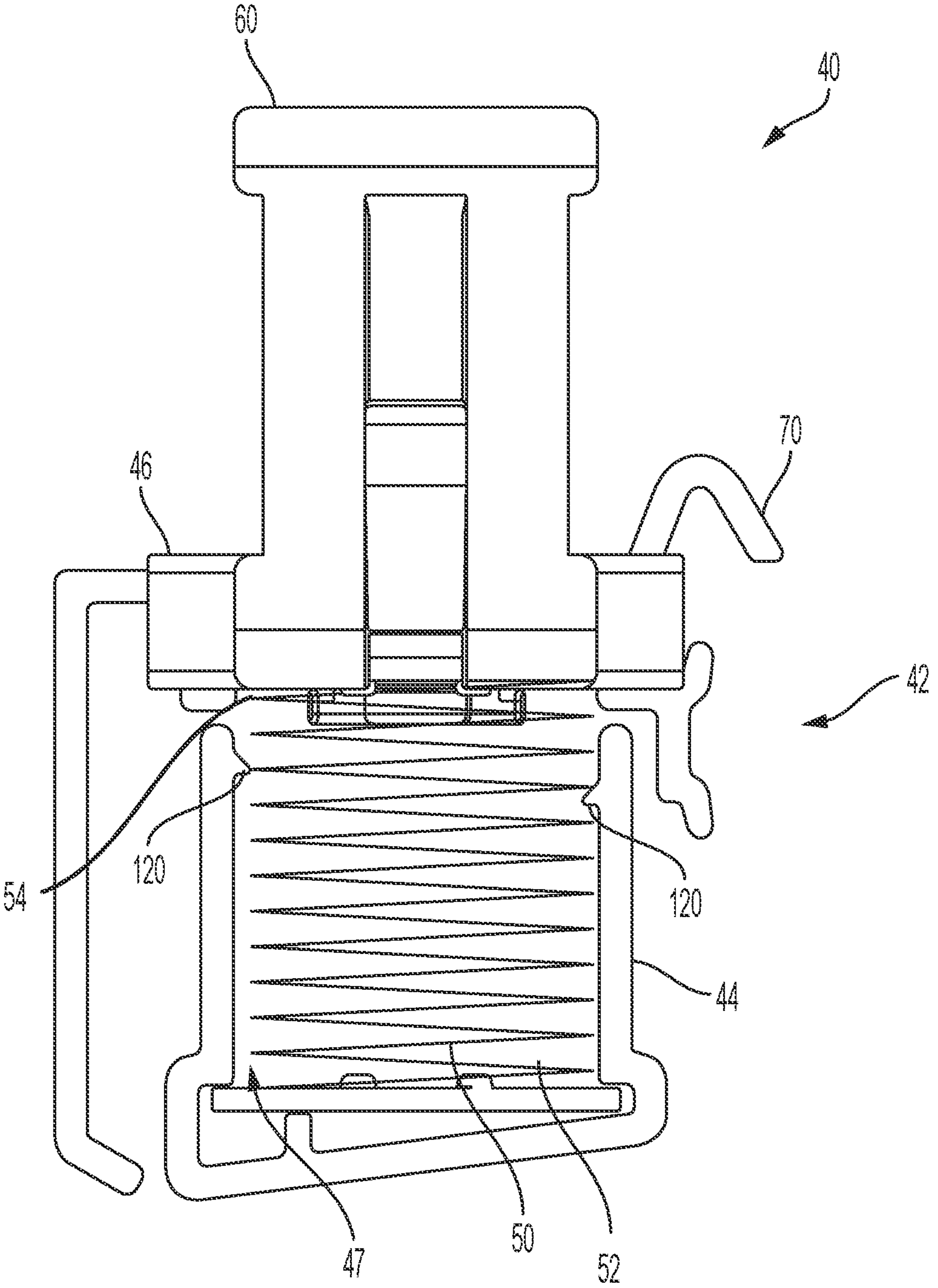
FIG. 4 is a side view of the screen assembly of FIG. 3, according to some embodiments of the disclosure.
Figure 16:
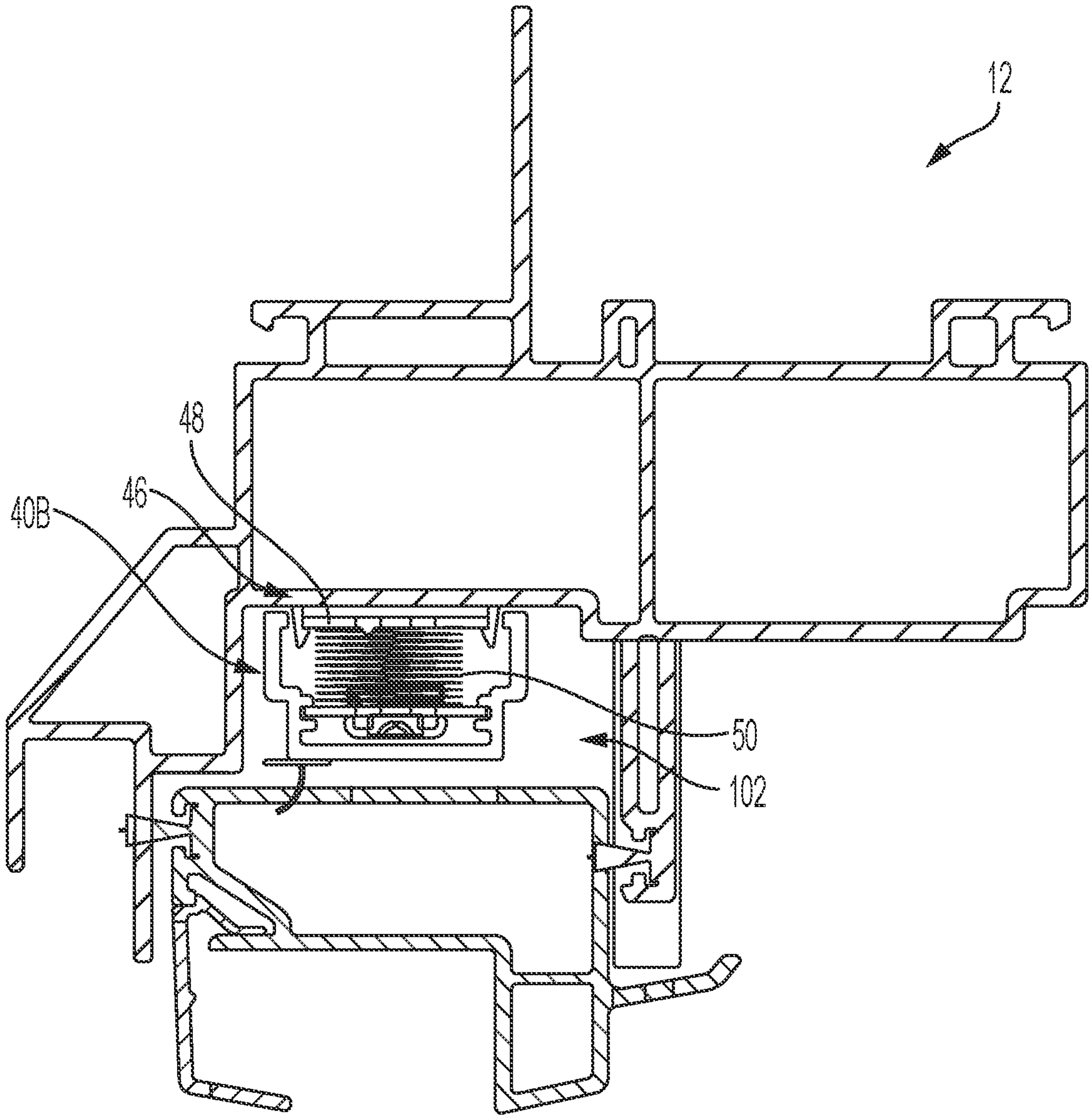
FIG. 16 is a side, sectional view of a screen assembly engaged with a sash where the screen assembly and the sash are positioned and operate within the same plane as defined by the direction of movement of the components, according to some embodiments of the disclosure.

FIGS. 3 and 4 show a screen assembly 40 according to some embodiments. As shown, the screen assembly 40 includes a housing 42 having a first housing member 44 and a second housing member 46. The first and/or second housing members 44, 46 may form a screen retention space 47 operable to retain a screen 50. For example, the first housing member 44 includes a screen retention space 47 in which the screen is retained when the fenestration unit 10 is in a closed configuration. The second housing member 46 acts as a cover for the screen retention space 47 when the fenestration unit 10 is in a closed configuration (e.g., as seen in FIG. 4). As shown, in various examples, the screen 50 is positioned substantially inside of the housing 42 when the housing is in a closed position, or in alternative terms the screen 50 is enclosed within the housing 42 when the housing is in the closed position. The screen 50 may be disposed in the housing 42 such that screen 50 is pleated or folded. The screen 50 (e.g., pleated screen) includes a first end 52 coupled to the first housing member 44 and a second end 54 coupled to the second housing member 46. The screen 50 may be coupled to the housing 42 via various coupling mechanisms (e.g., plastic welding, sewing, mechanical fasteners, etc.). In some embodiments, the screen is coupled to an intermediate member 48 which may then be coupled to the housing 42 (e.g., as seen in FIG. 16).

In some embodiments, the screen assembly 40 includes end caps 60 that facilitate positioning of the screen assembly 40 as part of the fenestration unit 10. The end caps 60 may serve various functions which will be described hereafter. The end caps 60, according to some embodiments, are positioned on the housing 42 of the screen assembly (e.g., at the longitudinal ends of the either the first or second housing members 44, 46).

Because the screen 50 is configured to extend across openings when the sashes 14, 16 of the fenestration unit 10 are opened, at least a portion of the screen assembly 40 may be coupled to one of the sashes 14, 16 and at least a portion of the screen assembly 40 may be coupled to the frame 12 of the fenestration unit 10 (e.g., as shown the first housing member 44 is coupled to the sash 14 and the second housing member 46 is coupled to the frame 12). In some embodiments, the screen assembly 40 is coupled to the sash 14, 16 via the end caps 60 (see, e.g., FIGS. 7 and 18) and in other embodiments the screen assembly 40 includes a coupling member 70 for engaging the sashes 14, 16 during opening and closing of one of the sashes 14, 16 (see, e.g., FIGS. 5 and 10). In some embodiments, the coupling member 70 optionally engages with one of the sashes 14, 16 such that the coupling member 70 and the screen assembly 40 generally can be disengaged from the sash 14, 16. In some embodiments, the coupling member 70 may be integrated onto the end caps 60 or the coupling member 70 may extend from the first or second housing member 44, 46. It will be understood that the coupling member 70 can help facilitate engagement and coupling of the screen assembly 40 with one of the sashes 14, 16.

Figure 5A:
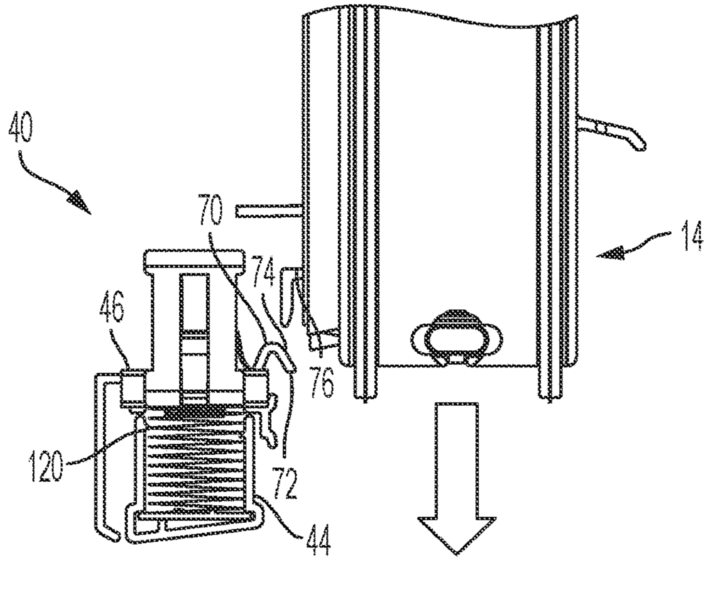
FIGS. 5A-5C are side views of a screen assembly having a coupling member and a sash that is being engaged by the coupling member, according to some embodiments of the disclosure.
Figure 5B:
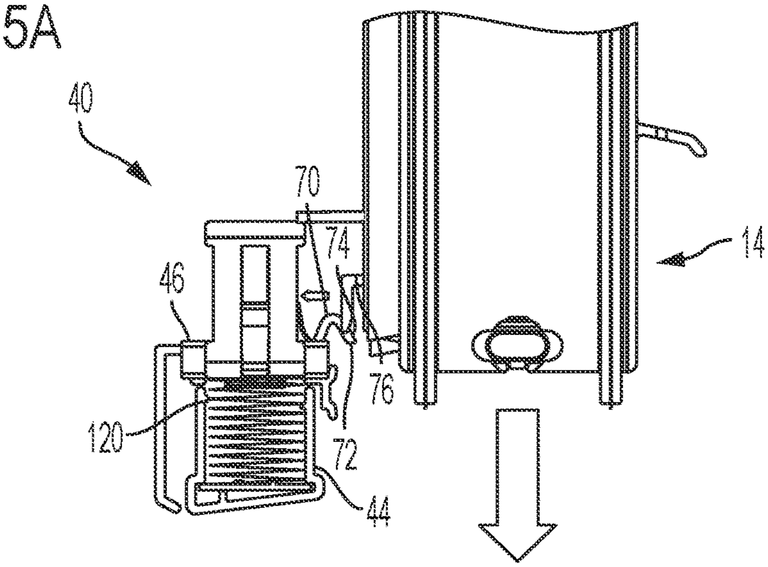
Figure 5C:
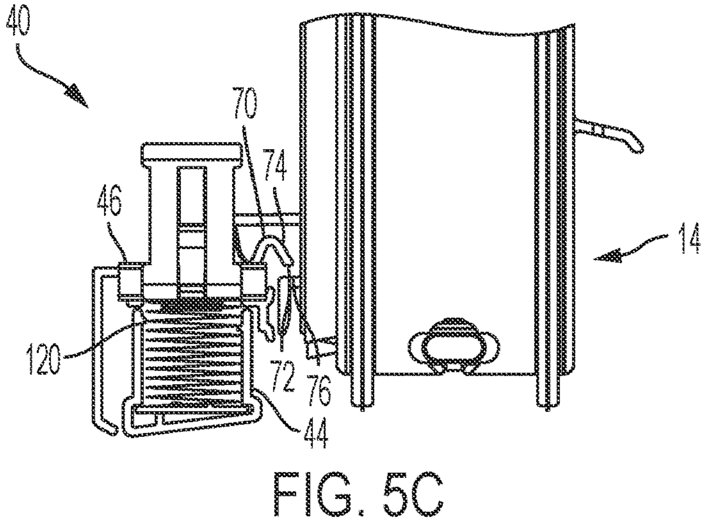

Referring now to FIGS. 5A-5C, an embodiment of a screen assembly 40 is provided in which a screen assembly 40 includes a first housing member 44 and a second housing member 46 having a coupling member 70 extending therefrom. The coupling member 70, in this embodiment, includes an engaging surface 72 and a deflecting surface 74. The engaging surface 72 is operable to engage one of the sashes 14, 16 such that when the corresponding sash 14 or 16 is moved to an open position, the second housing member 46 is also translated to an at least partially deployed position. In some embodiments, the corresponding sash 14 or 16 includes an engaging surface receiver 76 for establishing and maintaining contact between the screen assembly 40 and one of the sashes 14 or 16. The screen assembly 40 is optionally able to be disengaged from one of the sashes 14, 16. For example, when the screen assembly 40 (e.g., first screen assembly 40A or second screen assembly 40B) is optionally disengaged from one of the sashes 14, 16 (which will be discussed in relation to FIGS. 13 and 14), the screen assembly 40 and the sash 14 or 16 may be reengaged by arranging the engaging surface 72 of the coupling member 70 against the engaging surface receiver 76 of the sash 14 or 16. This may be done manually (e.g., by pulling directly on the screen assembly 40), or the corresponding sash 14 or 16 may be translated toward the screen assembly 40 until the engaging surface receiver 76 contacts the deflecting surface 74. Once the engaging surface receiver 76 and the deflecting surface 74 are in contact, the engaging surface receiver 76 may be pushed against the deflecting surface 74 such that the coupling member 70 deflects away from a neutral position to allow the engaging surface receiver 76 to travel past the coupling member 70. Once the engaging surface receiver 76 has cleared the coupling member 70, the coupling member 70 returns to a neutral position, which allows for the engaging surface 72 of the coupling member 70 to engage with the engaging surface receiver 76 of one of the sashes 14, 16. It will be noted that the coupling member 70 may include multiple members spaced along the longitudinal length of the screen assembly 40, or it may be a single member positioned along at least a portion of the longitudinal length of the screen assembly 40.

Figure 6:
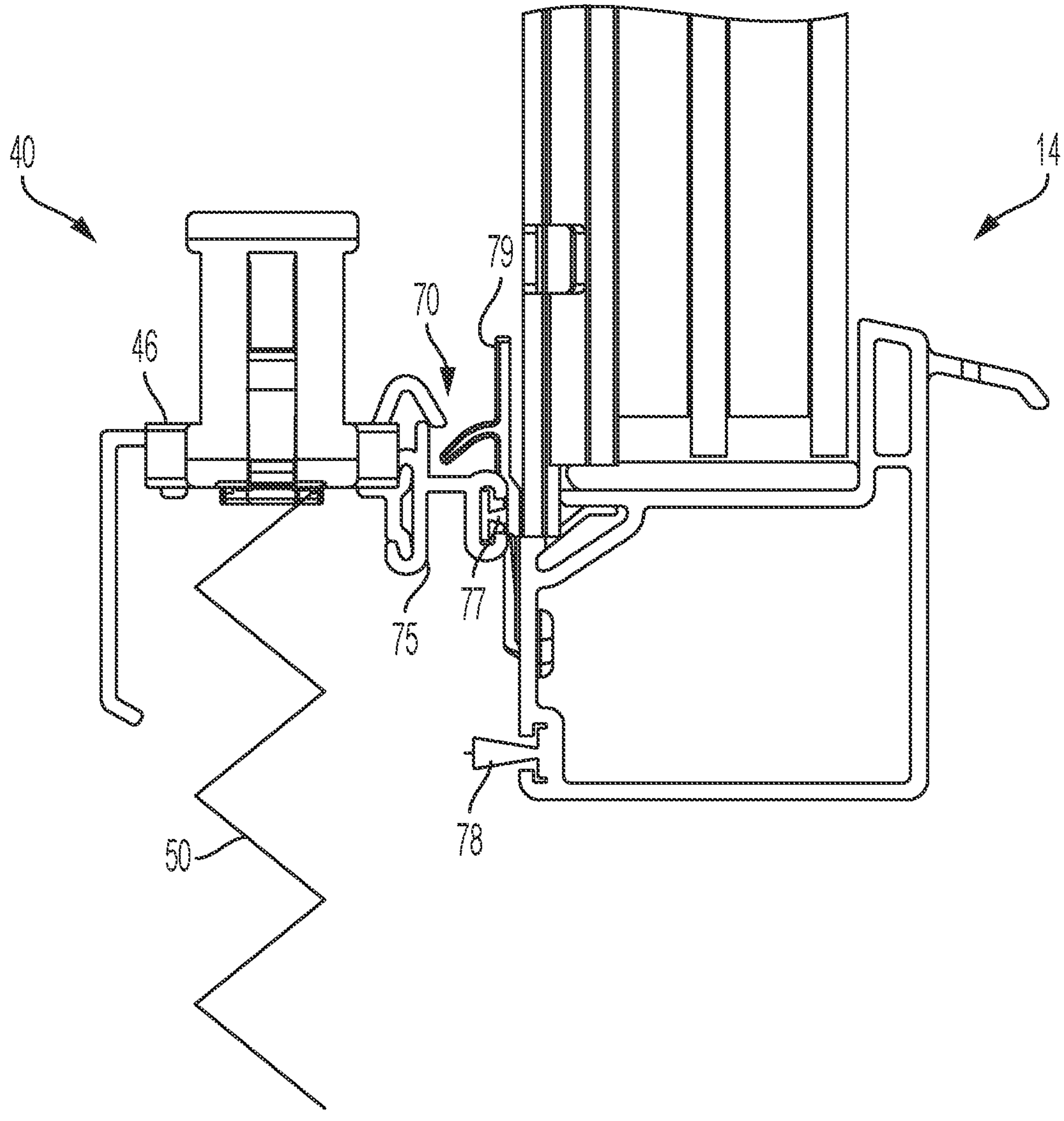
FIG. 6 is a side view of a screen assembly having a coupling member with an engagement portion and a sash that is engaged by the coupling member, according to some embodiments of the disclosure.

Referring now to FIG. 6, in an alternative embodiment of a coupling member 70 extending from the screen assembly 40 is provided in which the coupling member 70 is operable to interface with a respective sash 14 or 16. The coupling member 70, in the embodiment shown in FIG. 6, includes an engagement portion 75, the engagement portion operable to engage with the respective sash 14 or 16. For example, the engagement portion 75 may include a weather stripping 77 (e.g., a moisture deflector) which is positioned against the first sash 14. The weather stripping 77 is operable to prevent debris, moisture, and/or pests from entering the fenestration unit 10 between the screen assembly 40 and the first sash 14. Furthermore, the weather stripping 77 is positioned against the first sash 14 such that sufficient friction is present between the weather stripping 77 and the first sash 14, such that the second housing member 46 of the screen assembly 40 substantially follows the movement of the first sash 14 when the first sash 14 is transitioned to various positions within the fenestration unit 10. In some embodiments, the sash 14 or 16, may include a stopping member 79 which is operable to interfere with the second housing member 46 of the screen assembly 40, when the second housing member 46 travels towards a center portion of the sash 14 or 16. Thus, the stopping member 79 limits movement of the second housing member 46 relative to the associated sash 14 or 16 such that the second housing member 46 and the screen 50 do not obscure the view through the glazing panels of the sash 14 or 16.

In some embodiments, the sash 14 or 16 may include a second weather strip 78 positioned distal from the stopping member 79, such that the second weather strip 78 is positioned nearer the edge of the sash 14 or 16 relative to the stopping member 79. Thus, the engagement portion 75 and specifically the first weather stripping 77 may be positioned laterally between the stopping member 79 and the second weather strip 78 relative to the sash 14 or 16. In some embodiments, the two weather strips 77, 78 interfere with one another such that the engagement portion 75 engages with and does not travel past the second weather stripping 78. However, upon application of sufficient force, the engagement portion 75 is able to travel past the second weather stripping 78, thus disengaging the second housing member 46 from the sash 14 or 16. This allows for the screen assembly 40 to be disengaged from the sash 14 or 16 to allow for an unrestricted or unobstructed opening of the fenestration unit 10 if desired. In order to achieve sufficient force to disengage the sash 14 or 16 and the screen assembly 40, stops (not shown) may be positioned on the fenestration unit 10 that restrict travel of the second housing member 46 of the screen assembly 40 beyond a predetermined position, such that if the sash 14 or 16 is forced to travel beyond that predetermined position, the second housing member 46 and the sash 14 or 16 disengage. To re-engage the screen assembly 40 and the sash 14 or 16, the sash 14 or 16 may be transitioned to a closed position and sufficient force is applied to the sash such that the engagement portion 75 is able to travel past the second weather stripping 78.

Figure 7:
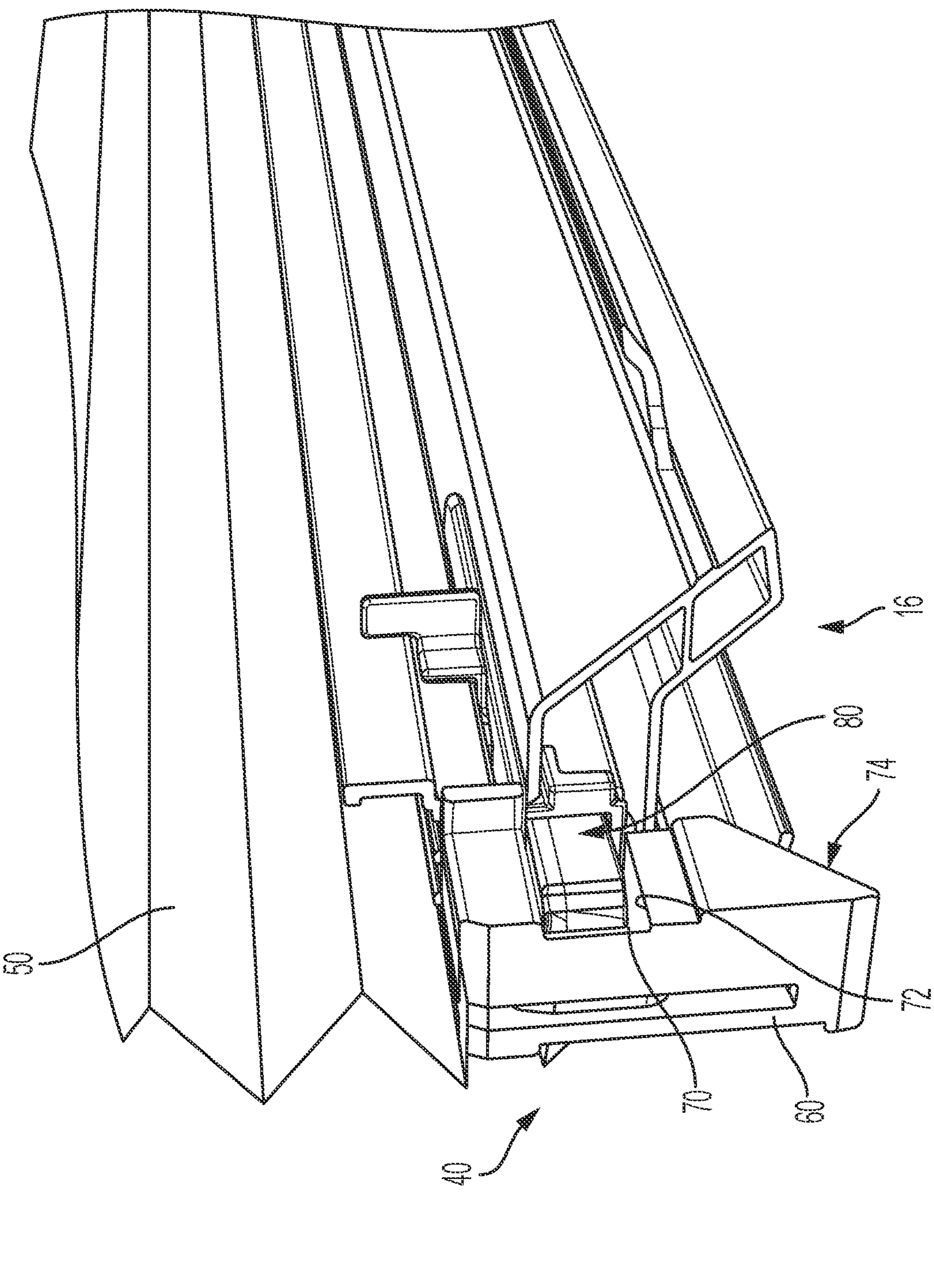
FIG. 7 is a perspective view of a screen assembly and a sash including a wash lock for engaging the screen assembly, according to some embodiments of the disclosure.

Referring now to FIG. 7, one embodiment of the screen assembly 40 is shown in connection with the sash 16 (where the vertical members are hidden) and includes that the coupling member 70 is defined on the end caps 60. The end caps 60 may similarly include an engaging surface 72 and a deflecting surface 74. The engaging surface 72 and deflecting surface 74 of the coupling member 70 of the end caps 60 are operable to engage with a wash lock 80 of one of the sashes 14, 16. A wash lock 80 may be generally be provided in some embodiments of the present disclosure for allowing a sash 14 or 16 or a portion of a sash 14 or 16 to be removed from the fenestration unit 10. The wash lock 80 may allow the sash 14 or 16 to disengage at least partially such that the sash can be rotated away for cleaning, replacement, repair, or otherwise. The wash lock 80, as seen in FIG. 7, may extend from the longitudinal ends of the sashes 14, 16. When the engaging surface 72 is engaged with the wash lock 80, the corresponding sash 14 or 16 may be moved to an open position which results in the second housing member 46 also being translated to an at least partially deployed position.

In various examples, the screen assembly 40 may be disengaged from the sash 14 or 16 by articulating the wash lock 80 such that the coupling member 70 is able to travel past the wash lock 80. To reengage the coupling member 70 with the wash lock 80, the wash lock may be manually articulated such that the coupling member 70 can be positioned to contact the wash lock 80 is returned to an extended position. Furthermore, the coupling member 70 and the wash lock 80 may be reengaged by translating the corresponding sash 14 or 16 toward the screen assembly 40 until wash lock 80 contacts the deflecting surface 74. Once the wash lock 80 and the deflecting surface 74 are in contact, the wash lock 80 may be pushed against the deflecting surface 74 such that the wash lock 80 is articulated inward to allow the wash lock 80 to travel past the deflecting surface 74 of the end caps 60. Once the wash lock 80 has cleared the deflecting surface, the wash lock 80 returns to a neutral position, which allows for the engaging surface 72 of the coupling member 70 to engage with the wash lock 80 one of the sashes 14, 16. It will be understood that the coupling member 70 discussed with reference to FIG. 7 may also be included directly on one of the first or second housing members 44, 46 such that the wash lock 80 engages with the coupling member 70 on the first or second housing member.

It will be understood that the various examples of the coupling member 70 may be implemented in various embodiments and configurations, for example, with double-hung fenestration units, single-hung fenestration units, and sliding fenestration units, regardless of orientation, including horizontal and vertical.

Figure 8C:
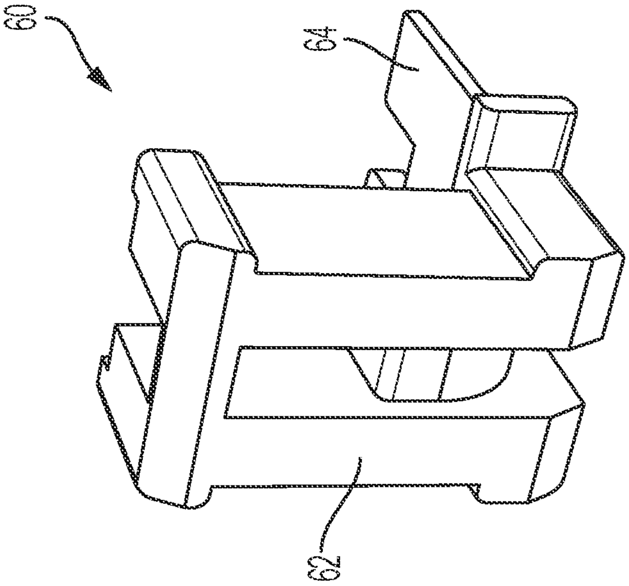
FIGS. 8A-8C are front, side, and perspective views of an end cap, according to some embodiments of the disclosure.
Figure 8B:
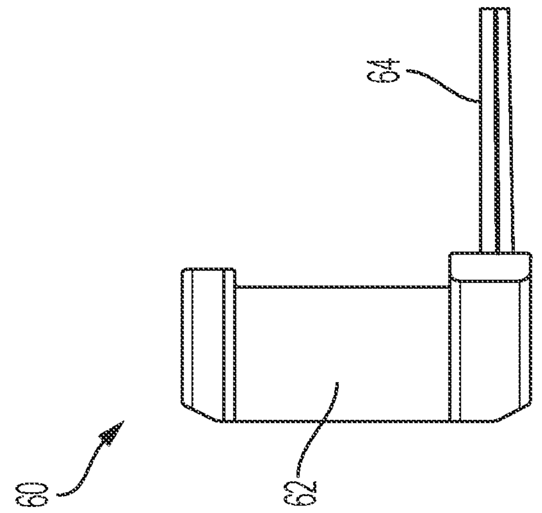
Figure 8A:
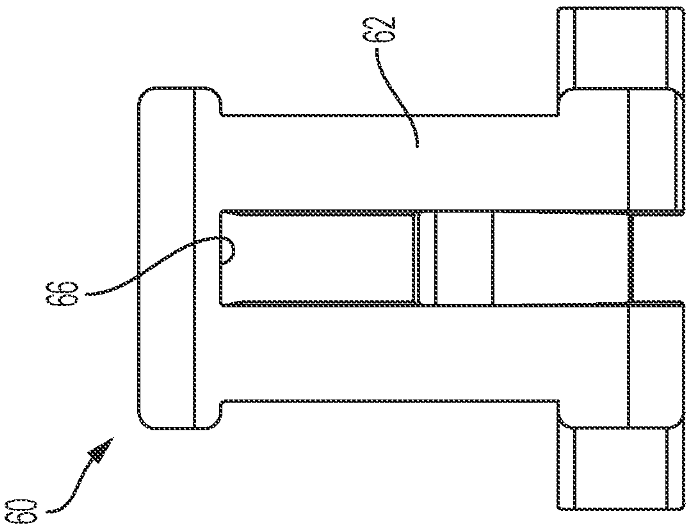
Figure 18:
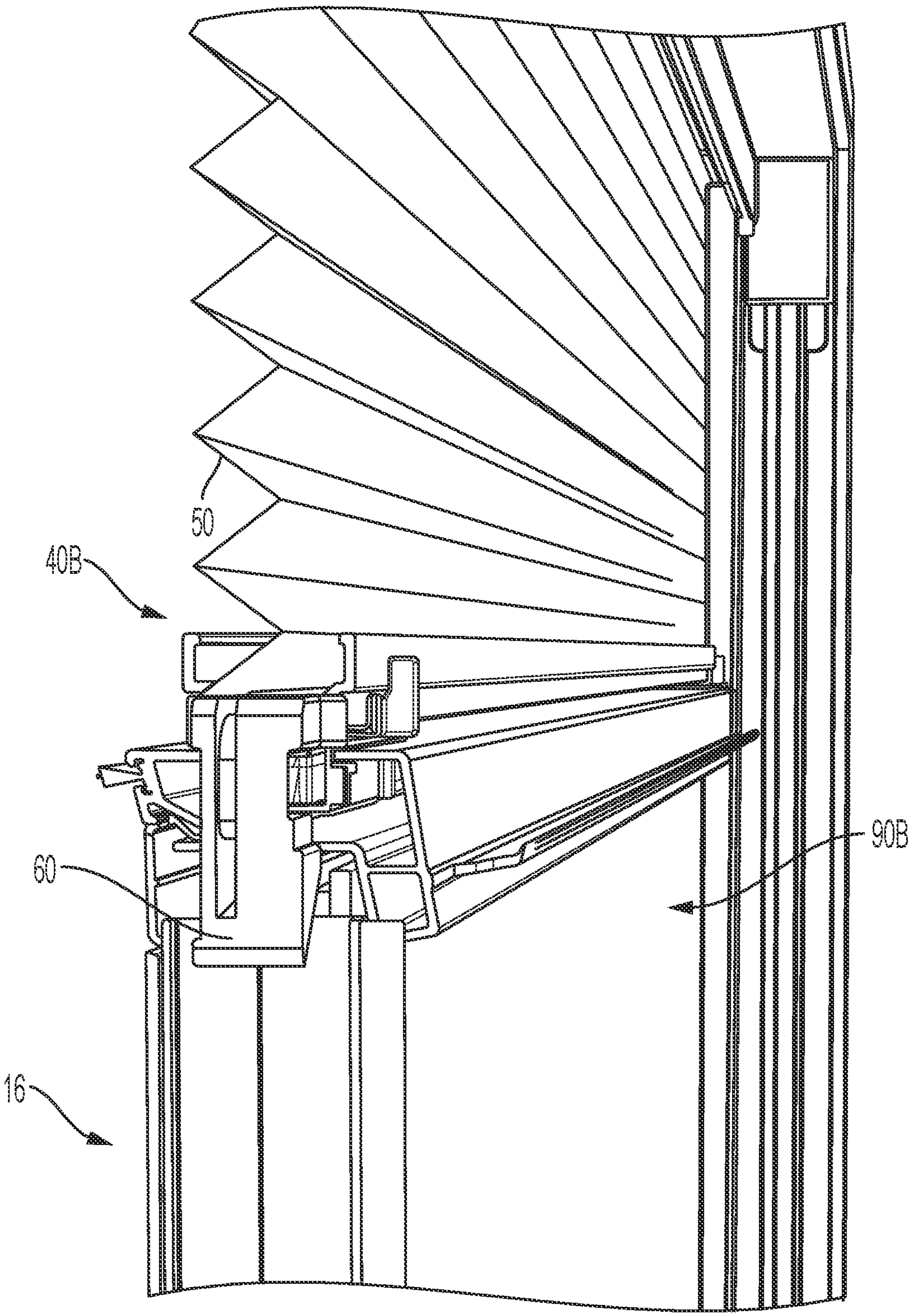
FIG. 18 is a perspective view of a portion of a fenestration unit, with a jamb of the fenestration unit hidden from view to show a partially deployed screen assembly coupled to a sash within the same plane as defined by the pocket, according to some embodiments of the disclosure.
Figure 20:
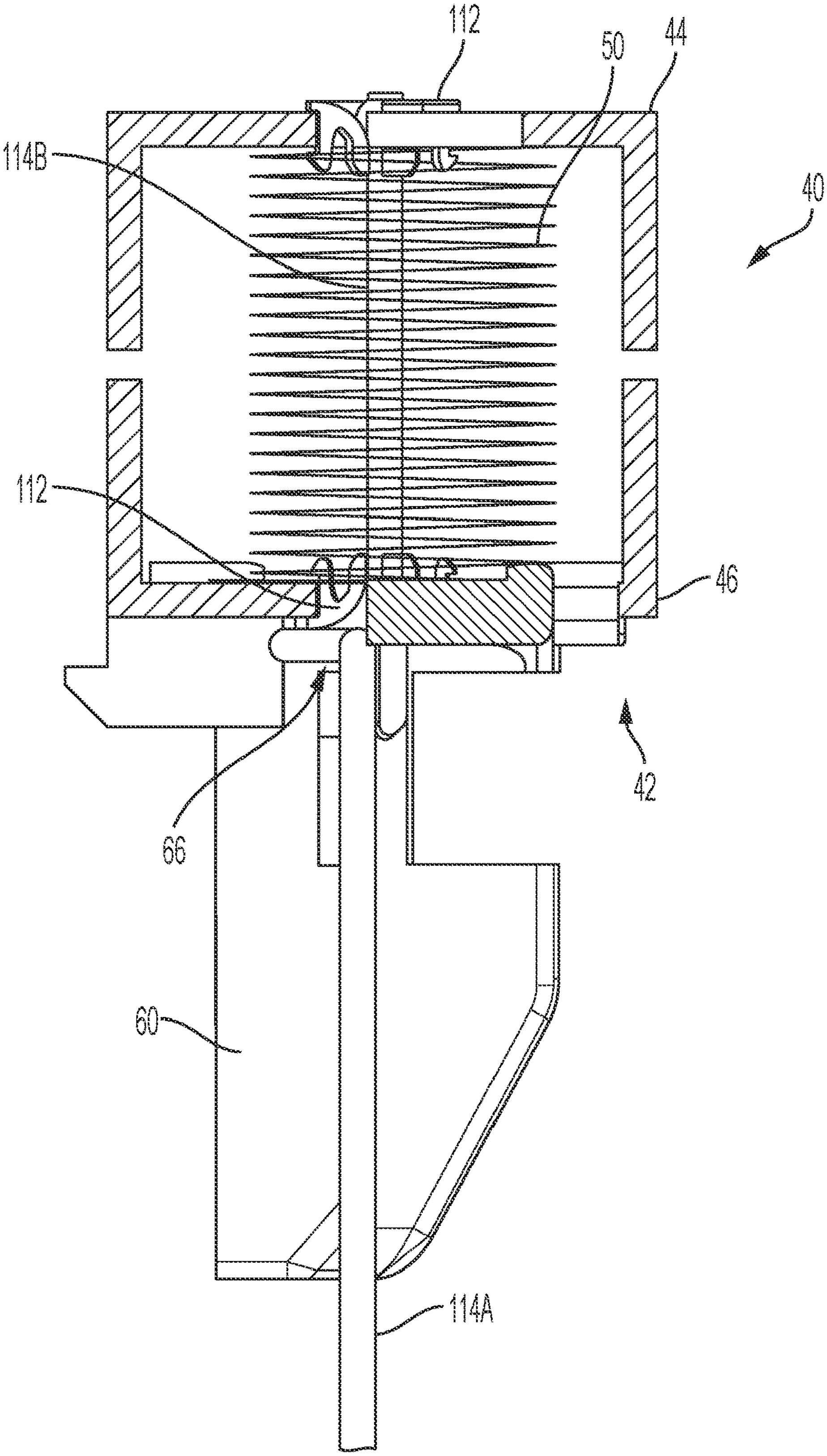
FIG. 20 is a side view of a screen assembly including cords used to support deployment of the screen assembly, according to some embodiments.
Figure 21:
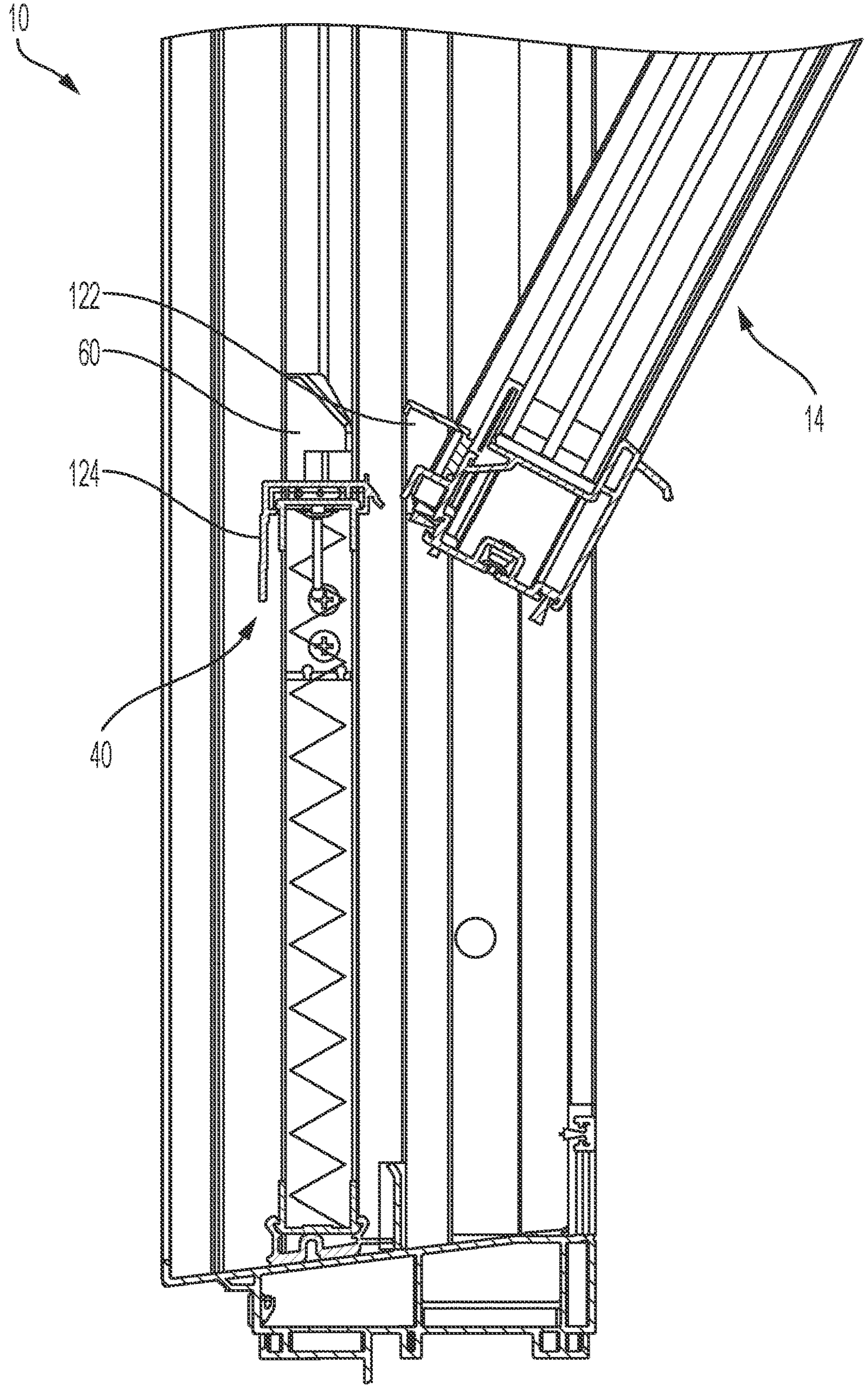
FIG. 21 is a side, sectional view of a screen assembly and a sash including one embodiment of an end cap and various guards and watersheds, according to some embodiments.
Figure 22:
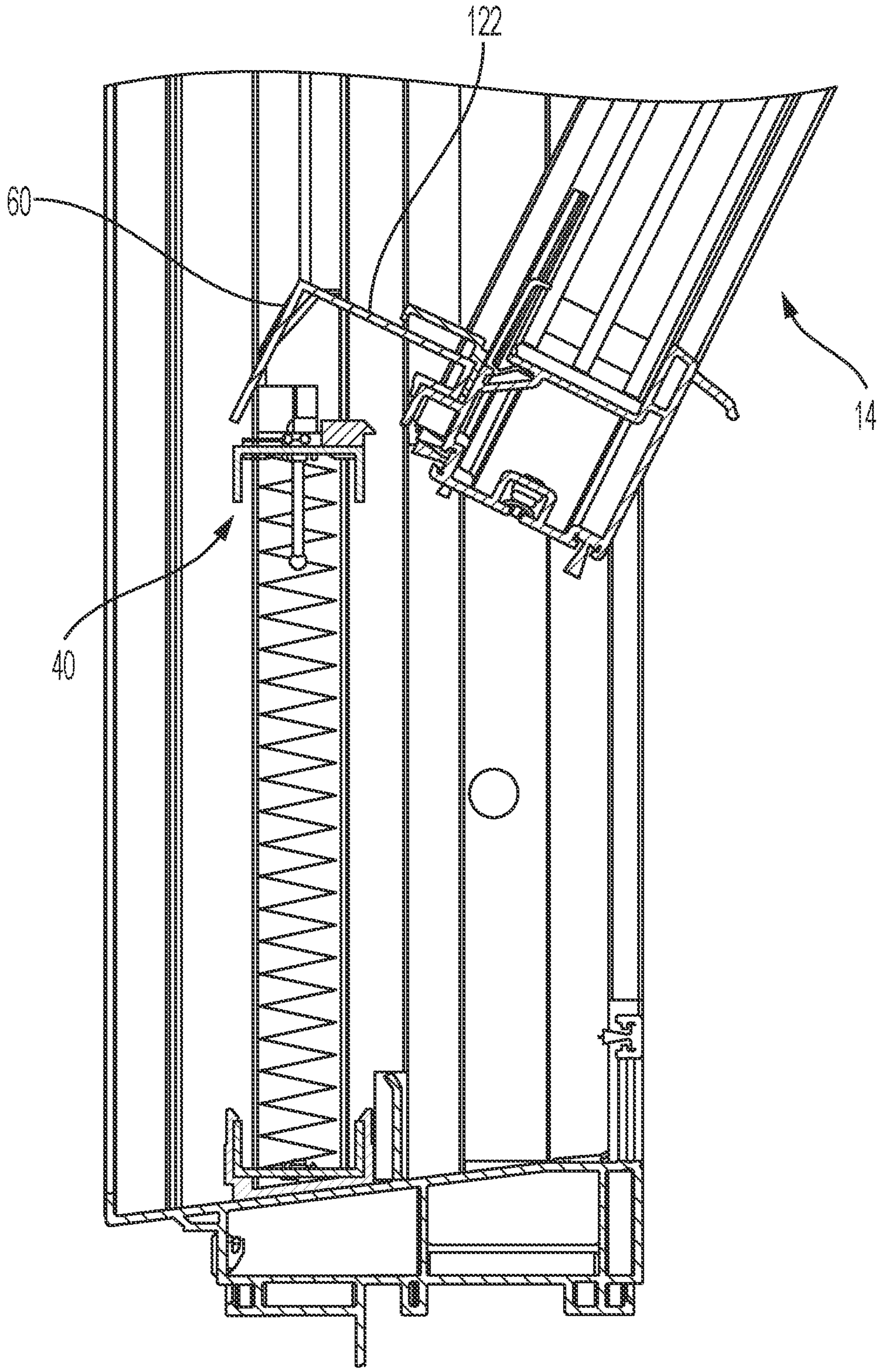
FIG. 22 is a side, sectional view of a screen assembly and a sash including another embodiment of an end cap and various guards and watersheds, according to some embodiments.
Figure 23:
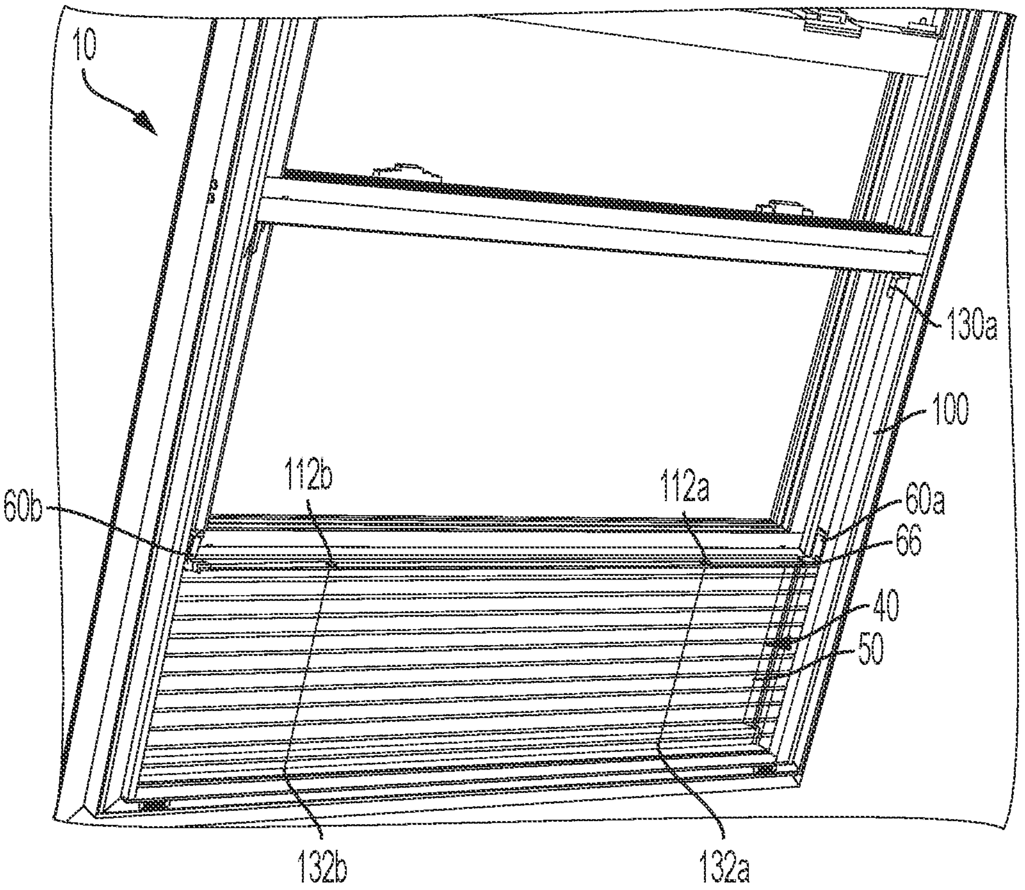
FIG. 23 is a perspective view of a cord routing system, according to some embodiments.

Turning now to a discussion of an embodiment of the end caps 60, FIGS. 8A-8C provide an exemplary embodiment of an end cap 60 although other embodiments may be implemented as seen in FIGS. 7 and 18 or as seen in FIGS. 20-22. Each end cap 60 includes a body 62 and a coupling portion 64 extending from the body 62. The coupling portion 64 is operably to couple to either the first or second housing member 44 or 46. The end caps 60 include a gliding surface 66 which allows for cords (which will be discussed hereafter) to transition directions at a predefined angle. For example, the gliding surface 66 may permit a cord to transition from a vertical orientation to a horizontal orientation or from a horizontal orientation to a vertical orientation at the end caps 60.

Figure 9:
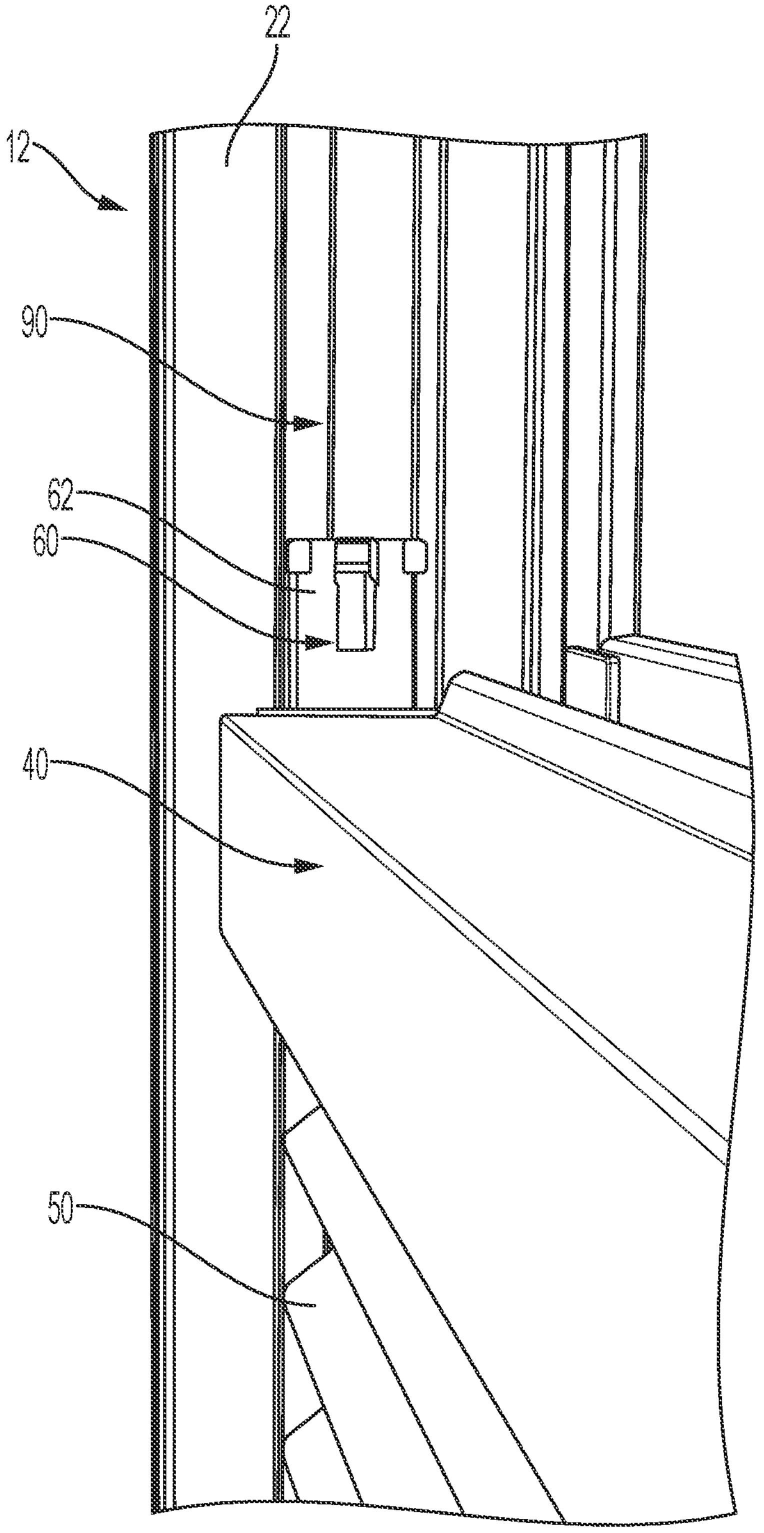
FIG. 9 is a perspective view of a portion of a fenestration unit showing an example of how the screen assembly engages with a pocket of the frame via the endcaps of the screen assembly, according to some embodiments of the disclosure.

When the end caps 60 are installed on the screen assembly 40, the screen assembly 40 may be installed with the frame 12 of the fenestration unit 10. Referring to FIG. 9, the end caps 60 may be positioned in the pockets 90 of the frame 12. In general, the pockets 90 may be formed in the frame 12 of the fenestration unit 10 in order to receive the sashes 14,16, and specifically the stiles of the sashes 14, 16, such that the sashes 14,16 may be operable to translate within the pockets 90 when opened and closed. More specifically, the pockets 90 may define a recess in the jambs 22 of the frame 12. It will be understood that any number of pockets 90 may be formed in the frame 12. The body 62 of each of the end caps 60 is operable to be positioned in the pockets 90 such that the end caps 60 are rotationally constrained and are operable to travel along the length of the corresponding pocket 90. In some embodiments, the body 62 of each of the end caps 60 is elongated in order to provide enhanced rotational stability. Thus, when a screen assembly 40 is engages with one of the sashes 14, 16, and the corresponding sash 14 or 16 is opened, the end caps 60 are operable to travel within the pockets 90, thus allowing the screen 50 to be at least partially deployed.

Figure 10:
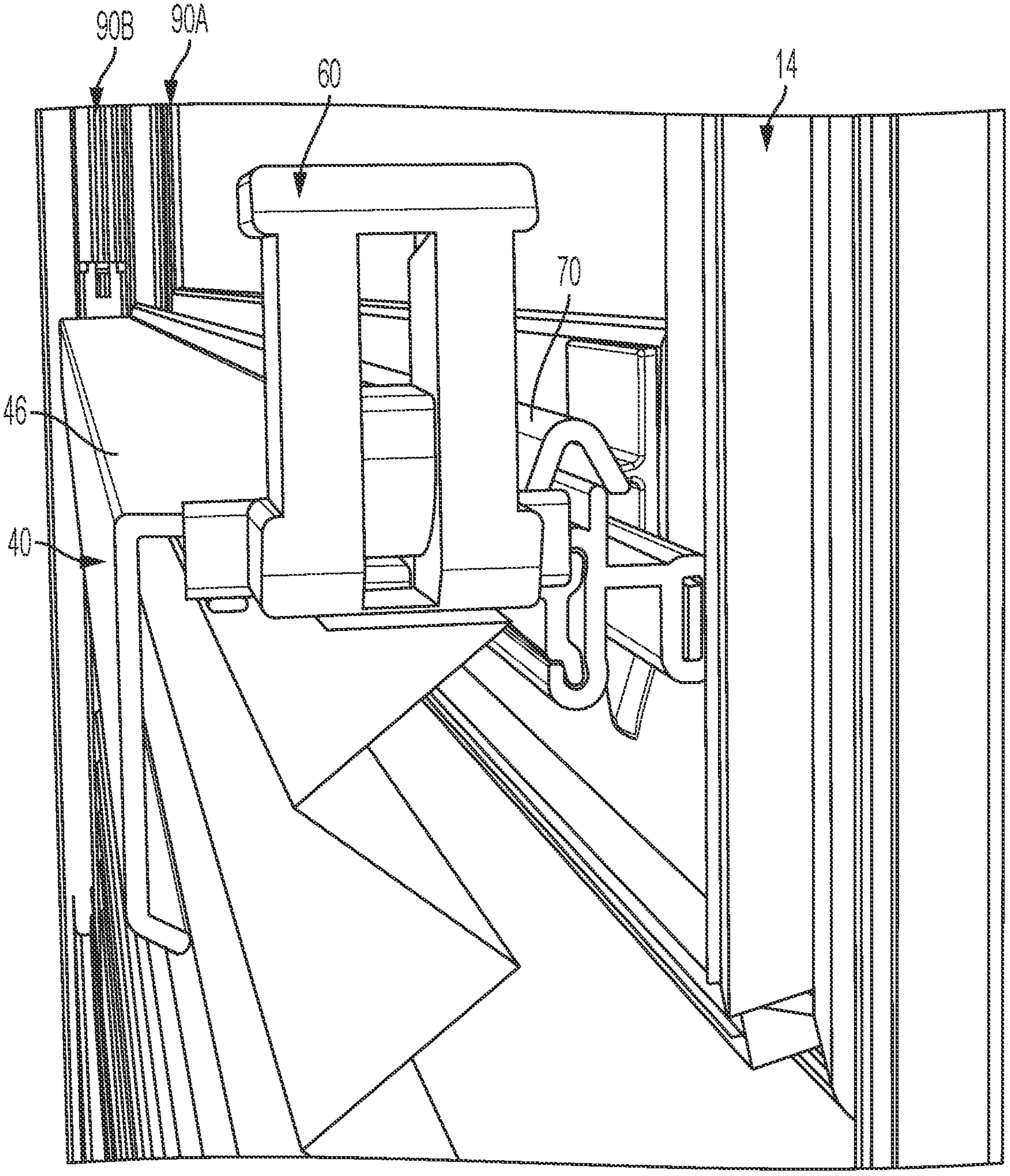
FIG. 10 is a perspective view of a portion of the fenestration unit showing an example of how the screen assembly is engaged with a sash via a coupling member and engaged with a pocket of the frame via the endcaps of the screen assembly, wherein the screen is at least partially deployed, according to some embodiments of the disclosure.

Referring now to FIG. 10, in those embodiments in which the coupling member 70 extends from the first or second housing member 44 or 46, the end caps 60 of the screen assembly 40 may be positioned in second pocket 90B and the corresponding sash 14 or 16 with which the screen assembly 40 is engaged may be positioned partially within the first pocket 90A. Thus, in some embodiments, the screen assembly 40 may be offset from the corresponding sash 14 or 16, meaning the screen assembly is set in a first plane defined by the first pocket 90A and the corresponding sash 14 or 16 is set in a second plane defined by the second pocket 90B. However, the disclosure is not limited to including a screen assembly 40 offset from the corresponding sash 14 or 16. In some embodiments, the screen assembly 40 is positioned in the same plane as the corresponding sash 14 or 16, where the plane is defined by the pocket 90, as seen in FIGS. 7 and 16-18.

Figure 11:
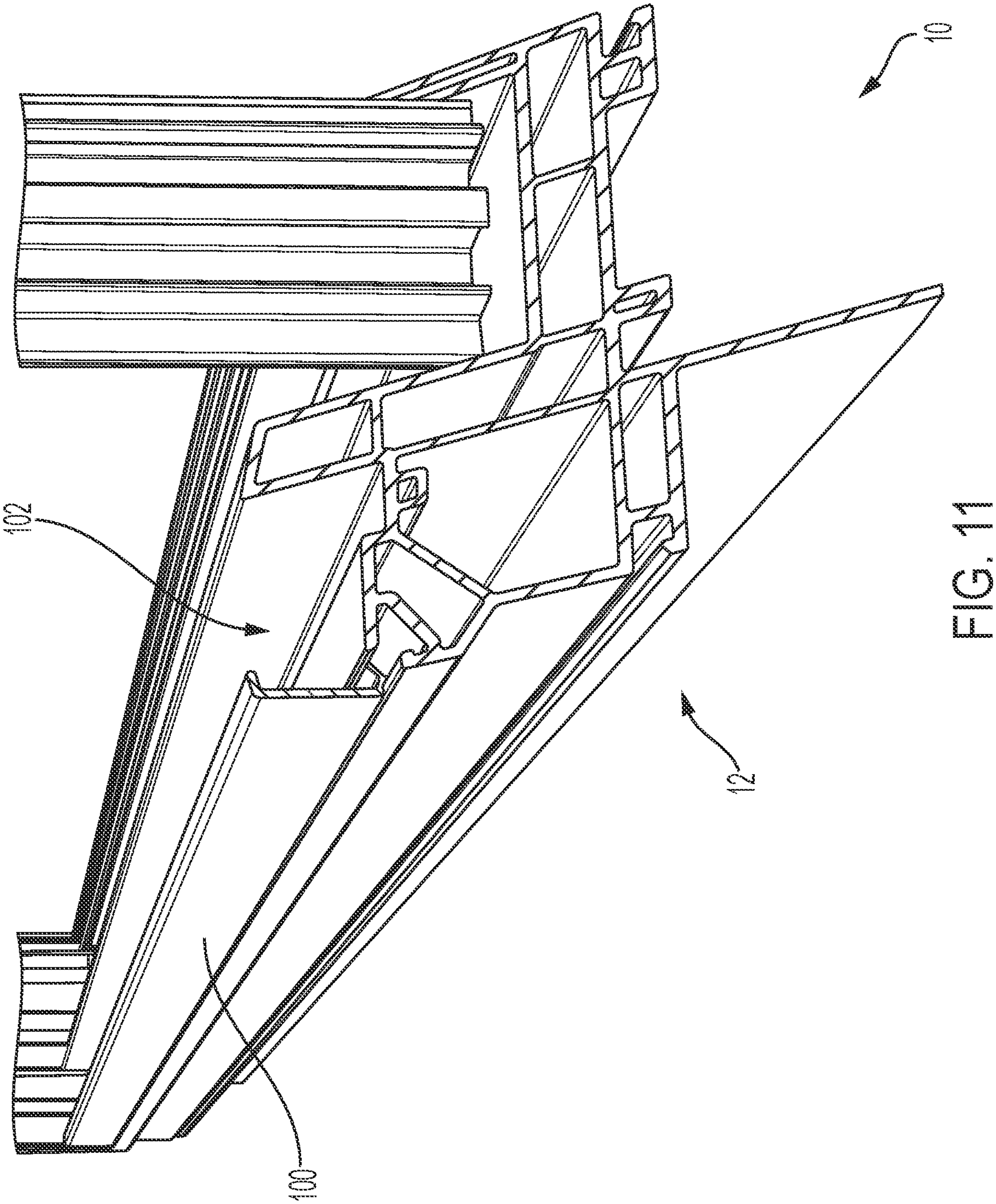
FIG. 11 is a side view of a portion of a frame including an insert used to form a screen assembly recess, according to some embodiments of the disclosure.
Figure 12:
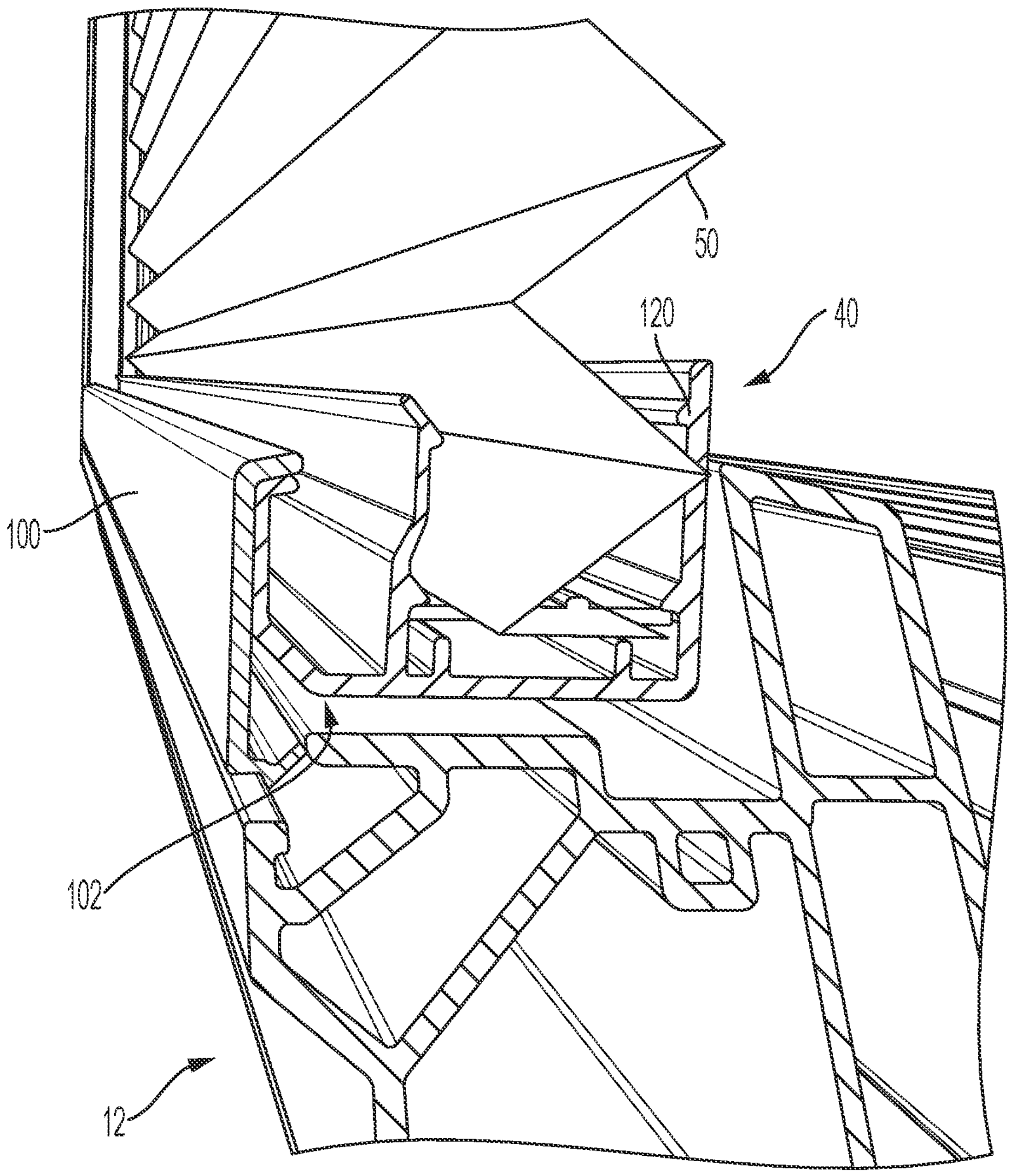
FIG. 12 is a sectional view of a portion of the frame including an insert used to form a screen assembly recess in which a portion of the screen assembly is positioned when the screen is at least partially deployed, according to some embodiments of the disclosure.

As seen in FIGS. 11 and 12, the fenestration unit 10 may include an insert 100 that is operable to be coupled to the frame 12. The insert 100 may be used to form a screen assembly recess 102 in which the screen assembly 40 may be positioned and stored out of the line of sight and at least partially shielded from the elements including debris and moisture. In some embodiments, the insert may be formed to integrate with existing structure of the frame such as channels, receivers, and complementary structure for engagement. However, the insert 100 may be coupled to the frame 12 by any appropriate method, including adhesives and welds among others. It will also be understood that the screen assembly recess 102 may be integrally formed on the frame 12, according to some embodiments, and as can be seen in FIG. 16. Similarly, the insert 100 may be coupled or extend from the frame 12 to form a pocket on those fenestration units 10 that do not have a pocket integrally formed in the fenestration unit 10.

Figure 13:
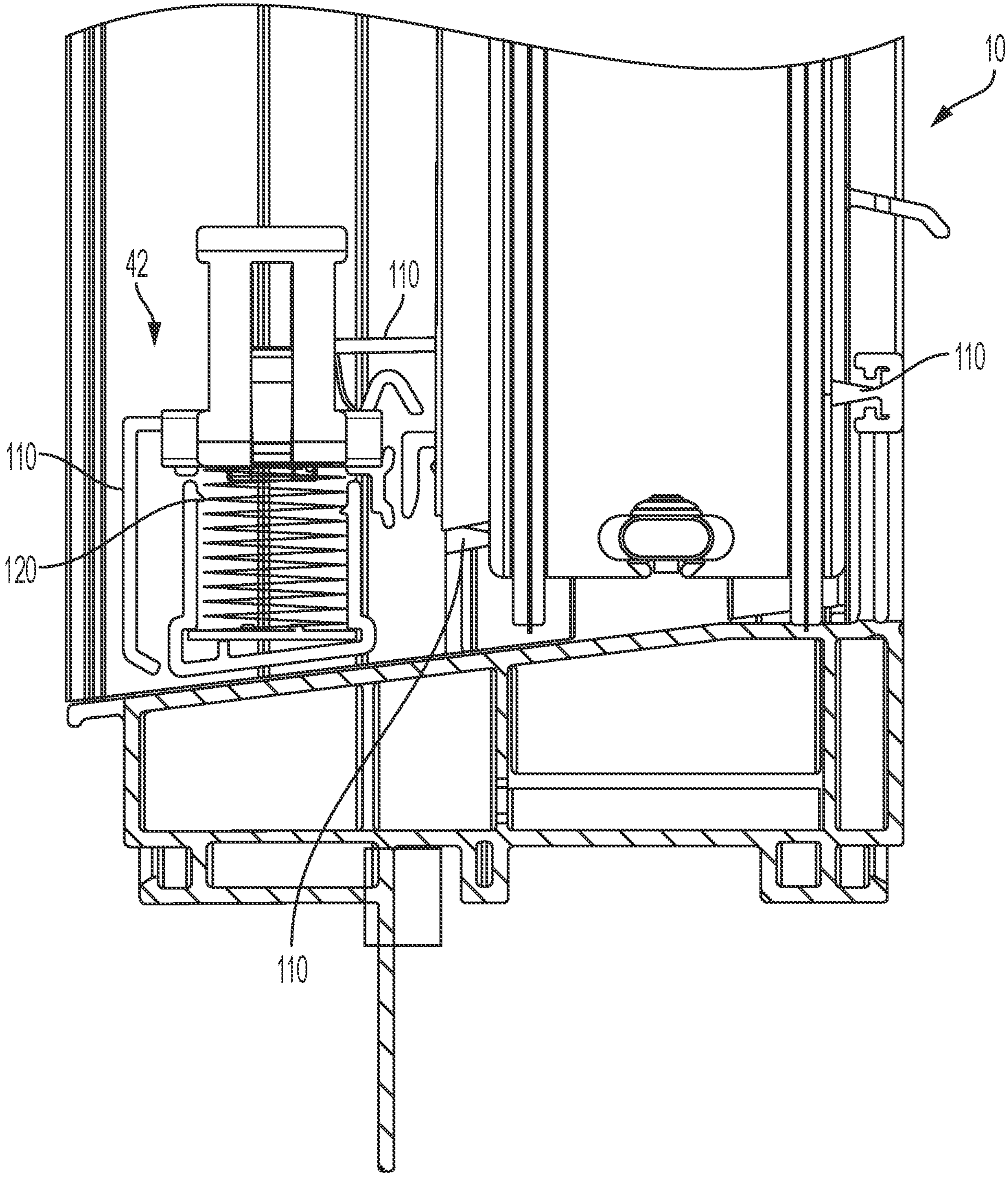
FIG. 13 is a side, sectional view of a screen assembly and sash with various guards for preventing entry of debris, moisture, or insects through the fenestration unit, according to some embodiments of the disclosure.

As can also be seen in several of the figures, including FIG. 13, the fenestration unit 10 may implement various seals or guards 110 to prevent moisture, debris, or insects from traversing around the screen assembly such as above, below, or around the sides of the housing 42. These seals or guards 110 may include brush-type filters, silicon or polymeric flaps or membranes, or metal or polymeric shields.

Figure 14:
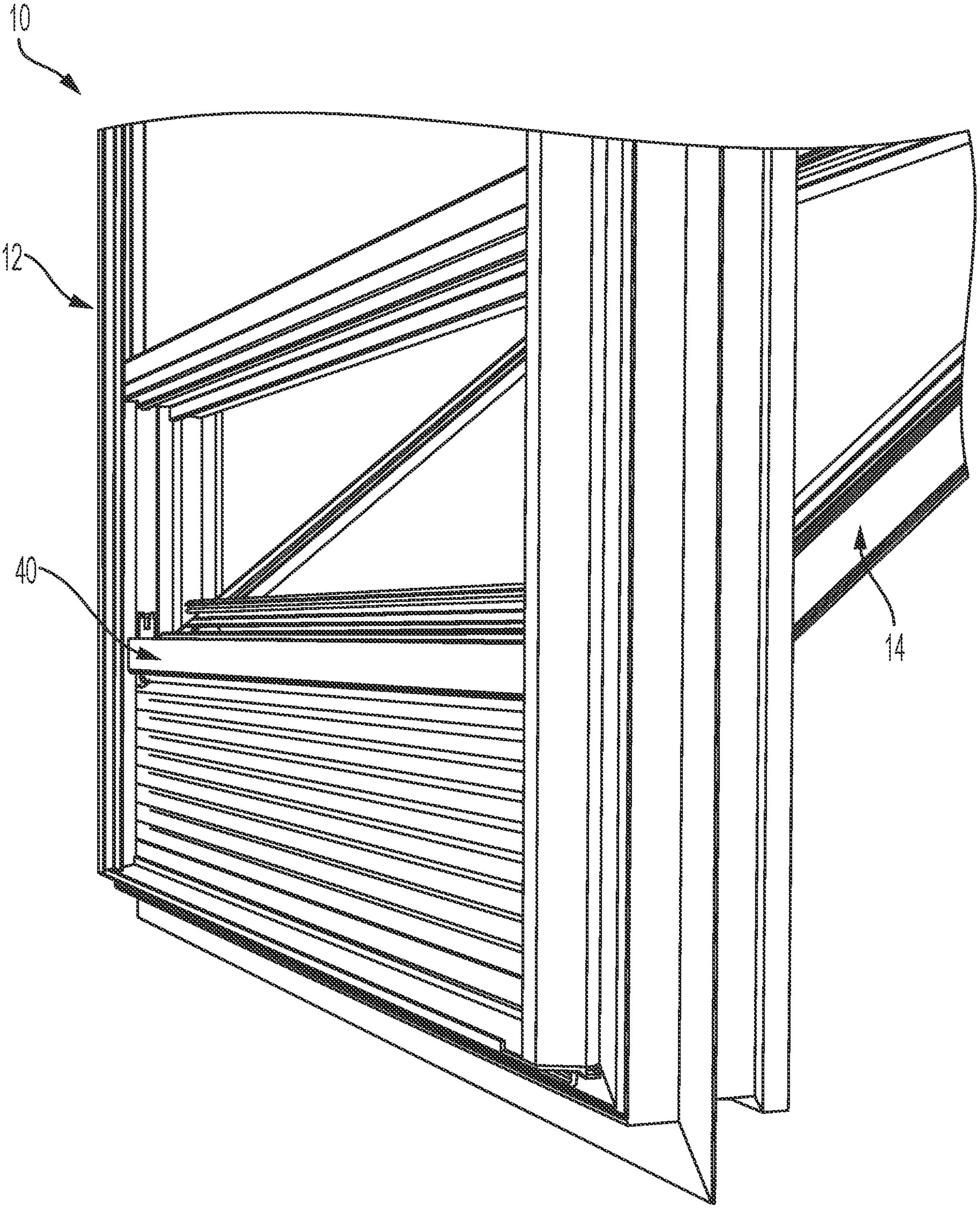
FIG. 14 is a perspective view of a portion of a fenestration unit showing a sash of the fenestration unit pivoted away from the frame of the fenestration unit, according to some embodiments of the disclosure.
Figure 15:
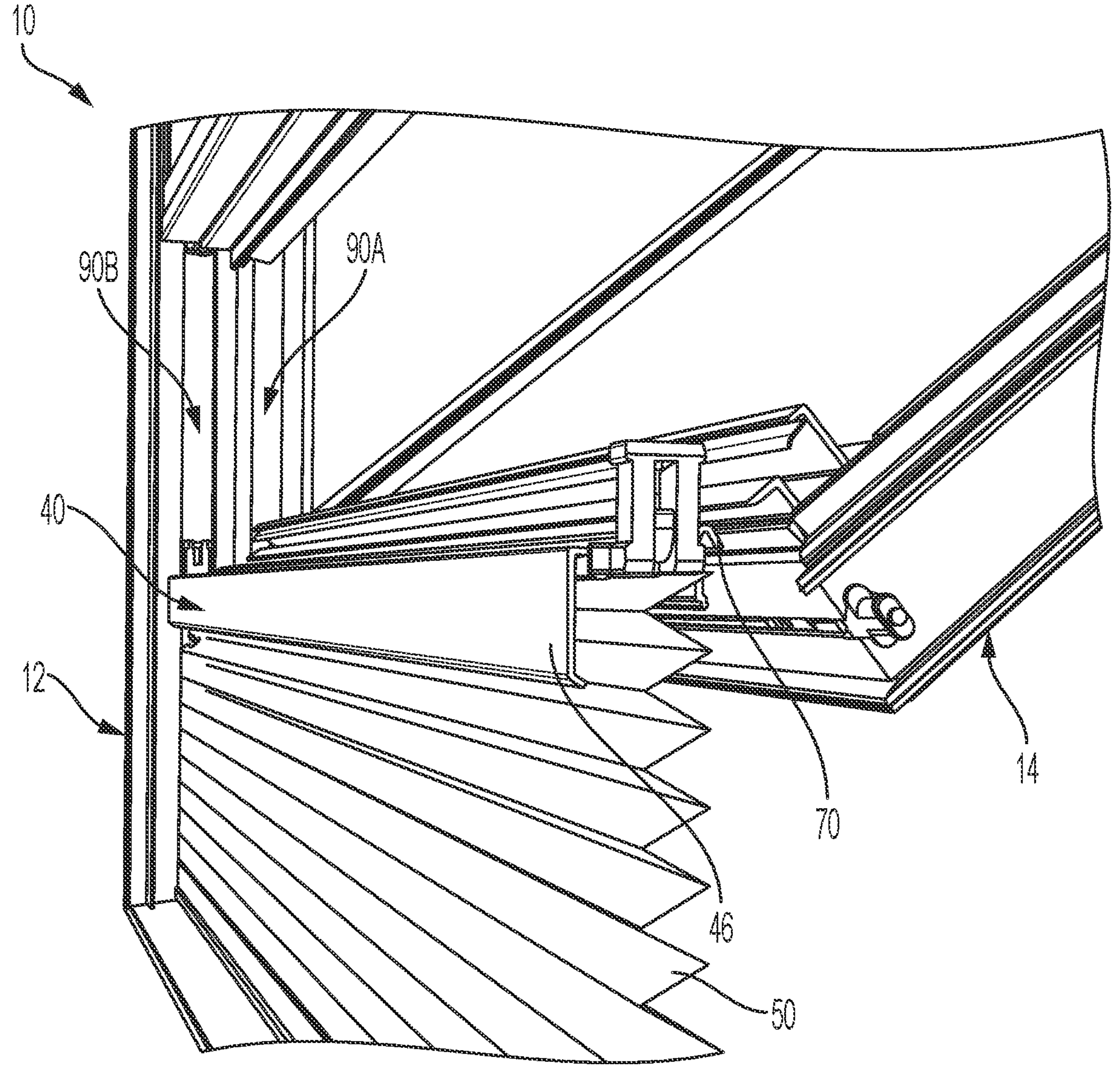
FIG. 15 is a perspective view of a portion of a fenestration unit, with a jamb of the fenestration hidden from view to show a sash pivoted away from the frame such that the screen assembly is disengaged from the sash, according to some embodiments of the disclosure.

Referring now to FIGS. 14 and 15, in some embodiments, the screen assembly 40 may be disengaged from the corresponding sash 14 or 16 by engaging a pivot feature of the sash 14 or 16. For example, when a screen assembly 40 is engaged with the first sash 14 via a coupling member 70 extending from the second housing member 46 of the screen assembly 40, the first sash 14 can be partially released from the frame 12 in order to pivot away from the frame 12. This may be an existing feature of the fenestration unit 10 in order to remove or partially remove the sashes 14, 16 for cleaning, maintenance, replacement, or otherwise. As the first sash 14 pivots away from the frame 12, the coupling member 70 transitions to no longer be in contact with the first sash 14. When the coupling member 70 of the screen assembly 40 and the first sash 14 are not in contact, the second housing member 46 of the screen assembly 40 may be translated within the second pocket 90B independent of the movement of the first sash 14. Once the first sash 14 is returned back into the frame 12, the first sash 14 and the screen assembly 40 may be reengaged as previously discussed.

Figure 17:
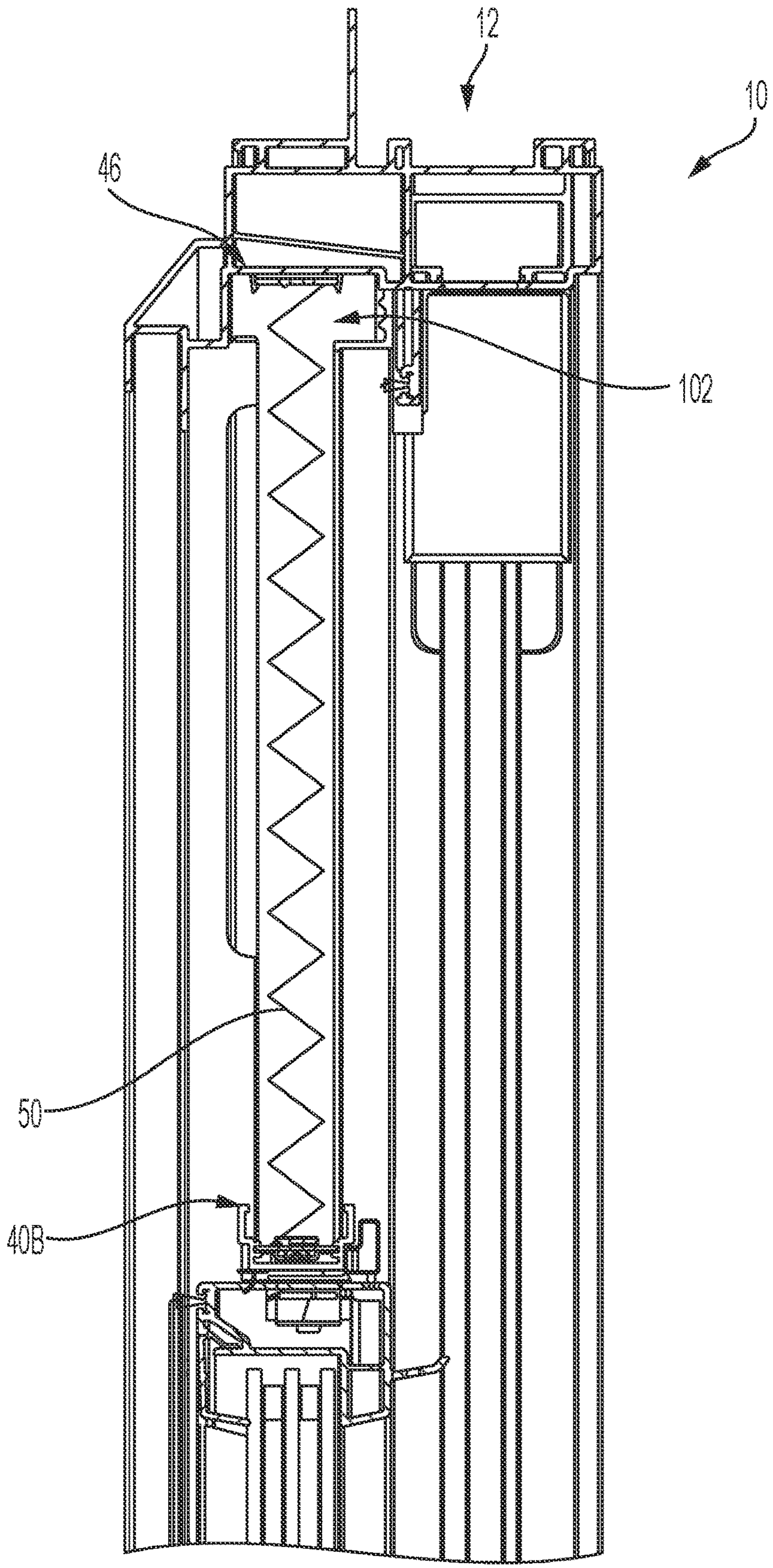
FIG. 17 is a side, sectional view of a screen assembly with a screen partially deployed and the screen assembly engaged with a sash where the screen assembly and the sash are positioned and operate within the same plane as defined by the pocket which restricts the movement of the sash and screen assembly, according to some embodiments of the disclosure.

Referring now to FIGS. 16-17, a second screen assembly 40B may be provided. The second screen assembly 40B may include any of the features described previously, including the position and interaction with the described fenestration unit 10. In some embodiments, the second screen assembly 40B is coupled to the second sash 16. As can be seen in FIG. 16, the frame 12 may include a screen assembly recess 102. It will be noted that the second housing member 46 of the second screen assembly 40B may be integrated into the frame 12 at the screen assembly recess 102 such that an intermediate member 48 coupled to the screen 50 may be coupled directly to the frame 12 via the integrated second housing member 46. Stated otherwise, the screen 50 or the intermediate member 48 may be coupled directly to the frame 12 depending on the particular configuration employed.

FIGS. 17 and 18 show an at least partially deployed configuration of a second screen assembly 40B. The screen 50 and end caps 60 may be at least partially contained in the second pocket 90B. In this embodiment, the screen assembly 40 and the sash 16 both travel in the same plane as constrained by the pocket 90.

Figure 19:
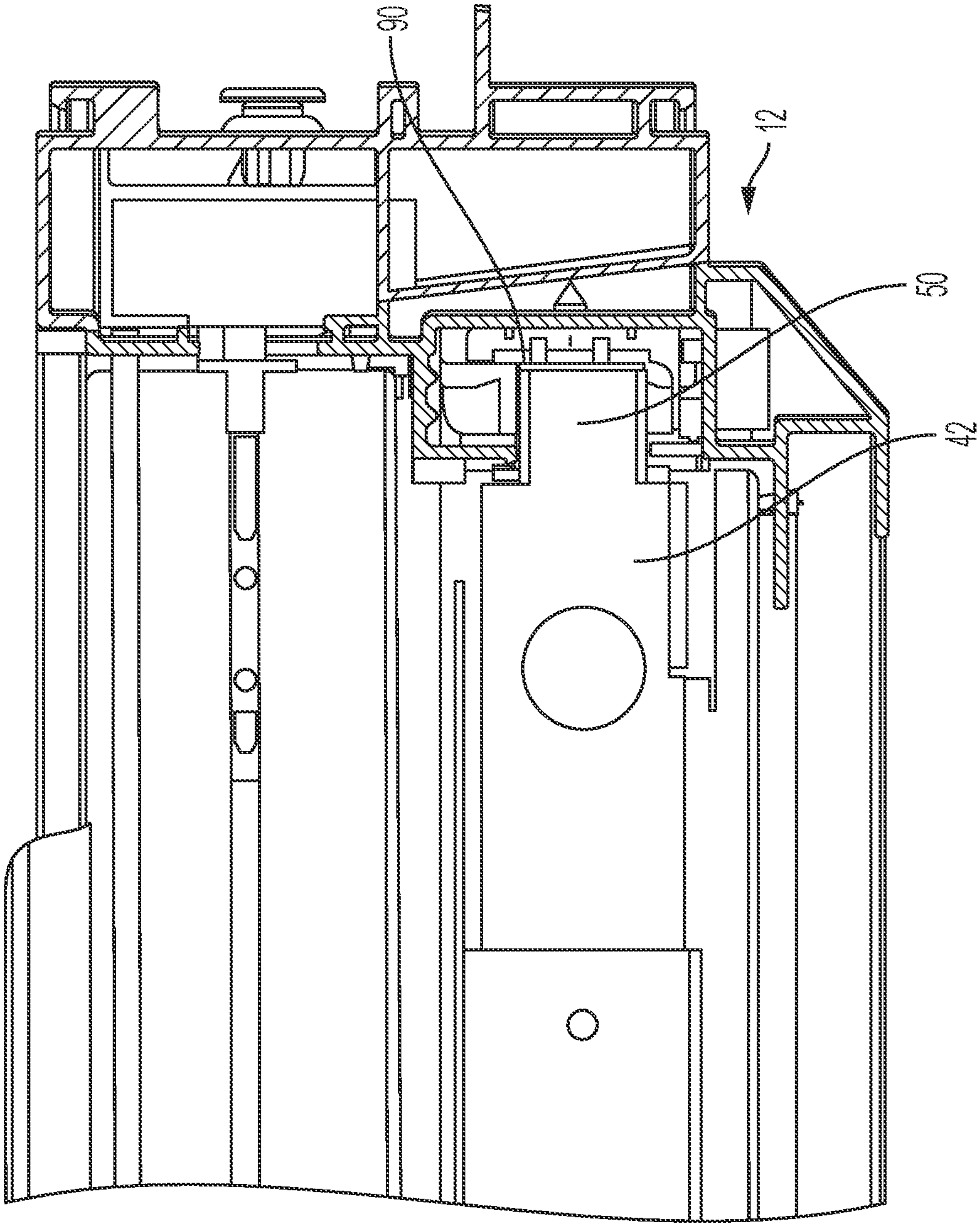
FIG. 19 is a top view of a screen extending from the housing into the pocket, according to some embodiments.

Referring now to FIG. 19, in some embodiments the screen 50 may extend out from longitudinal ends of the housing 42 of the screen assembly 40. When the screen extends out of the housing 42, the screen may be partially positioned within the pocket 90 of the frame 12. The longitudinal ends of the screen extending out from the housing may include longitudinal slits. The longitudinal slits allow for the screen to have flexible edges and those reduce interference of the screen 50 with the movement of the sash 14 or 16 within the pocket 90.

Referring to FIGS. 26-30, another embodiment of a screen assembly 40 is provided. Referring more specifically to FIG. 29A, the screen assembly 40 is illustrated including the screen, endcaps 160 positioned at longitudinal ends of the screen assembly, and a control bar 170. In this embodiment, and further referring to FIGS. 26-30, the end caps 160 are operable to rotate or rock. By rotating or rocking the screen assembly 40 and the end caps 160, the screen assembly 40 is operable to disengage from the respective sash, thus allowing the sash 16 to operate independent of the screen assembly 40. In this embodiment, the screen assembly 40 can be released from the sash 16 by rotating a portion of the screen assembly 40 rather than and/or in addition to rotating the sash 16 (e.g., FIG. 29B). The end caps 160 include a profile that is operable to rotate in the pocket 90 of the fenestration unit 10 in a first direction without mechanical interference while being restrained in a second direction by mechanical interference. For example, the end caps 160 may include an arm 162 that is positioned in the pocket 90, the arm 162 being shaped to contact a first surface 90*a* to restrict rotation of the screen assembly 40 (see FIG. 26). The arm 162 may be positioned in the pocket 90 such that the arm contacts the first surface 90*a* when in a neutral position and restricts rotation in a first direction, whereas the arm 162 is not in contact with a second surface 90*b*, thus allowing the arm 162 to rotate in a second direction. In some embodiments, the second portion 166 of the arm 162 is spaced from the first surface 90*a* and the first portion 164 of the arm 160 is spaced from the second surface 90*b* of the pocket 90. This permits the end cap 160 and specifically the arm 162 to be rotated or maneuvered in one direction. For example, the first portion 164 of the arm 160 can be pushed towards the second surface 90*b* of the pocket 90 and the second portion 166 to be pushed towards the first surface 90*a* of the pocket 90, meaning the end cap can be pivoted or rotated to achieve this movement.

Figure 27:
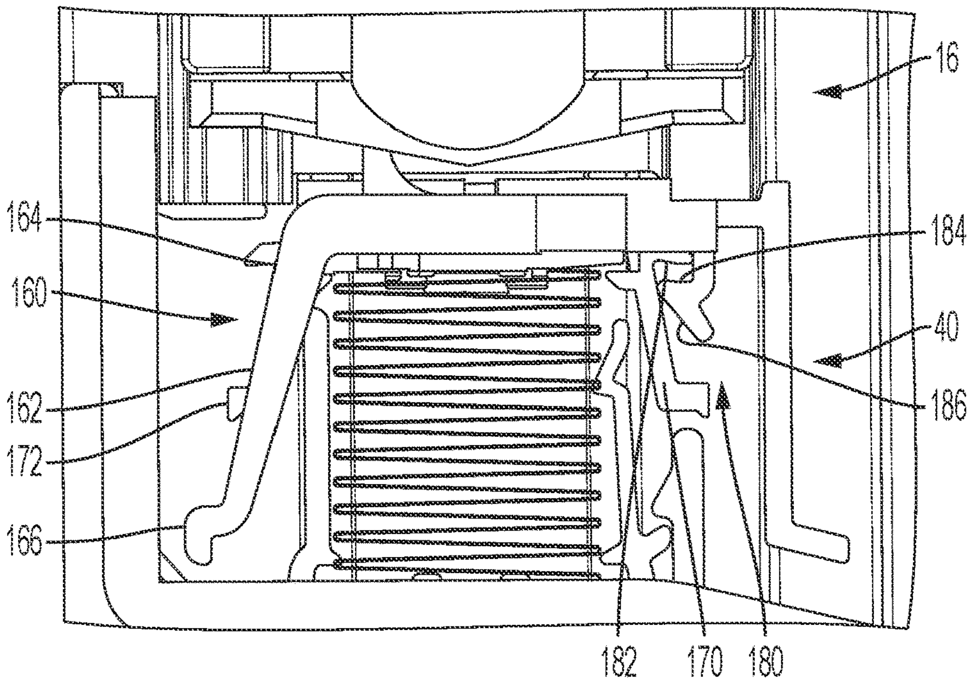
FIG. 27 is a side view of a coupling member and control bar, according to some embodiments.
Figure 28A:
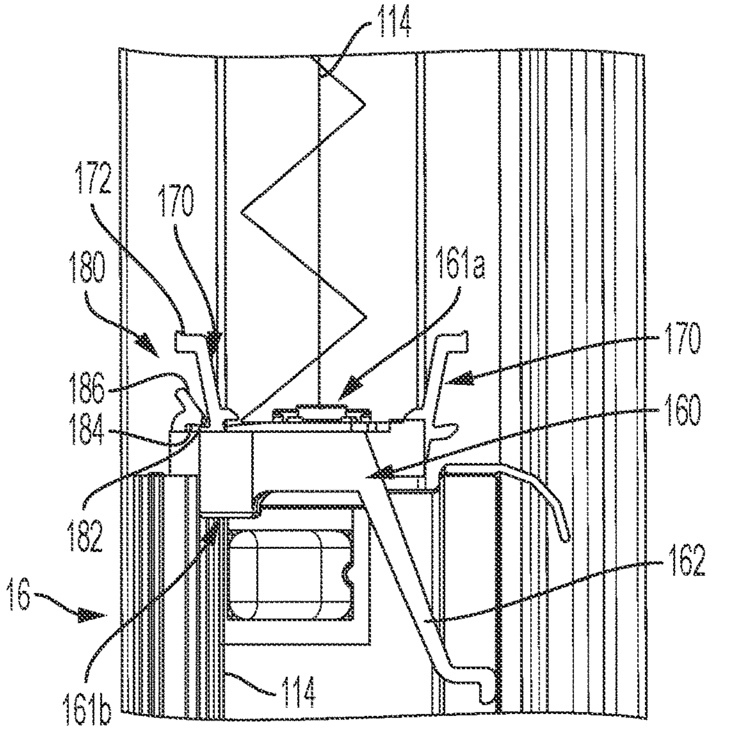
FIGS. 28A and 28B are side views of a coupling member where a screen assembly and sash are engaged when the sash in an open position and a closed position, respectively, according to some embodiments.
Figure 28B:
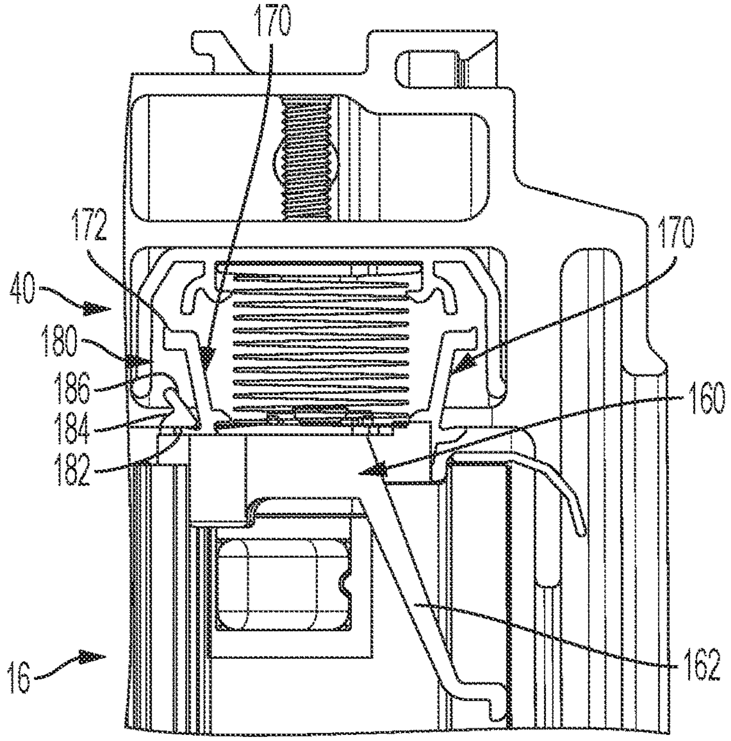

By pivoting or rotating the end cap 160, the screen assembly 40 can become disengaged from the sash 16. For example, in some embodiments, the screen assembly 40 includes the control bar 170, which can be engaged or manipulated by a user to cause pivoting or rotation of the end cap 160 for disengagement of the screen assembly 40 from the sash 40. The control bar 170 can extend from the screen assembly 40 to provide a user input portion 172 which the user can articulate to cause pivoting or rotating. The screen assembly 40 can further include coupling members 180 that are able to engage and disengage from the sash 16. For example, as illustrated in at least FIGS. 27, 28B and 29B, the coupling members 180 includes a lip 182 extending from the screen assembly 40 which is operable to contact a second lip 184 extending from the sash 16 (e.g., directly from the sash 16 or extending from a member that is coupled to the sash 16 such as a watershed feature 122). The two lips 182, 184 are operable to provide mechanical resistance and interference to maintain a positional relationship between the screen assembly 40 and the sash 16 when the two are in contact (e.g., when the sash 16 is moved to an open position, the lips 182, 184 are in contact such that the screen assembly 40 follows the sash). As illustrated in FIGS. 27-28B, the screen assembly 40 may be positioned in plane with the sash 16 (e.g., within the plane of travel). In other embodiments, the screen assembly 40 may be offset from the sash 16 (for example, as shown in FIG. 30). The lips 182, 184 may be oriented in a variety of ways to provide the mechanical resistance to allow the positional relationship between the sash 16 and the screen assembly 40. It is also understood that other components may provide some of the mechanical resistance to maintain the positional relationship between the sash 16 and the screen assembly 40 (e.g., the surfaces on the ends of the sash 16 and screen assembly 40 when the screen assembly 40 is in plane with the sash 16 may provide mechanical interference to push the screen assembly 40 when the sash 16 is being transitioned to a closed position).

Figure 29A:
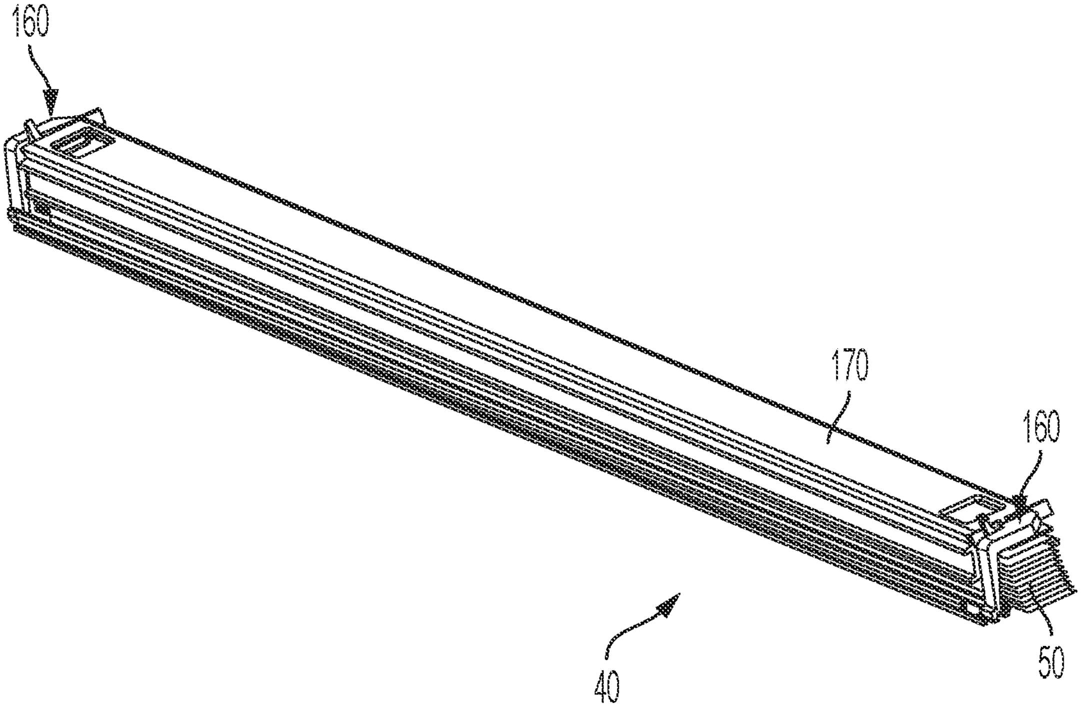
FIG. 29A is a perspective view of a screen assembly, according to some embodiments.
Figure 29B:
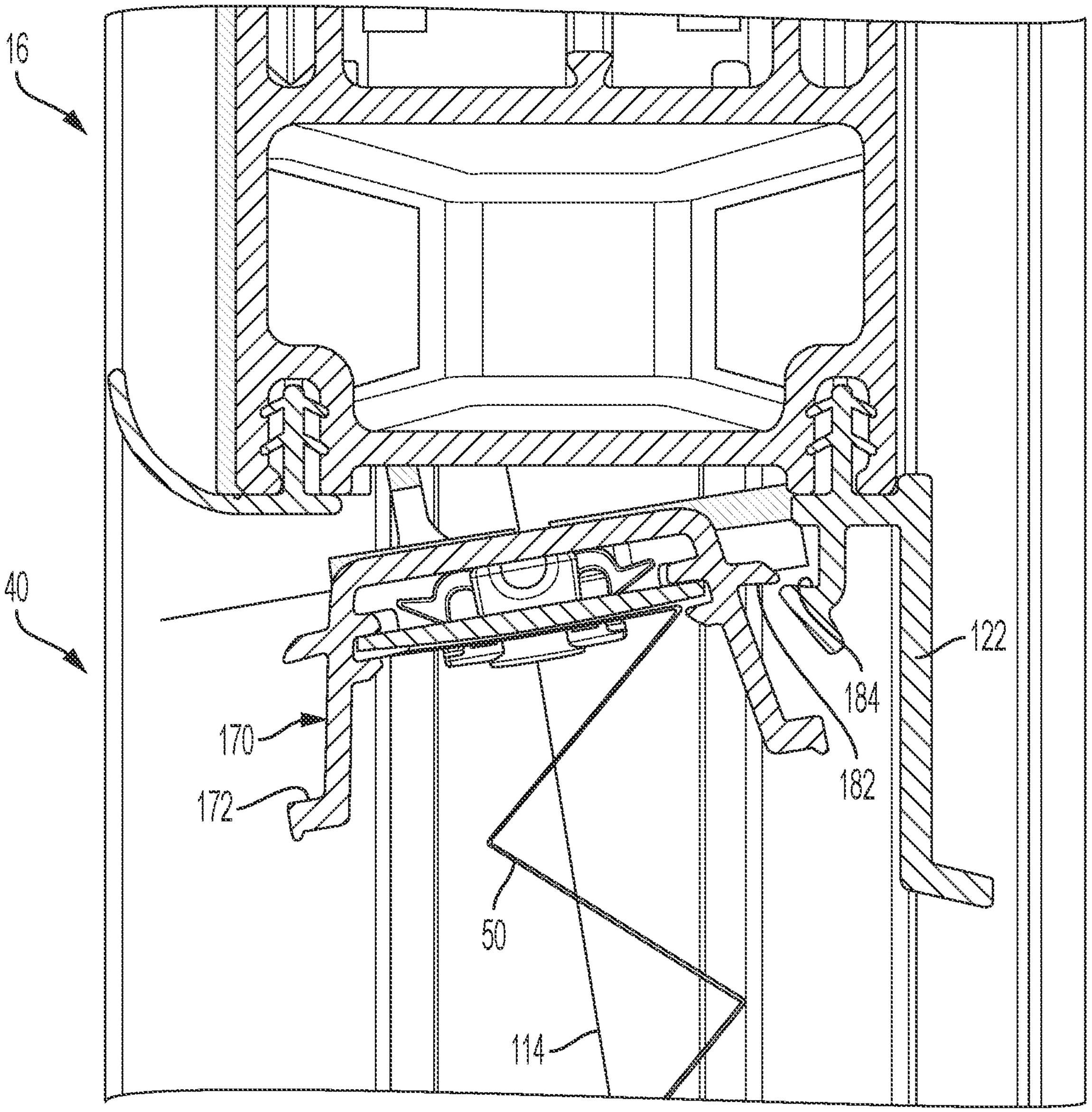
FIG. 29B is a side view of a screen assembly being rotated to detach from the sash, according to some embodiments.
Figure 30:
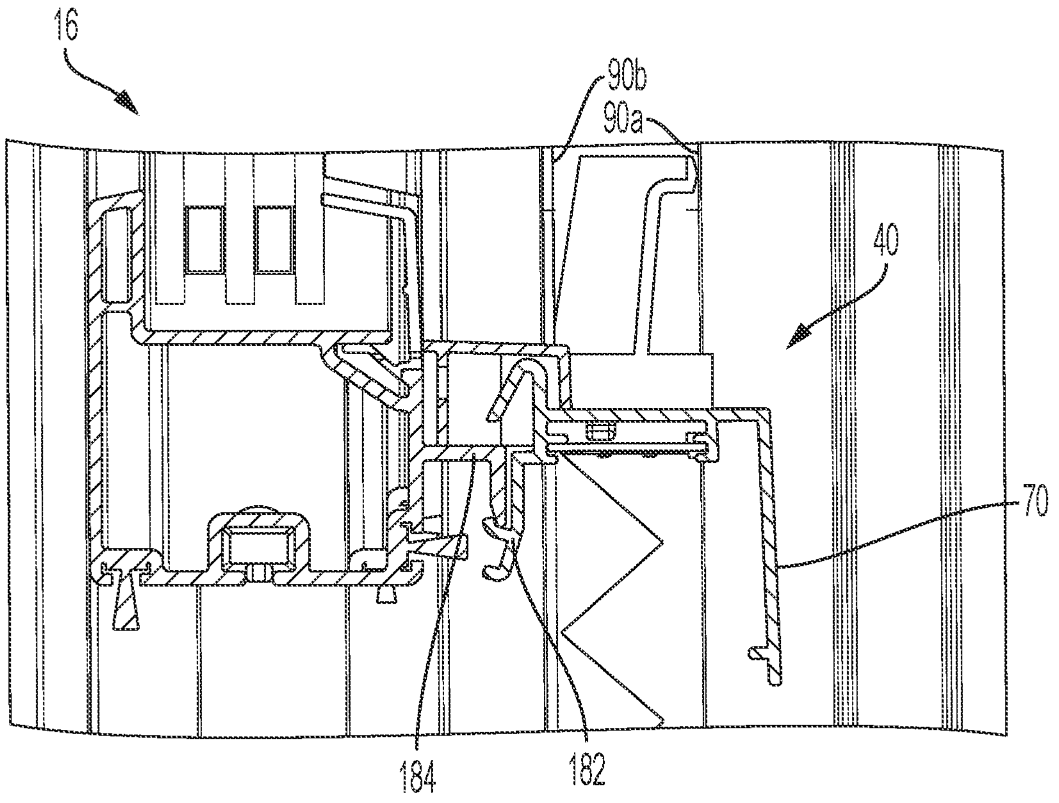
FIG. 30 is a side view of a coupling member, a control bar, and an end cap positioned out of plane with a sash, according to some embodiments.
Figure 31:
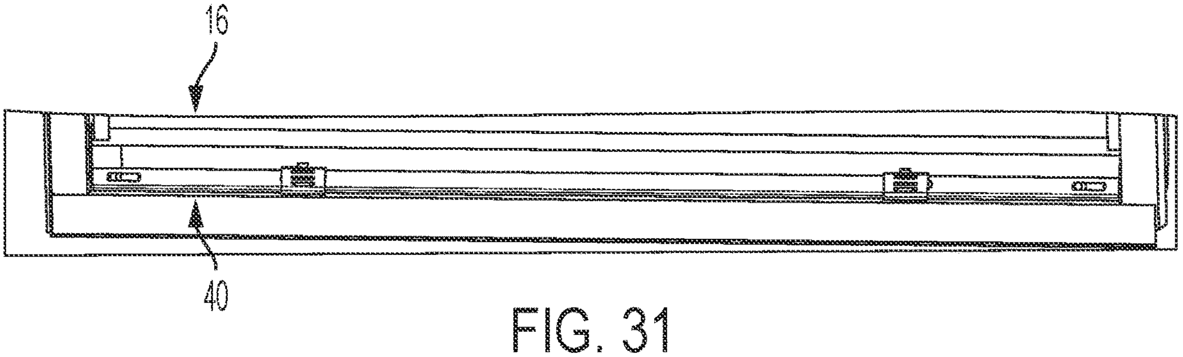
FIG. 31 is a front view of a screen assembly, according to some embodiments.

Referring to FIG. 29B, the screen assembly 40 is illustrated being disengaged from the sash 16. In order to disengage the screen assembly 40 from the sash 16, the lips 182, 184 are repositioned such that the lips 182, 184 do not touch and are thus able to move past each other without contacting each other. For example, when the sash 16 and the screen assembly 40 are operable to travel in a first plane for opening and closing the sash 16 and screen assembly 40, one or both of the lips 182, 184 is articulated (e.g., translated or pivoted) in a direction out of the first plane so that as the sash 16 or screen assembly 40 is translated within the first plane, the lips 182, 184 are operable to slide past each other (clear each other, e.g., no contact or un-obstructive contact) such that the sash 16 and the screen assembly 40 can travel independent of each other. As previously disclosed, the screen assembly 40 may include a control bar 170 that is operable to pivot or rotate the screen assembly 40, which can allow the lips 182, 184 to travel past each other. It is understood that the screen assembly 40 can also decouple from the sash 16 in this embodiment by rotating the sash as previously described herein.

In some embodiments, the lips 182, 184 may include an angled surface 186 that facilitates reengagement of the lips 182 when the sash 14 and the screen assembly are transitioned back together (e.g., the angled surfaces 186 can be used to deflect one of the lips 182, 184 to allow for reengagement). The angled surfaces 186 can operate similar to as described with respect to FIG. 5. With respect to FIG. 30, in some embodiments where the screen assembly 40 is offset from the sash 14, the lips 182, 184 and angled surfaces 186 may be similar to those disclosed with respect to FIG. 5, a notable difference including at least that the screen assembly 40 is rotating away and not the sash 14 in order for the lips 182, 184 to clear each other.

In some embodiments, blockers 190 can be positioned at entry points through which insects could bypass the screen assembly 40 and sash 16. For example, blockers 190 may be positioned extending from the end caps 160 into the pockets 90. Blockers 190 can include brushes, foam plugs, or other resilient materials.

Figure 32:
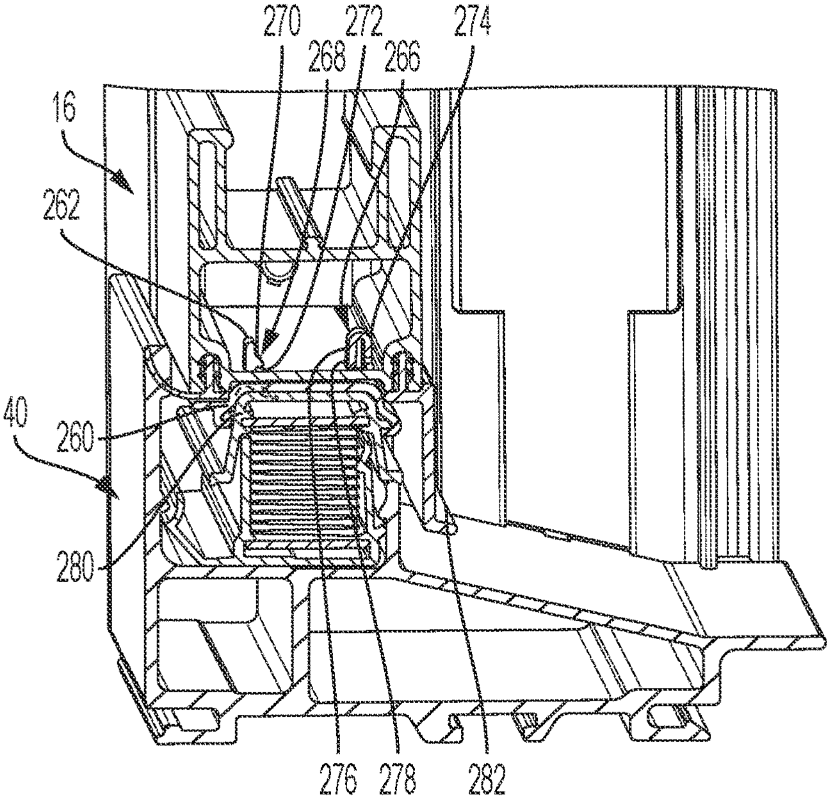
FIG. 32 is a sectional view of a screen assembly and sash implementing a clip system, according to some embodiments.

Referring now to FIG. 31-34, an embodiment of the sash 14 and screen assembly 40 is provided in which the screen assembly 40 includes a clip 260 operable to engage the sash 16. The clip 260 may extend directly from the screen assembly 40 or may be coupled to a portion of the screen assembly 40 (e.g., the housing 42), such as illustrated in FIG. 32. For example, the clip 260 may be coupled to a rail 280 on the housing 42 of the screen assembly 40. The clip 260 includes coupling members 262 operable to contact the sash 16 to provide a holding force between the screen assembly 40 and the sash 16. The coupling member 262 may include, for example, a first arm 264 and a second arm 266. The first arm 262 extends from the clip 260 and includes a protrusion 268 with a first surface 270 and a second surface 272. The first surface 270 is ramped or angled to facilitate coupling of the clip 260 with the sash 16 by deflecting the first arm 262 (via a surface of the sash 16) until the first surface 270 has passed beyond the corresponding surface of the sash 16 and the second surface 272 of the protrusion 268 is in contact with the sash 16. The second surface 272 is operable to provide mechanical resistance to decoupling of the sash 16 and the screen assembly 40. The second arm 268 may include a spring 274 that is operable to contact the sash 16 in order to provide a force against the sash 16 to position and maintain the second surface 272 of the first arm 266 against the sash 16. For example, the spring 274 is formed of a resilient material including a U-shaped portion 276. The U-shaped portion 276 includes an angle of less than 180 degrees such that the spring 274 is tapered. The spring 274 may further include an angled surface 278. The U-shaped portion and/or the angled surface are operable to provide a lateral force when contacting the sash 16 such that the first arm 262 maintains contact against the sash 16 and thus provides mechanical resistance against decoupling of the sash 16 and the screen assembly 40.

Figure 33:
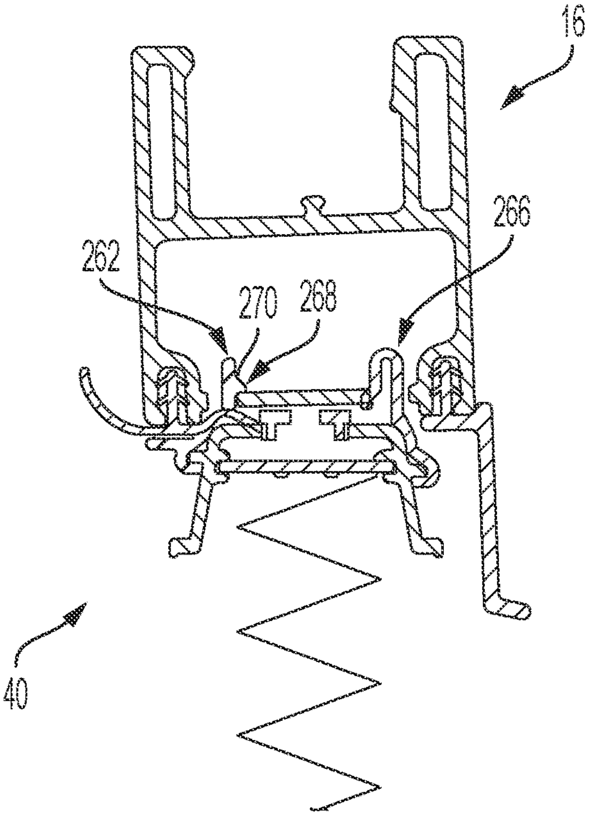
FIG. 33 is a sectional view of the clip system of FIG. 32 illustrating decoupling of the screen assembly from the sash, according to some embodiments.
Figure 34:
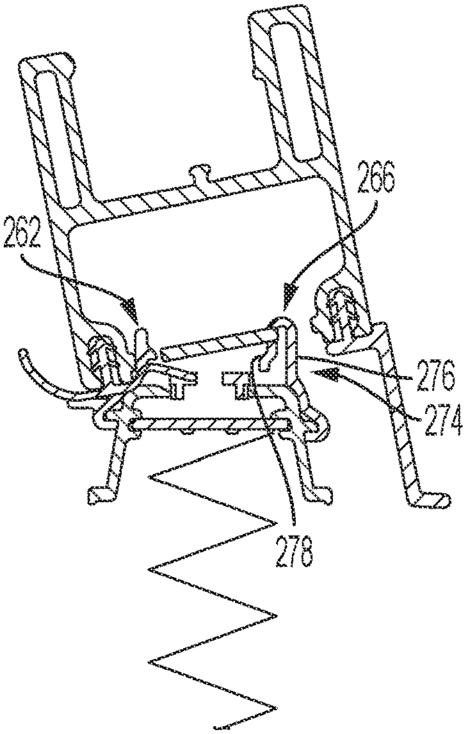
FIG. 34 is a sectional view of the clip system of FIG. 32 illustrating rotating of the sash as the screen assembly is decoupled from the sash, according to some embodiments.

As illustrated in FIGS. 33-34, the screen assembly 40 may be disengaged from the sash 16 by rotating the sash 16 to decouple the clip 260. As the sash 16 is rotated, the spring 274 disengages from the sash 16 and the first arm 262 is operable to disengage from the sash 16. It is within the scope of the disclosure that the screen assembly 40 may also rotate, similar to as discussed with respect to FIGS. 26-30.

In some embodiments, the sash 16 includes coupling positions 282 at which the clip 260 is operable to couple to the sash 16. For example, the coupling positions 282 of the sash 16 may include apertures through which the portions of the clip extend 260 and which expose surfaces against which the clip 260 is positioned to provide mechanical resistance against decoupling of the sash 16 and the screen assembly. In some embodiments, the clip 260 is operable to transition or slide along the longitudinal length of the screen assembly 40 (e.g., along the rail 280). The clips 260 may be slid out of position with respect to the coupling positions 282 of the sash 16 in order to prevent coupling of the sash 16 and the screen assembly 40. This may be used during assembly, transport, installation, or otherwise to prevent coupling, which in these scenarios may for example, obstruct work, result in damage to the fenestration unit 10, and so forth.

Referring now to FIG. 20, the screen assembly 40 may include cords 114. The cords 114 may function to allow proportional and/or controlled deployment of the screen 50. The cords 114 may include a first cord 114A and a second cord 114B extending from the frame 12 and coupled to the housing 42 of the screen assembly 40, wherein the first and second cords 114A, 114B both extend along a shared length of a longitudinal length of the housing 42. Because the cords 114A and 114B cross along a shared length of the housing 42, the deployment of the screen assembly 40 is able to have a controlled release without disproportionate advancement of one screen assembly longitudinal side over the other longitudinal side. As previously discussed, the end caps 60 may include a gliding surface 66 that helps facilitate transitioning of the cords 114 from a vertical orientation to a horizontal orientation or from a horizontal orientation to a vertical orientation at the end caps 60. At those portions of the housing 42 of the screen assembly 40 near the gliding surface 66 of the end caps 60, the cord may be disposed along an exterior surface of the housing 42 and extend across at least a portion of the housing 42. It will be understood that any number of cords may be implemented in the various embodiments. Some examples of the number of cords that may be implemented in the disclosed embodiments include 2, 4, 6, 8, or 10 cords.

In various examples, the housing 42 further includes grommets 112 through which the cords 114 may extend. For example, the first and second housing members 44, 46 include grommets 112. The grommets 112 on the first housing member 44 allow for the cords 114 to extend into the interior space of the housing 42. The grommets 112 on the second housing member 46 allow for the cords to be coupled or fastened to the second hosing member 46. Because the cords 114 extend through the interior space of the housing 42 of the screen assembly 40, the screen 50 may also include features permitting the cords 114 to pass through the screen 50. The cords 114 may also provide stability to the screen 50 when deployed such that the screen 50 is maintained in a plane defined by the housing 42 of the screen assembly 40.

In order to further control or stabilize deployment of the screen 50, the housing 42 may include pleat restrictors 120, as seen in FIGS. 4, 5, 12, and 13. The pleat restrictors 120 may include a protrusion extending from the housing 42 extending partially into the interior space of the housing 42. The pleat restrictors 120 may be single protrusions spaced along the longitudinal length of the housing 42, or it may include single protrusions extending at least partially or fully across the longitudinal length of the housing 42. The pleat restrictors 120 are operable to prevent a pleat of a screen 50 to travel past the pleat restrictor 120 until sufficient force has been applied to the screen 50. Thus, the screen 50 is retained in the housing 42 until the edge of a pleat is able to travel past the pleat restrictor 120, which allows for the exposed portions of the screen 50 to remain relatively spread in order to increase visibility through the screen 50 when the screen 50 is deployed. The pleat restrictors 120 may also be offset from each other across the screen retention space 47. The pleat restrictors 120 may be positioned at various lengths/heights along the housing 42 in the direction in which the screen 50 extends when released from the housing 42. Thus, the pleat restrictors 120 may be staggered in order to allow controlled release of the screen 50.

FIGS. 21 and 22 demonstrate various other embodiments of the components and configurations of those components (e.g., the end caps and the watershed features) with regard to the fenestration unit 10. None of the disclosure is meant to be limiting to a single specific embodiment, but various combinations of the features may be implemented within the various embodiments disclosed herein. For example, FIG. 21 provides an embodiment of fenestration unit 10 having a first watershed feature 122 and second watershed feature 124, where the first watershed feature extends from the sash 14 and the second watershed feature 124 extend from the screen assembly 40. FIG. 22 provides an embodiment of a watershed feature 122 extending from the sash 14 that is operable to shield both the intersection of the screen assembly 40 and the sash 14 and the first housing member 44. FIGS. 21 and 2 likewise demonstrate various embodiments of and configurations of the end caps 60. It is to be understood that such components may be used interchangeably where applicable.

Referring now to FIGS. 23 and 24A-F, the cords 114 may be routed through at least portions of the screen assembly 40 and positioned relative to the fenestration unit 10 to support the screen assembly 40 at predetermined or desired positions. The following disclosed cord 114 and routing features may be considered a double support cord. For example, when a screen assembly 40 implements a double support cord 114, the routing of the cord 114 begins where the cord 114 is coupled to the fenestration unit 10. The cord 114 is knotted and the knotted portion of the cord 114 is captured in a first cord terminal 130*a* (see also FIG. 24B). The cord terminal 130 may be coupled to the fenestration unit 10 using various coupling techniques and features. For example, when the fenestration 10 includes an insert 100, for example as discussed with reference to FIGS. 11 and 12, the cord terminal 130 may be hooked over a top edge of the insert 100. The cord 114 may be routed in a first direction along the insert 100 to the first end cap 60*a* (see also FIG. 24D), the first end cap 60*a* including gliding surface 66 operable to allow about 90-degree turn (or any other appropriate angle of turn) in the cord 114 across the gliding surface 66. For example, the gliding surface 66 has low-friction surface forming an arc with a generous radius operable to allow the cord 114 to transition along that surface from the first direction to a second direction without causing excessive resistance and/or damage to the cord 114. The cord 114 is then routed past a first grommet 112*a* positioned on the screen assembly 40 and to a second grommet 112*b*, such that the cord 114 engages the second grommet 112*b* (see also FIGS. 24C, 24D, and 24E). Each of the grommets 112 can include a transition surface (not shown) about which the cord 114 may transition from the second direction to a third direction (it is recognized that the third direction in some embodiments it the same direction as the first direction). The transition surface may include a low-friction surface forming an arc with a generous radius operable to allow the cord 114 to transition along that surface without causing excessive resistance and/or damage to the cord 114. The cord is routed, via the transition surface through holes in the screen 50. The cord 114 is routed through a second hole 132*b* in the first housing member 44 (see also FIG. 24F). In some embodiments, the holes 132 do not include a transition feature for providing a smooth transition of the cord 114 between direction, thus increasing the friction and resistance of the cord 112 at the holes 132. In other embodiments, the first housing member 44 may include similar transition features as discussed previously along which the cord 114 is operable to transition from the third direction to a fourth direction, for example, via the holes 132. The cord 114 is then routed along the first housing member 44 and through a first hole 132*a*, the first hole 132*a* operable to transition the direction of the cord 114. Because the cord routing can be symmetrical, it is understood that the features and directions may also be inversely positioned. For example the first hole 132*a* is complementary to the second hole 132*b*, the first grommet 112*a* is complementary to the second grommet 112*b*, a second end cap 60*b* is complementary to the first end cap 60*a*, and a second cord terminal 130*b* is complementary to the first cord terminal 130*a*. Thus, the cord may be routed from the first hole 132*a* to the first grommet 112*a* (see also FIG. 24D), from the first grommet 112*a* past the second grommet 112*b* (thus the cord 114 overlap or crosses between the first and second grommets 112*a*, 112*b*) to the second end cap 60*b* (see also FIGS. 24C and 24D), and from the second end cap 60*b* to a second cord terminal 130*b* (see also FIG. 24A). The cord terminals 130 are operable to maintain the cord 114 at an appropriate tension. The cord terminals 130 may include slots 134 to clinch and wrap the cord 114 to ensure positive engagement.

The routing system described herein may provide stability of the first housing member 44 during operation, including when it is disconnected from the sash 14. Since cord 114 is operable to transition directions around sharp bends of the holes 132 on the first housing member 44, the first housing member 44 is able to be adjusted for level while the cord-hole interaction produces resistance to facilitate stability of the screen assembly 40.

Figure 24A:
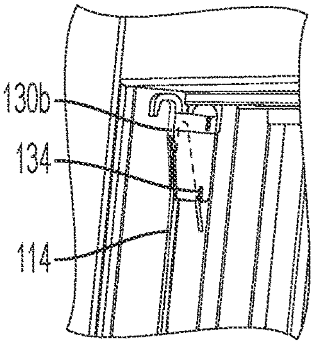
FIGS. 24A-24H are close up views of transitions in direction of a cord in a cord routing system, according to some embodiments.
Figure 24B:
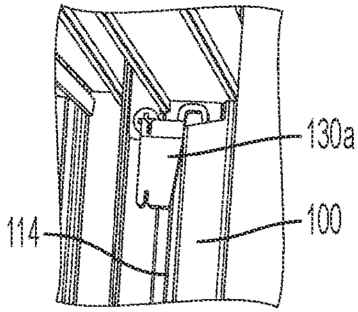
Figure 24C:
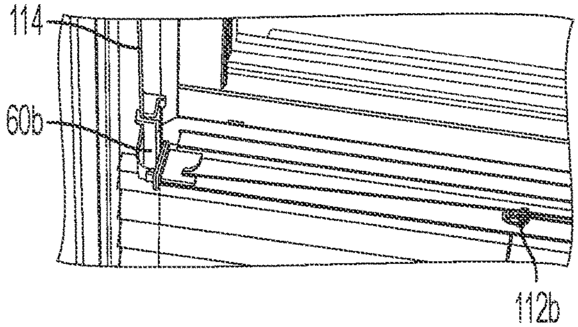
Figure 24D:
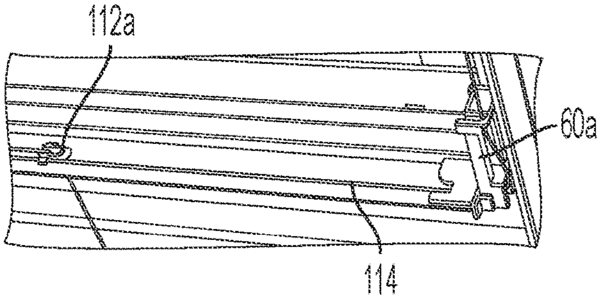
Figure 24E:
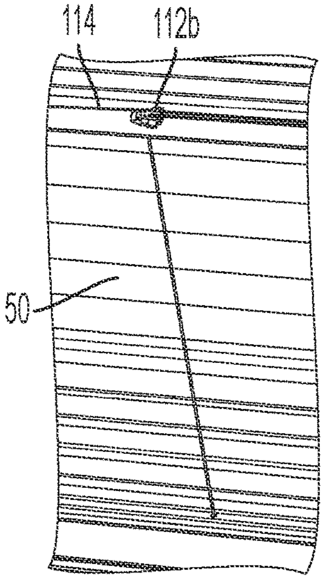
Figure 24F:
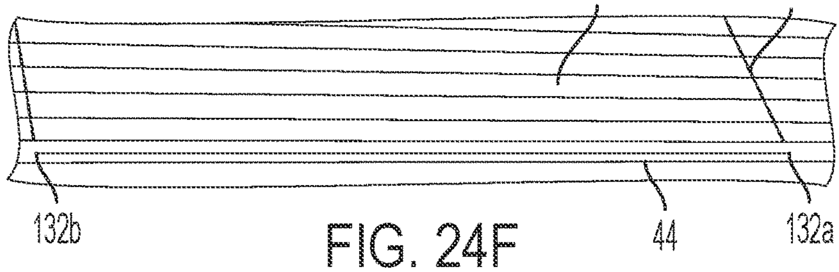
Figure 24G:
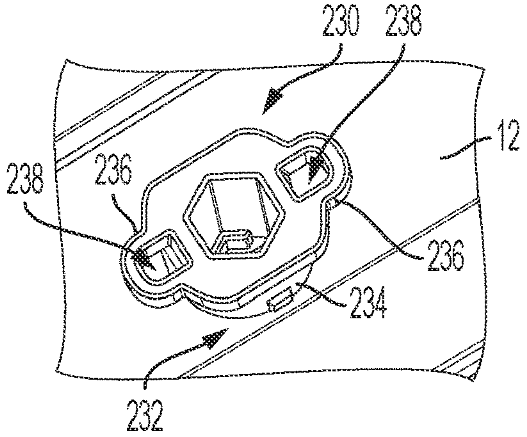
Figure 24H:
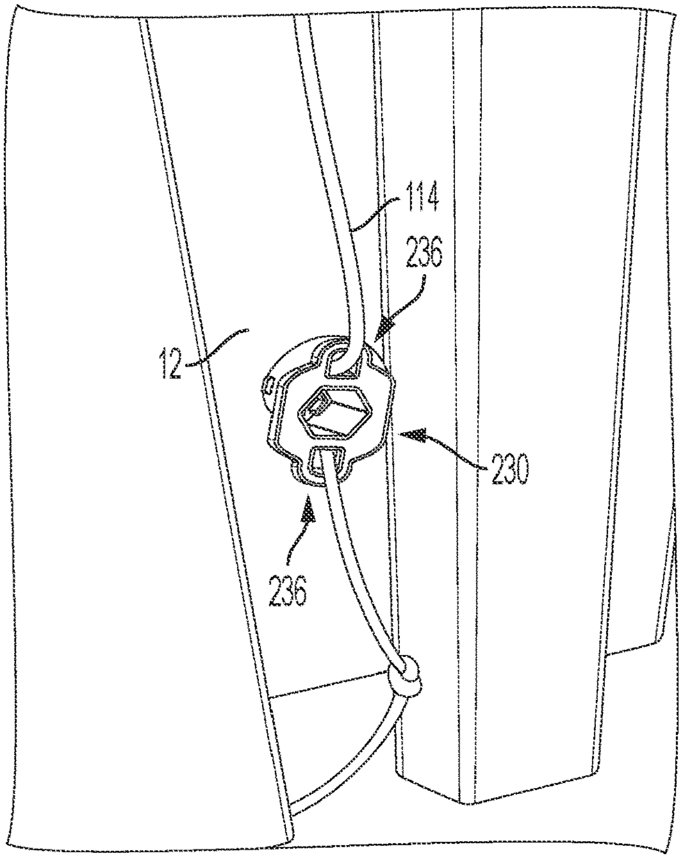

Referring now to FIGS. 24G and 24H, an alternative cord terminal 230 is illustrated, the cord terminal operable to couple to the frame 12. For example, the frame 12 may include a recess 232 operable to receive at least a portion of the cord terminal 230. The cord terminal 232 may include a body 234 and a cord retainer 236 extending from the body 234. The cord retainer 236 may include, for example, apertures 238 through which the end of the cord 114 can be routed. In some embodiments, when the cord 114 is routed through the apertures 238, the cord 114 is positioned around at least a portion of the body 234. The cord terminal 230 is positioned in the recess 232 of the frame 12 and then can be engaged fully within the recess 232. When the cord terminal 230 is positioned but not fully engaged in the recess 232, the cord 114 may be adjusted to different lengths through the cord retainer 236 and apertures 238 (e.g., the cord 114 may slide through the apertures). Once the cord terminal 230 is translated into and fully engaged in the recess 232, the cord 114 is locked into that position until the cord terminal 230 is removed from the recess 232. Locking occurs because of the frictional force resulting on the cord 114 between both the frame 12 and the cord terminal 230 (e.g., positioned between or sandwiched between the frame 12 and cord terminal 230). Resistance to movement may also occur because of the change in direction of the cord 114 when the cord terminal 230 is fully engaged in the recess 232 (e.g., about a 90 degree turn at each aperture 238.

Figure 25:
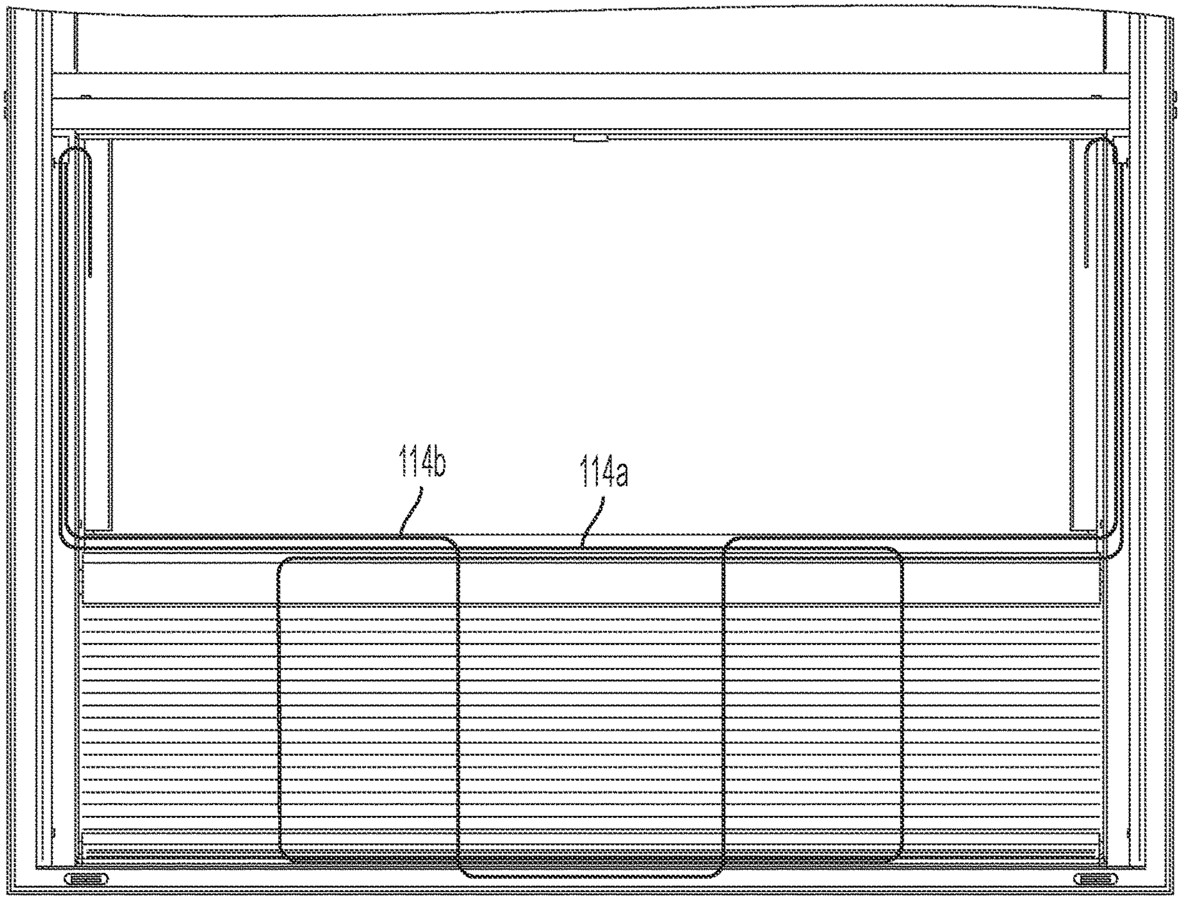
FIG. 25 is a front view of a screen assembly and routing system, the routing system using a primary and secondary cord for supporting the screen assembly, according to some embodiments.
Figure 26:
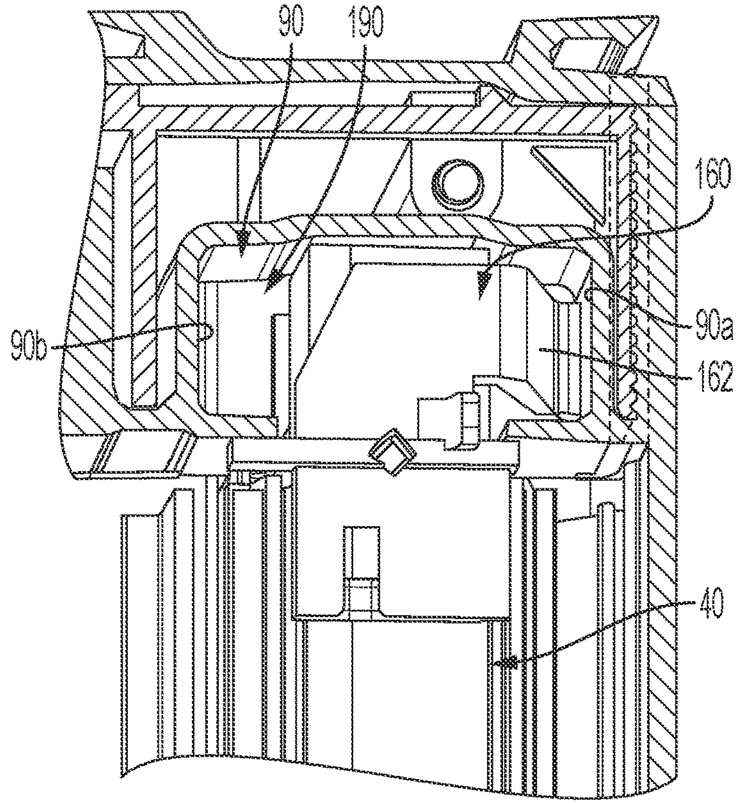
FIG. 26 is a top view of an end cap positioned in a pocket, according to some embodiments.

On wide vertical sliding windows or tall horizontal sliding windows, a secondary support cord 114*b* may be included. For example, FIG. 25 shows a fenestration unit 10 having a primary cord 114*a* and a secondary cord 114*b*. The routing of the secondary cord 114*b*, in some embodiments, does not need to cross over, because the primary cord 114*a* provides the leveling stability for the first housing member 44.

Figure 35:
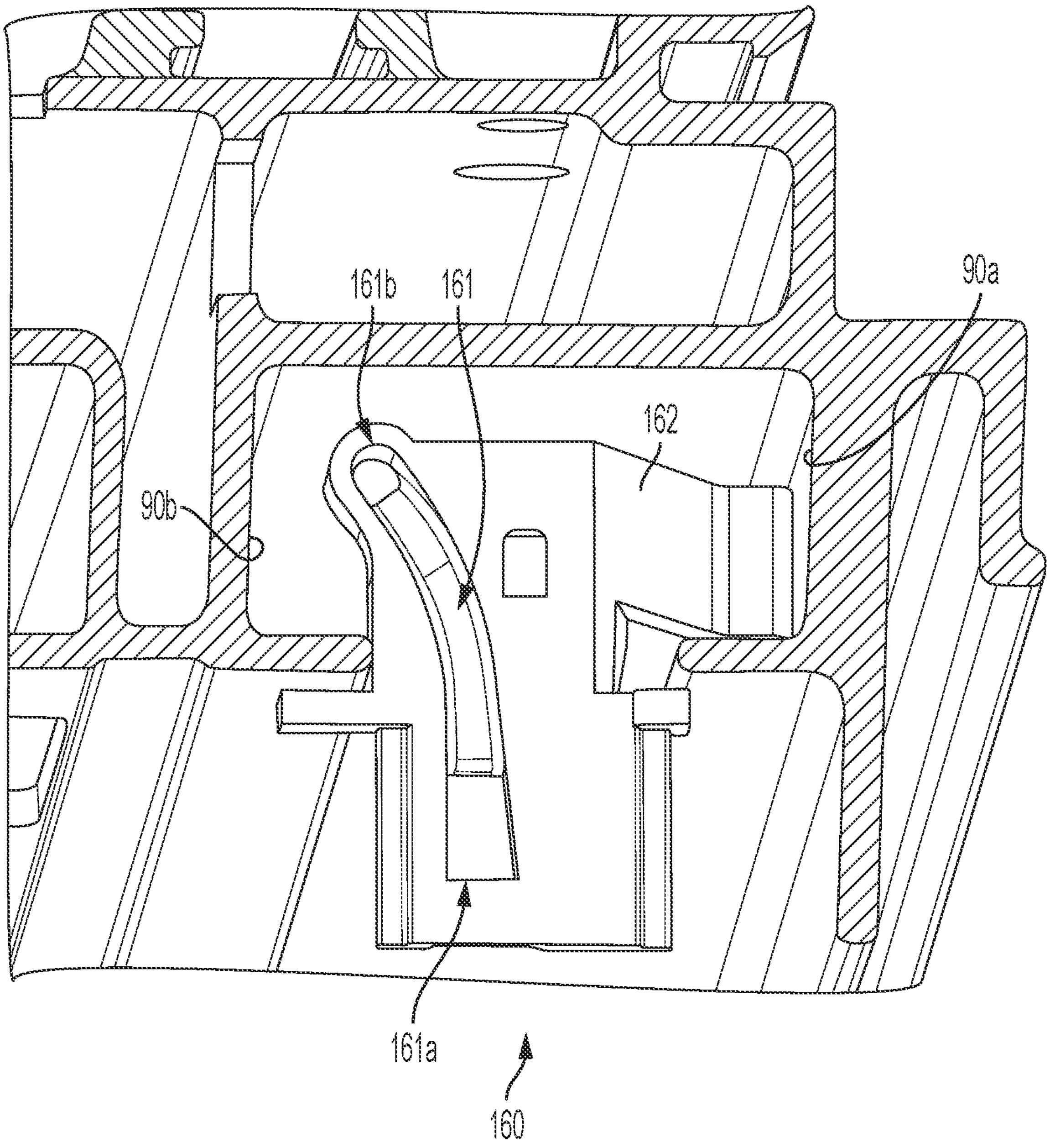
FIG. 35 is an end cap with cord routing, according to some embodiments.

In some embodiments, the cords 114 and screen 50 may be mounted within the screen assembly 40 offset from a center of the screen assembly 40. For example, the portion of the cord 114 extending from the first housing members 44 and through the screen 50, the portion of the cord 114 extending from the screen assembly 40 pocket 90, or both may be may be offset from the lateral center of the screen assembly 40. The offset of the portion of the cord 114 that passes through the screen 50 and the portion of the cord 114 that in the jamb cavity creates a rotational force on the control bar. This rotational force provides proper positioning of the control bar 170 to insure proper engagement with the sash 16 (e.g., the engagement members 180), so as to keep the end caps 160 engaged in the pockets 90 and the lips 182, 184 of the engagement member 180 engaged with each other (see FIG. 28, for example). The endcaps 160 have relief on the opposite surface so that the control bar 170 can be pushed away from the engagement member 180 of the sash 16 to disengage the screen assembly 40 from the sash 16. This may be implemented in those embodiments in which the screen assembly 40 is rotated in order to facilitate decoupling of the screen assembly 40 from the sash 16. Referring to FIG. 35 the end cap 160 is shown with a cord routing 161. The cord 114 may be routed through the end cap 160 such that the cord 114 is positioned in a recess formed by the cord routing 161. The cord 114 may enter at a first position 161*a* and exit at a second position 161*b*. The first and second positions 161*a*, 161*b* can be spaced from each other such both longitudinally and laterally relative to the screen assembly 40. For example, the first position 161*a* may be at or near a longitudinal centerline whereas the second position 161*b* may be positioned laterally spaced from the longitudinal centerline. As tension is applied across the cord 114, the offset of the second position 161*b* causes a torsional force to be applied to the screen assembly 40. The torsional force helps maintain the arm 160 against the first surface 90*a* of the pocket 90 and accordingly in the neutral position. As previously discussed, the screen assembly 40 can be deflected away from the neutral position by applying a force to the control bar 170, and in this embodiment, the force being sufficient to overcome the torsional force of the cords 114.

A method of providing a screen assembly on a fenestration unit is provided, wherein the fenestration unit may include a frame having a first portion, a second portion opposite the first portion, a first jamb extending between the first portion and the second portion, and a second jamb opposite the first jamb and extending between the first portion and the second portion, wherein the first jamb and the second jamb each include a first pocket, and a sash including a first rail, a second rail opposite the first rail, a first stile extending between the first and second rails, and a second stile opposite the first stile and extending between the first and second rails. The first and second stiles may be positioned in the first pocket of the first and second jamb such that the sash may translate within the first pocket relative to the frame. The method may include engaging end caps of a screen assembly with the first pocket of the frame, coupling a first housing member of the screen assembly to the first portion of the frame, such that when the sash is translated between an open and a closed position, the second housing member remains positioned with the first portion of the frame, and releasably coupling a second housing member of the screen assembly to the sash of the fenestration unit such that a catch element of the first housing member engages with a wash lock of the sash.

The inventive concepts hereby addressed have been described above both generically and with regard to specific examples. It will be apparent to those skilled in the art that various modifications and variations can be made in the examples without departing from the scope of the disclosure. Likewise, the various components discussed in the examples are combinable. Thus, it is intended that the examples be viewed collectively, as a whole, as also intimating various modifications and variations of those specific examples.

We claim:

1. A screen assembly for a fenestration unit having a frame and a window sash, the screen assembly comprising:

a housing having a first housing member and a second housing member, wherein the housing forms a screen retention space between the first and second housing members when the screen assembly is in a closed position;

a pleated screen positioned between the first and second housing members when the screen assembly is in the closed position, the pleated screen including a first end coupled to the first housing member and a second end coupled to the second housing member; and a catch element extending from the housing and configured to releasably engage with a window sash, the catch element including an engaging surface and a deflecting surface, the engaging surface configured to engage an engaging surface receiver of the window sash and the deflecting surface is operable to slide past the engaging surface receiver of the window sash when the catch element is reengaging with the window sash, wherein the catch element is operable to disengage from the window sash when the window sash is rotated out-of-plane due to the engaging surface receiver of the window sash being rotated out-of-plane and away from the engaging surface of the catch element.

2. The screen assembly of claim 1, further comprising end caps positioned at first and second longitudinal ends of the housing.

3. The screen assembly of claim 2, wherein the end caps include the catch element.

4. The screen assembly of claim 2, wherein the end caps are configured to be positioned in pockets formed in a frame.

5. The screen assembly of claim 4, wherein the end caps are operable to limit rotational movement of the second housing member.

6. The screen assembly of claim 1, further comprising a pleat restrictor positioned on the housing such that the pleat restrictor extends into the screen retention space, the pleat restrictor operable to provide resistance to the pleated screen when the pleated screen is extending away from the housing.

7. The screen assembly of claim 6, wherein the pleat restrictor extends from the first housing member and is positioned to contact the screen as the second housing member is translated away from the first housing member.

8. The screen assembly of claim 1, further comprising a moisture deflector operable to deflect moisture away from the screen assembly extending from the housing.

9. The screen assembly of claim 1, further comprising a first cord portion and a second cord portion extending from the housing, wherein the first and second cord portions both extend along a shared length of a longitudinal length of the housing.

10. The screen assembly of claim 9, wherein the first and second cord portions are offset from a lateral center of the screen assembly.

11. The screen assembly of claim 1, wherein the catch element extends from the second housing member of the housing.

12. A screen assembly for a fenestration unit having a frame and a window sash, the frame including a first pocket and a second pocket, wherein at least a portion of the window sash is positioned to travel within the first pocket, the screen assembly comprising:

a housing forming a screen retention space when the screen assembly is in a closed position, wherein at least a portion of the housing is operable to be positioned to travel within a second pocket of a frame;

a pleated screen positioned within the screen retention space when the screen assembly is in the closed position, the pleated screen including a first end coupled to a first portion of the housing and a second end coupled to a second portion of the housing;

a catch element extending from the housing and configured to releasably engage with a lip on the window sash, wherein the catch element is operable to disengage from the window sash when the window sash is rotated out-of-plane due to the lip of the window sash being rotated out-of-plane and away from the catch element; and an end cap positioned at one of first and second longitudinal ends of the housing, wherein the end cap is configured to engage one of first and second pockets of the frame, wherein the end cap is operable to limit rotational movement of the second housing member.

* * * * *